(12) United States Patent
Mason et al.

(10) Patent No.: US 11,890,585 B2
(45) Date of Patent: Feb. 6, 2024

(54) ULTRASTABLE NANOEMULSIONS IN DISORDERED AND ORDERED STATES

(71) Applicant: THE REGENTS OF THE UNIVERSITY OF CALIFORNIA, Oakland, CA (US)

(72) Inventors: Thomas G. Mason, Los Angeles, CA (US); Matthew Pagenkopp, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 231 days.

(21) Appl. No.: 17/466,621

(22) Filed: Sep. 3, 2021

(65) Prior Publication Data

US 2022/0062833 A1 Mar. 3, 2022

Related U.S. Application Data

(60) Provisional application No. 63/074,397, filed on Sep. 3, 2020.

(51) Int. Cl.
*B01F 23/41* (2022.01)
*B01F 23/40* (2022.01)

(52) U.S. Cl.
CPC ........ *B01F 23/4105* (2022.01); *B01F 23/414* (2022.01); *B01F 23/48* (2022.01)

(58) Field of Classification Search
CPC ............................................ B01F 23/41–4146
See application file for complete search history.

(56) References Cited

U.S. PATENT DOCUMENTS

| | | | |
|---|---|---|---|
| 2012/0326104 A1* | 12/2012 | Kwon | G02F 1/29 |
| | | | 264/1.36 |
| 2020/0056996 A1* | 2/2020 | Zarzar | G01N 21/6452 |

OTHER PUBLICATIONS

Pagenkopp, M. Exploring Novel Uses of Size-Fractionated Nanoemulsions. UCLA Dissertation. Dec. 2019. (Year: 2019).*
Holmes et al. Chromatic Emulsions. J. Am. Chem. Soc. 1922, 44, 71-74. (Year: 1922).*

(Continued)

*Primary Examiner* — Stephen E Rieth
(74) *Attorney, Agent, or Firm* — Foley & Lardner LLP

(57) ABSTRACT

A biliquid material includes an emulsion having a continuous liquid phase, a dispersed liquid phase, and a surface-stabilizing material, wherein: the dispersed liquid phase is immiscible with the continuous liquid phase; the dispersed liquid phase is in the form of a plurality of droplets in the continuous liquid phase; the surface-stabilizing material is soluble in at least one of the continuous liquid phase and the dispersed liquid phase and preferentially adsorbs at the surfaces of the plurality of droplets, wherein the surface-stabilizing material imparts a repulsive interaction between the plurality of droplets that inhibits coalescence of the plurality of droplets; and the biliquid material has a structurally-colored droplets structure, wherein the structurally-colored droplets structure yields one or more structural colors when illuminated with broad-spectrum light wherein the one or more structural colors arise from diffraction of the broad-spectrum light by the plurality of droplets.

20 Claims, 46 Drawing Sheets
(46 of 46 Drawing Sheet(s) Filed in Color)

(56) References Cited

OTHER PUBLICATIONS

Bedford et al. Solubilities and Volume Changes Attending Mixing for the System: Perfluoron-hexane-n-Hexane. J. Am. Chem. Soc. 1958, 80, 2, 282-285. (Year: 1958).*
Chen et al. Organized Self-Emulsification toward Structural Color. arXiv:2006.05229 (physics. Available online 2006. (Year: 2006).*

* cited by examiner

ULTRASTABLE NANOEMULSIONS IN DISORDERED AND ORDERED STATES

CROSS-REFERENCE TO RELATED APPLICATION

This application claims the benefit of U.S. provisional application Ser. No. 63/074,397 filed Sep. 3, 2020, the disclosure of which is incorporated in its entirety by reference herein.

FIELD

The present technology is generally related to biliquid materials. More particularly, the technology relates to ultrastable nanoemulsions comprising a structurally colored structure or a crystalline structure.

SUMMARY

In one aspect, is provided a biliquid material comprising an emulsion comprising a continuous liquid phase, a dispersed liquid phase, and a surface-stabilizing material, wherein:
the dispersed liquid phase is immiscible with the continuous liquid phase;
the dispersed liquid phase is in the form of a plurality of droplets in the continuous liquid phase;
the surface-stabilizing material is soluble in at least one of the continuous liquid phase and the dispersed liquid phase and preferentially adsorbs at the surfaces of the plurality of droplets, wherein the surface-stabilizing material imparts a repulsive interaction between the plurality of droplets that inhibits coalescence of the plurality of droplets; and
the biliquid material has a structurally-colored droplet structure, wherein the structurally-colored droplet structure yields one or more structural colors when illuminated with broad-spectrum light.

In another aspect, is provided a method of forming a biliquid material, the method comprising
forming an emulsion comprising a plurality of droplets of a dispersed liquid phase in a continuous liquid phase;
reducing an ionic strength of the continuous liquid phase with a surface-stabilizing material that imparts a repulsive interaction between the plurality of droplets that inhibits coalescence of the plurality of droplets; and
adjusting a combination of a spatial range of the repulsive interaction, a strength of the repulsive interaction, an average droplet radius of the emulsion, a radial size polydispersity of the emulsion, a refractive index difference between the continuous liquid phase and the dispersed liquid phase, and a droplet volume fraction of the emulsion are adjusted to provide the biliquid material with a structurally-colored droplet structure that yields one or more structural colors when illuminated with broad-spectrum light;
wherein:
the dispersed liquid phase is immiscible with the continuous liquid phase;
the surface-stabilizing material is a surfactant, a lipid, a co-polymer, or a combination of two or more thereof;
the surface-stabilizing material is soluble in at least one of the continuous liquid phase and the dispersed liquid phase and preferentially adsorbs at the surfaces of the plurality of droplets; and
the structurally-colored droplet structure is hyperuniform, crystalline with long-range order, poly-crystalline with long-range order, non-crystalline with medium-range order, non-crystalline with short-range order, or a combination of two or more thereof.

In another aspect, is provided a method of forming a biliquid material, the method comprising:
forming an emulsion comprising a polar liquid phase and non-polar liquid droplets dispersed in the polar liquid phase; and
reducing an ionic strength of the polar liquid phase to form the biliquid material as a structurally colored structure or a crystalline structure;
wherein:
the nonpolar liquid droplets are immiscible with the polar liquid phase; and
the emulsion is stabilized by an ionic surfactant adsorbed at an interface between the polar liquid phase and the non-polar liquid droplets.

In another aspect is provided a biliquid material formed by any one of the methods as described herein.

In another aspect is provided composition comprising a structurally colored structure or a crystalline structure, wherein the structurally colored structure or the crystalline structure comprises: (a) a nanoemulsion of a polar liquid phase and non-polar liquid droplets dispersed in the polar liquid phase, and (b) an ionic surfactant.

The foregoing general description and following detailed description are exemplary and explanatory and are intended to provide further explanation of the disclosure as claimed. Other objects, advantages, and novel features will be readily apparent to those skilled in the art from the following brief description of the drawings and detailed description of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

(FIG. 3A) The size fractionated nanoemulsion (<a>=40 nm) was washed four times after SOS treatment and diluted to ϕ=0.021 and electrical conductivity $\sigma_e$=11 µS/cm. The resulting colloidal crystals scatter blue light when the NEM is imaged in a backscatter configuration. The small crystals at the top of the tube are a product of handling the nanoemulsion sample due to their proximity to the air-nanoemulsion interface. (FIG. 3B) The size fractionated nanoemulsion (<a>=48 nm) was washed four times after SOS treatment and diluted to ϕ=0.016 and electrical conductivity $\sigma_e$=16 µS/cm. The resulting colloidal crystals scatter green when the NEM is imaged in a backscatter configuration. (FIG. 3C) The size fractionated nanoemulsion (<a>=80 nm) was washed four times after SOS treatment and diluted to ϕ=0.021 and electrical conductivity $\sigma_e$=14 µS/cm. The resulting colloidal crystals scatter red when the NEM is imaged in a backscatter configuration. Scale bar=0.5 cm.

FIG. 4A: Color mixing rules for non-crystalline hyperuniform photonic nanoemulsions violate mixing rules commonly taught for absorbing colors. By selecting ϕ outside the range of crystalline xHU structures, it is possible to obtain strongly colored blue (left, ϕ≈0.051), green (center, ϕ≈0.029), and red (right, ϕ≈0.014) non-crystalline photonic nanoemulsions (B121$^†$, <a>=48.2 nm, see FIG. 30, shown in round poly-carbonate centrifuge tubes) that have uniform, spatially homogeneous optical appearances, as shown in this backscattering photograph. Blue and green colors correspond to sj-$\overline{x}$HU structures, and the red color corresponds to wj-L structure yet very close to the xHU crystalline boundary. Thus, the commonly taught mixing rules for absorbing colors do not apply to photonic nanoemulsions that exhibit structural colors, such as those arising as a consequence of diffraction from disordered yet hyperuniform structures, when observed in backscattering. Remarkably, photonic blue- and red-colored nanoemulsions made from the same deionized fractionated nanoemulsion concentrate, if mixed together in a volume ratio of 40:60 (blue nanoemulsion:red nanoemulsion), effectively yield the green-colored nanoemulsion shown, not a purple color as would be the case for optically absorbing materials. Scale bar: 5.0 mm. This image was made four days after diluting a concentrated emulsion with deionized water and mixing. FIG. 4B: Expected wavelength of backscattered light assuming face-centered-cubic crystal packing overlaid with data from the hyperuniform nanoemulsion. The hyperuniform nanoemulsions are assigned a wavelength which is the average wavelength for that color's respective part of the spectrum (blue=467.5 nm, green=532.5 nm, and red=682.5 nm) while the volume fraction for each sample is determined by evaporation (closed circle). These values are compared to the miller indices for a face-centered-cubic crystal packing (see Appendix A for the equations) for which scattering is allowed; {111} (solid line), {200} (dashed line), and {220} (dotted line). Scale bar: 0.5 cm.

FIG. 7A: A portion of a concentrated size fractionated nanoemulsion (<a>=48 nm) is placed inside of a 5 mm glass optical cell. The concentrated NEM appears blue due to Rayleigh scattering since the droplet's size is sufficiently small. FIG. 7B: DI water is added on top of the concentrated NEM, which disturbs some droplets on the interface but the NEM is not agitated further. FIG. 7C: The NEM reaches a hyperuniform state where the spacing between droplets can scatter visible light however the system remains disordered so no crystals are observed. The colors observed correspond with the expected trend of droplet volume fraction, red at the top of the cell where the volume fraction would be lower and the spacing in between the droplets is greater to green near the concentrated NEM interface where the volume fraction is greater and the spacing between the droplets is lower. The difference in ionic concentration would amplify this trend as near the top of the cell the ionic concentration is expected to be low which leads to an increase in the Debye screening length and an increase in the droplet spacing. The opposite would be expected for droplets near the concentrated NEM interface. FIG. 7D: The NEM system has reached an appropriate droplet volume fraction and ionic concentration to form colloidal crystals which scatter visible light. The colors seen in the NEM's hyperuniform state begin to disappear as the system orders. FIG. 7E: The colloidal crystals continue to form. Green crystals are observed in the more dilute region of the NEM while teal crystals are observed near the interface of the concentrated NEM where the droplet volume fraction is larger. Scale bar: 0.5 cm.

FIG. 8A: Schematic representing the position of the light source and camera as the scattering angle $2\theta$ is changed. FIG. 8B: Angle dependence on the observed color scattered from the colloidal crystals and surrounding nanoemulsion made with a size fractionated nanoemulsion. This nanoemulsion has $<a>=48$ nm, $\phi=0.016$, and $\sigma_e=16$ $\mu$S/cm. The observed color of the crystals shifts from green to blue when the light source is moved from a backscattering configuration to one where the light source is perpendicular to the camera. This color change is in accordance with Bragg scattering, as the scattering angle is increased (camera diagram top of this figure) the scattered wavelength will decrease. Scale bar=0.5 cm.

(FIG. 19A) Concentrated fractionated ultrastable nanoemulsion is added to deionized water; loading is from the top right of the cuvette. Hazy blob-like regions of concentrated nanoemulsion move towards the bottom. Small crystals are first observed to form within 14 seconds after the concentrated nanoemulsion has made contact with the deionized water. (FIG. 19B) Crystals continue to form and grow in size and number (154 seconds after nanoemulsion addition) primarily at the nanoemulsion-water interface. (FIG. 19C) Crystals begin to form and grow further into the sample cell as the nanoemulsion becomes more dilute (854 seconds after nanoemulsion addition) and non-crystalline hyperuniform regions appear. The colors of these hyperuniform regions are dependent on the local φ of the nanoemulsion (see upper left of the sample region in the cuvette). (FIG. 19D) Stratification of nanoemulsion congregate near the top of the tube while deionized water can be seen at the bottom (9954 seconds after nanoemulsion addition). This produces a gradient in φ: towards the top, the nanoemulsion appears violet-blue with few crystals because it is more concentrated and the droplets, on average, are closer together. Below this layer, the droplets can form purple and blue crystals (purple crystals near the concentrated nanoemulsion and blue crystals near the green hyperuniform layer) due to the decrease in which allows the droplets to rearrange to form long-range ordered structures. The colored layers below the crystalline region appear to be non-crystalline hyperuniform structures where the droplets do not have long-range order; however, these hyperuniform structures of droplets scatter light from green to red as the nanoemulsion's φ decreases towards the bottom of the sample cell. The black region immediately near the bottom of the cell indicates deionized water and very low φ. White scale bar in FIG. S11D: 1 mm (same scale in FIGS. 19A-19D).

(FIG. 20A) Initial set of crystals which formed after the concentrated nanoemulsion was diluted with deionized water. These point-like crystals form within the first minute after the nanoemulsion is mixed, by inversion, with deionized water to a final φ=0.017. (FIG. 20B) The crystalline nanoemulsion from FIG. 20A is placed in contact with water in an ultrasonic bath (Branson 5510) that is turned on for 10 seconds. This ultrasonication de-crystallizes the nanoemulsion, leaving a non-crystalline hyperuniform structure that has a uniformly blue appearance. Microcrystals might be present, but these are so small as to not be readily identifiable by macrophotography. (FIG. 20C) The droplets in the nanoemulsion reform into much larger crystals within about 120 seconds after the ultrasonication was stopped. White scale bar, bottom right: 1 mm. Scale is the same in FIGS. 20A, 20B, and 20C.

(FIG. 24A) Nanoemulsion having <a>=34.1 nm and $\phi$=0.037: backscattering peak at $\lambda_{max}$=371 nm ($\lambda_w$=10 nm). (FIG. 24B) Nanoemulsion having <a>=39.1 nm and $\phi$=0.038: peak at $\lambda_{max}$=417 nm ($\lambda_w$=12 nm). (FIG. 24C) Nanoemulsion having <a>=41.5 nm and $\phi$=0.031: peak at $\lambda_{max}$=450 nm ($\lambda_w$=10 nm). (FIG. 24D) Nanoemulsion having <a>=39.1 nm and $\phi$=0.030: peak at $\lambda_{max}$=461 nm ($\lambda_w$=8 nm). (FIG. 24E) Nanoemulsion having <a>=47.8 nm and $\phi$=0.032: peak at $\lambda_{max}$=510 nm ($\lambda_w$=10 nm). (FIG. 24F) Nanoemulsion having <a>=47.8 nm and $\phi$=0.025: peak at $\lambda_{max}$=553 nm ($\lambda_w$=8 nm). White scale bar=1 mm (bottom right (FIG. 24F), same in all photo images). (FIG. 24G) Measured backscattering spectrum (backscattering intensity as a function of wavelength $\lambda$ using Ocean Optics backscattering fiber, Ocean Optics UV-Vis source, and Ocean Optics UV-Vis digital spectrometer) for each of the nanoemulsions shown above in (FIG. 24A)-(FIG. 24F); peaks of measured spectral curves progress from left to right. Dominant spectral peaks for each nanoemulsion can be identified from $\lambda_{max}$ information provided above.

FIG. 25A: Nanoemulsion having <a>=47.8 nm and $\phi$=0.039: backscattering peak at $\lambda_{max}$=492 nm ($\lambda_w$=77 nm). FIG. 25B: Nanoemulsion having <a>=41.5 nm and $\phi$=0.023: peak at $\lambda_{max}$=512 nm ($\lambda_w$=74 nm). FIG. 25C: Nanoemulsion having <a>=39.1 nm and $\phi$=0.022: peak at $\lambda_{max}$=568 nm ($\lambda_w$=86 nm). FIG. 25D: Nanoemulsion having <a>=47.8 nm and $\phi$=0.016: peak at $\lambda_{max}$=651 nm ($\lambda_w$=80 nm). White scale bar=1 mm (bottom right FIG. 25D, same for all photo images). FIG. 25E: Measured backscattering spectrum (backscattering intensity as a function of wavelength $\lambda$) for each of the nanoemulsions shown above in FIG. 25A-FIG. 25D; peaks of respective spectral curves progress from left to right FIGS. 26A-26D. Photonic crystalline and non-crystalline hyperuniform structures of ultrastable fractionated ionic oil-in-water (O/W) nanoemulsions.

FIG. 27A: Backscattering macrophotographs (BMPs) of crystalline hyperuniform (xHU) biliquid opals, made using path II in FIG. 26B, reveals monochromatic visible opalescence at lower primary peak wavelengths $\lambda_{p1}$ and bichromatic visible opalescence for higher $\lambda_{p1}$ near and above orange wavelengths. White scale bar: 1.0 mm (same for all images). FIG. 27B: Visible backscattering spectra (intensity $I_b$ normalized by primary peak intensity $I_{bp}$ versus light wavelength 2, see Methods in Example 5) of biliquid opals shown in FIG. 27A. For larger $\lambda_{p1}$, smaller secondary peaks are also observed at visible wavelengths $\lambda_{p2}$ (arrows). Symbol shapes above peaks designate $<a>$ (see inset legend in FIG. 27C, fractions identified in FIG. 30). FIG. 27C: Peak wavelengths $\lambda_p$ from FIG. 27B versus $<a>/\phi^{1/3}$ for biliquid opals after final dilution (solid symbols: primary peaks $\lambda_{p1}$; open symbols: secondary peaks $\lambda_{p2}$ and tertiary peaks $\lambda_{p3}$). Inset legend (upper left): symbol shape encodes $<a>$; colors of visible $\lambda_p$ are shown in a vertical bar. Solid line: fit of solid symbols to $\lambda_{p1}=C_{p1}<a>/\phi^{1/3}$ ($C_{p1}=3.26\pm0.02$, $R^2=0.964$, see text), corresponding to 1st order Bragg backscattering from body-centered-cubic (BCC) with Miller indices {110}. Dashed line: fit of open $\lambda_{p2}$ symbols to $\lambda_{p2}=C_{p2}<a>/\phi^{1/3}$ ($C_{p2}=2.34\pm0.02$, $R^2=0.996$, see text), corresponding to next allowed BCC {200}. Dotted line: prediction $\lambda_{p3}=C_{p3}<a>/\phi^{1/3}$ with $C_{p3}=1.88$ for next allowed BCC {211}.

FIG. 28A: Backscattering macrophotographs (BMPs) of an ultrastable fractionated PDMS O/W nanoemulsion (B2221, $<a>=39.9$ nm, see FIG. 30) diluted using sodium chloride (NaCl) salt solutions having controlled concentrations, yielding the same approximate final $\phi\approx0.018$ and over a wide range of final [NaCl] (values above images) in the aqueous continuous phase. Monochromatic green crystalline hyperuniform (xHU) biliquid opals are observed at very low [NaCl]<8 µM and less saturated wj-L colors transitioning to a whitish appearance are observed at even higher [NaCl]. White scale bar: 1.0 mm for all images. Schematics below certain images (arrows) show pairs of charged nanodroplets (green) at the same $<r>$ yet with smaller Debye spheres (gray) as final [NaCl] is increased. FIG. 28B: Visible backscattering spectra $I_b(\lambda)$ of the nanoemulsions in FIG. 28A, showing very narrow Bragg backscattering peaks for low [NaCl] corresponding to xHU and much wider peaks for wj-L at high [NaCl] (vertical scale has been magnified by factors in the legend: inset upper right). FIG. 28C: Peak wavelengths $\lambda_p$ (circles) and full-width at half-maximum (FWHM) of the peaks (end-to-end bar length), normalized by $<a>/\phi^{1/3}$, as a function of [NaCl], summarizing measured regimes of xHU and wj-L. Horizontal solid line: $C_{\bar{x}}=3.42\pm0.01$ for sj-$\bar{x}$HU and wj-L. Horizontal dashed line: $C_x=3.29\pm0.01$ for xHU. FIG. 28D: BMPs of a photonic PDMS O/W nanoemulsion (A121, $<a>=59.9$ nm, see FIG. 30) after diluting with acidic solutions of hydrochloric acid HCl, neutral deionized water, and basic solutions of sodium hydroxide NaOH having a range of diluent solution pH (values above images) to the same $\phi\approx0.035$. For added neutral pH=7, xHU is observed; however, for slightly acidic and basic solutions, only regimes of wj-L are found. For strongly acidic and basic solutions, further away from neutral pH, hyperuniformity is lost as larger concentrations of hydronium ions [$H_3O^+$] and hydroxide ions [$OH^-$], respectively, screen the charge-repulsion between nanodroplets more strongly, ultimately causing droplet unjamming. White scale bar: 1.0 mm (same for all images). FIG. 28E: Backscattering spectra for nanoemulsions in FIG. 28D as a function of pH in the neutral to acidic range (inset upper right: legend with vertical magnification factors). FIG. 28F: Summary of $\lambda_p$ and FWHM from spectra in FIG. 28E versus diluent solution pH. Bars and lines have similar meanings and values as in FIG. 28C.

FIG. 29A: Backscattering macrophotographs (BMPs) of a monochromatic biliquid opal (A112, $<a>=57.9$ nm, see FIG. 30) forming at times t (listed below images) after diluting the concentrate to $\phi=0.039$ using deionized water and ending ultrasonic mixing (see Methods in Example 5). White scale bar: 1.0 mm (same for all images). FIG. 29B: Backscattering spectra, normalized to the final primary peak intensity at long time, $I_b(\lambda)/I_{bp,\infty}$. Inset (upper right): colors encode observation times t of spectra. FIG. 29C: Upper plot: integrated area of the primary peak, $I_a$, normalized by its long-time value $I_{a,\infty}$, from backscattering spectra (see Methods in Example 5) as a function of t. Symbol colors correspond to times in FIG. 29B. Solid line: fit of $I_a(t)/I_{a,\infty}$ to a stretched exponential rise to a plateau (see text, $R^2=0.999$). Lower plot: largest spatial dimension of a crystallite, $L_{max}$, from BMPs (see Methods in Example 5) versus t. Solid line: fit of $L_{max}(t)$ to a stretched exponential rise to a plateau (see text, $R^2=0.999$). FIG. 29D: BMPs of a bichromatic red-violet biliquid opal forming at times t (A121, $<a>=59.9$ nm, see Extended Data Table 1) after dilution to $\phi=0.027$ and ultrasonication (see Methods in Example 5). Red opalescence corresponds to 1st order Bragg backscattering of BCC {110}; violet opalescence corresponds to BCC {200}. White scale bar: 1.0 mm (same for all images). FIG. 29E: $I_b(\lambda)/I_{bp,\infty}$ of the primary red peak for the bichromatic biliquid opal in FIG. 29D. Inset (upper right): colors encode observation times t of spectra. FIG. 29F: Upper plot: $I_a(t)/I_{a,\infty}$ of the primary red peak $\lambda_N$. Symbol colors correspond to times in FIG. 29E. Solid line: fit of $I_a(t)/I_{a,\infty}$ to a stretched exponential rise to a plateau (see text for parameters). Lower plot: $L_{max}(t)$ for red (red solid squares) and violet (violet open circles) crystallites from BMPs (see Methods in Example 5). Solid line: fit of red $L_{max}(t)$ to a stretched exponential rise to a plateau; dashed line: similar fit of violet $L_{max}(t)$ (see text for parameters).

FIG. 31A: After hot surfactant exchange with SOS and immediately before centrifuging, $\sigma_e$,NEM of a fractionated nanoemulsion concentrate (see Methods in Example 5) that has been diluted with deionized water (squares, A211, $<a>=47.8$ nm, fixed $\phi \approx 0.15$ after each dilution) is measured. After centrifuging, the nanodroplet-free clear aqueous solution below the plug (see Methods in Example 5) is drained and its $\sigma_{e,soln}$ (circles) are measured. This sequence is repeated, keeping track of the number of centrifugal deionization steps, $N_{CDI}$. These measurements each can be reasonably fit to a decaying exponential function $\sigma_e(N_{CDI})=\sigma_e^* \exp(-N_{CDI}/N_{CDI}^*)$, where $N_{CDI}^*$ is a characteristic number of centrifugal deionization steps required to drop $\sigma_e$ by a factor of $e^{-1} \approx 0.368$, and $\sigma_e^*$ is the initial electrical conductivity before deionization. Owing to the presence of nanodroplets, which include adsorbed OS$^-$ as well as screening Na$^+$, the conductivity of the nanoemulsion is higher than that of the aqueous solution. Dashed line: fit of squares, yielding $\sigma_{e,NEM}^*=350\pm9$ µS/cm and $N_{CDI,NEM}^*=4.0\pm0.1$ ($R^2=0.994$). Solid line: fit of circles, yielding $\sigma_{e,soln}^*=231\pm6$ µS/cm and $N_{CDI,soln}^*=3.8\pm0.2$ ($R^2=0.990$). After centrifugal deionization, for $\sigma_e$ less than $\approx 10$ µS/cm, subsequent dilution of the plug of deionized fractionated nanoemulsion concentrate with deionized water yields biliquid opals if $\phi$ is in an appropriate range and the degree of fractionation is sufficient (see FIG. 26). FIG. 31B, Calculated Debye screening length, $\lambda_D$, in the aqueous continuous phase after diluting a deionized fractionated nanoemulsion concentrate from FIG. 31A with deionized water to a final $\phi \approx 0.020$ (see Methods in Example 5). Initial steps of deionization remove SDS both from the continuous phase as well as from droplet interfaces through desorption, so $\lambda_D$ does not begin to increase much until after the SDS is effectively removed. Line: semi-empirical fit to $\lambda_D(N_{CDI})=\lambda_{D,0}/[1-(N_{CDI}/N_{CDI}^\dagger)^\alpha]$ for $N_{CDI}<N_{CDI}^\dagger$, where $\lambda_{D,0}=40\pm3$ nm is the initial screening length before deionization, $N_{CDI}^\dagger=10.8\pm0.1$ marks an effective step related to reduction in conductivity in the continuous phase to $\approx 0$ causing divergence in $\lambda_D$, and $\alpha=2.1\pm0.3$ is an exponent that controls the shape of the increase in $\lambda_D$ at large $N_{CDI}$ ($R^2=0.995$).

FIG. 32A: Schematic of macrophotographic imaging using a variable-angle broad-spectrum visible illumination provided by a fiber light (see Methods in Example 5). It is demonstrated that biliquid opals are iridescent: the color of the crystallites changes with viewing angle relative to the incident directional white light. Iridescence is a direct consequence of the Bragg scattering condition from planes of ordered nanodroplets within crystallites, which predicts an angular color dependence based on coherent optical scattering (see Methods in Example 5). FIG. 32B: Bragg-diffracted green-yellow light from crystallites (B121, $<a>=48.2$ nm, $\phi=0.019$) are observed having a wavelength around $\approx 565$ nm at a near-backscattering 175 deg observation angle, whereas blue-violet light near 420 nm is observed at a 90 deg observation angle. Bragg's scattering condition would predict a factor of $\sin(45 \deg)=2^{-1/2} \approx 0.71$ in the observed wavelength at 90 deg as compared to 180 deg; this value is close to the observed 420 nm/565 nm$\approx 0.74$. Thus, biliquid opals exhibit iridescence similar to that known for solid-state gemstone opals. Scale bar: 1.0 mm (same for all images).

FIG. 33A: Backscattering macrophotographs of deionized nanoemulsion concentrates having varying numbers of fractionation steps, $N_F$ (see Methods in Example 5), after the final dilution using deionized water to set $\phi \approx 0.030$. i.e. in the range where crystallites of xHU are observed at higher $N_F \geq 3$. Fractions have been chosen so that measured $<a>$ is approximately constant, near 54 nm: D, D2, D22, D222, D2222 for $N_F=0$, 1, 2, 3, 4, respectively (see FIG. 30). Scale bar: 1.0 mm (same in all images). FIG. 33B: The deionized nanoemulsion concentrates shown in FIG. 33A are diluted using an aqueous solution of SDS at $\approx 10$ mM to $10^{-4} \leq \phi \leq 10^{-5}$; then, several trials of dynamic light scattering (DLS, see Methods in Example 5) are performed to measure average droplet hydrodynamic radius $<a>$ and polydispersity $\delta a/<a>$, based on cumulant analysis. It was found that four fractionation steps are typically required to lower $\delta a/<a>$ below 0.1. Bars represent ±s.d. of polydispersities obtained from multiple DLS trials.

FIG. 36A: Backscattering macrophotographs (see Methods in Example 5) are taken at times t after adding the concentrate (C2211, $<a>=56.3$ nm, $\phi_i \approx 0.219$) from the top of the optical cuvette to the deionized water pre-loaded at the bottom of the cuvette. Almost immediately after adding the concentrate, near the interface of the concentrate and the deionized water, colorful mobile xHU crystallites begin to form and convect. At later times, opalescent crystallites (xHU) as well as colored sj-$\bar{x}$HU and wj-L structures are all apparent as a function of height within the cuvette. Interestingly, within this gradient, a long multicolor crystallite is observed that appears to have a continuously varying color as a function of distance within the spatial gradient in $\phi$ and ionic strength. The red color at the lower end corresponds to lower $\phi$ and green color corresponds to higher $\phi$. Scale bar: 1.0 mm (same for all images). FIG. 36B: Zoomed view of the multi-colored crystallite at $t=4.3$ h.

DETAILED DESCRIPTION

Figure 1:
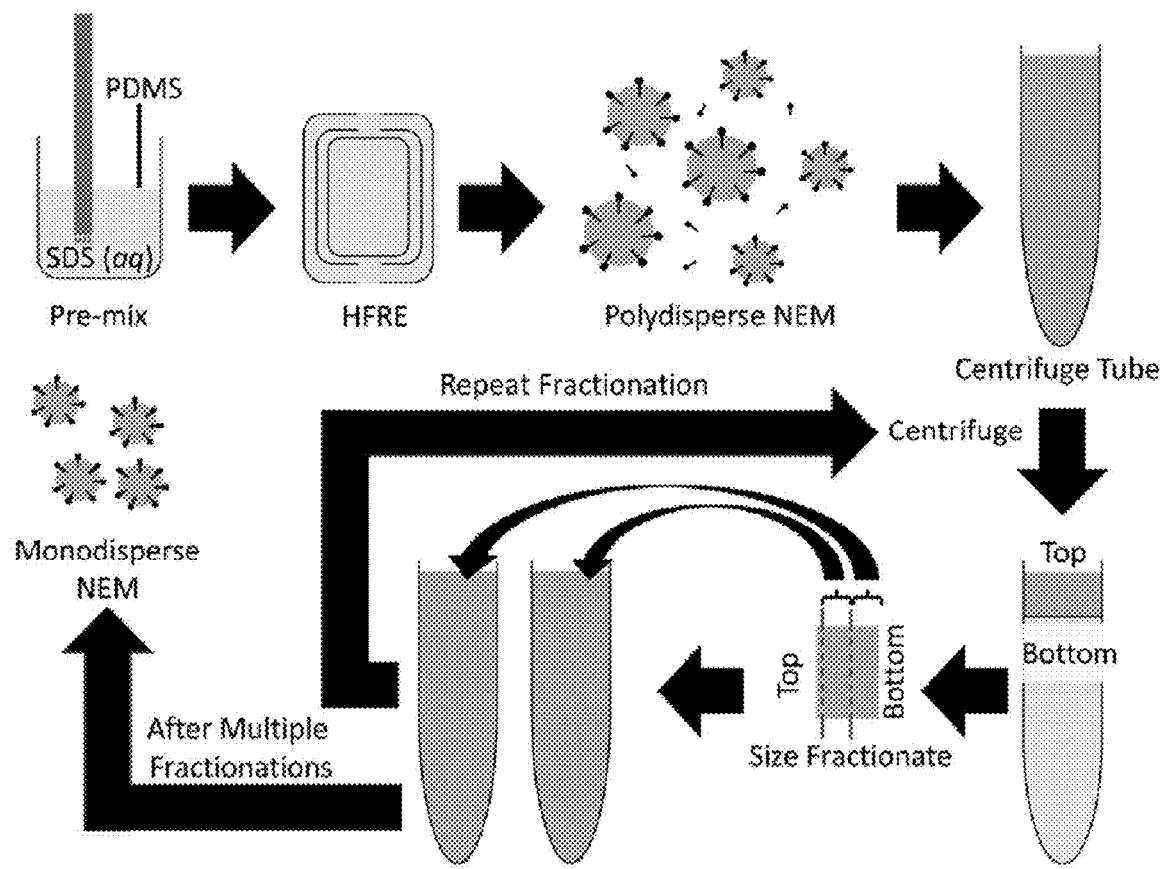
FIG. 1 describes the process used to produce large quantities of monodisperse nanoemulsions. A sodium dodecyl sulfate (SDS) aqueous solution is prepared by mixing SDS (s) and deionized (DI) water. The disperse phase (10 cSt PDMS oil) is slowly added to the surfactant solution while being agitated by a saw-tooth hand mixer to create a pre-mix emulsion. This pre-mix emulsion has its <a> further reduced to the nanoscale by exposing the microscale droplets to a high flow rate emulsification (HFRE) technique. The newly formed nanoemulsion (NEM) is centrifuged and as a result, the droplets cream to the top of the centrifuge tube such that droplets with a larger <a> are near the top and droplets with a smaller <a> are near the bottom of the plug. The sample is size fractionated by cutting the elastic plug as shown above (red dashed lines) to separate the larger droplets from the smaller droplets while discarding the very top of the plug. The two halves of the plug diluted with DI water and centrifuged again. This process of centrifugation, fractionation, and dilution is repeated a total of 3 times until a monodisperse NEM had been produced.

Disclosed herein are biliquid materials with structurally colored structures. In particular, the biliquid materials are monodisperse oil-in-water nanoemulsions that are stabilized by an ionic surface-stabilizing material (e.g., ionic surfactant) having a sufficiently long tail, which resides preferentially at droplet interfaces and which precludes significant desorption upon dilution with deionized water. In some embodiments, the ordered biliquid materials are biliquid opals which exhibit hyperuniform disordered states. Methods to prepare these biliquid materials are described in more detail herein. For example, by systematically controlling the average size and volume fraction of nanodroplets while ensuring droplet stability at highly reduced ionic strengths through rejamming crystallization, long-lived photonic biliquid opals that exhibit tunable and brilliant color-selective backscattering of visible and ultraviolet light may be prepared.

Definitions

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As utilized herein with respect to numerical ranges, the terms "approximately," "about," "substantially," and similar terms will be understood by persons of ordinary skill in the art and will vary to some extent depending upon the context in which it is used. If there are uses of the terms that are not clear to persons of ordinary skill in the art, given the context in which it is used, the terms will be plus or minus 10% of the disclosed values. When "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

As used herein, the singular terms "a," "an," and "the" may include plural referents unless the context clearly dictates otherwise. Thus, for example, reference to an object may include multiple objects unless the context clearly dictates otherwise. Alternatively, the use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "set" refers to a collection of one or more objects. Thus, for example, a set of objects can include a single object or multiple objects.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be "substantially" or "about" the same as a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "C-number" or "$N_C$" refers to the number of carbons in the hydrocarbon chain (or chains) that corresponds to the aliphatic (non-polar) tail (or tails) of a surfactant molecule. For instance, a surfactant with a C-number of $C_{12}$ or greater has aliphatic tail(s) consisting of at least twelve carbons in the hydrocarbon chain of each tail.

As used herein, the term "hyperuniform structure" refers broadly to structurally-colored droplet structures that empirically yield a peak in a measured backscattering spectrum when illuminated with broad-spectrum white light. It is noted that usage of the term "hyperuniform structure" in some prior art may not be as broad as the above empirical usage and may refer more specifically to the following notion: a many-particle system has a hyperuniform structure if the variance of the number of points within a spherical observation window grows more slowly than the volume of the observation window. All perfect crystals, perfect quasicrystals, and some exotic disordered states of matter have hyperuniform structure. Thus, at least the crystalline and poly-crystalline droplet structures of emulsions that have been fabricated and measured herein, which exhibit very narrow peaks in their respective measured backscattering spectra, are hyperuniform even considering this more narrow notion. However, the empirical usage herein also extends to measured peaks in backscattering spectra, which are broader than observed peaks for crystalline and poly-crystalline droplet structures of emulsions, yet nevertheless convey the appearance of structural color to an observer. The empirical definition used broadly herein implies that "hyperuniform" refers to a droplet structure that yields a structurally colored appearance, and so usage of the term "hyperuniform" is not intended to be limited to the specific definition related to the growth in variance of number of points with respect to the volume of the observation window.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

Compositions

In one aspect, provided herein is a biliquid material comprising an emulsion comprising a continuous liquid phase, a dispersed liquid phase, and a surface-stabilizing material, wherein:

the dispersed liquid phase is immiscible with the continuous liquid phase;

the dispersed liquid phase is in the form of a plurality of droplets in the continuous liquid phase;

the surface-stabilizing material is soluble in at least one of the continuous liquid phase and the dispersed liquid phase and preferentially adsorbs at the surfaces of the plurality of droplets, wherein the surface-stabilizing material imparts a repulsive interaction between the plurality of droplets that inhibits coalescence of the plurality of droplets; and the biliquid material has a structurally-colored droplet structure, wherein the structurally-colored droplet structure yields one or more structural colors when illuminated with broad-spectrum light.

For the biliquid materials described herein, the solubility of the dispersed liquid phase in the continuous liquid phase is sufficiently low to inhibit Ostwald ripening by diffusive transport of molecules of the dispersed liquid phase through said continuous liquid phase. In some embodiments, the continuous liquid phase is polar and the dispersed liquid phase is non-polar. In some embodiments, the continuous liquid phase is non-polar and the dispersed liquid phase is polar. Non-limiting examples of a polar continuous liquid phase or a polar dispersed liquid phase include deionized water, deuterated water ($D_2O$), acidic aqueous solutions, basic aqueous solutions, aqueous electrolyte solutions, aqueous solutions of water-soluble non-ionic polymers, and polar aprotic solvents (e.g., DMF, DMSO, THF, acetone, acetonitrile, NMP). Non-limiting examples of a non-polar continuous phase or a non-polar dispersed liquid phase include silicone oils (e.g., 10 cSt PDMS oil), fluorinated or perfluorinated silicone oils, hydrocarbon oils, and liquid crystals that have anisotropic viscosities but can be readily emulsified. Naturally occurring hydrocarbon oils include squalene and squalane. Synthetic hydrocarbon oils, such as those used in some types of synthetic engine-motor oils, which have similar molecular structures to squalane, remain liquid and do not solidify.

The surface-stabilizing material may be a surfactant, a lipid, a co-polymer, or a combination of two or more thereof.

Non-limiting examples of a surfactant include alkylsulfates, alkylsulfonates, alkylcarboxylates, alkylphosphates, silicone-sulfates, silicone-sulfonates, silicone-carboxylates, and silicone-phosphates, and their fluorinated or perfluorinated counterparts. Silicone-sulfates, silicone-sulfonates, silicone-carboxylates, and silicone-phosphates are silicone oils functionalized with sulfate, sulfonate, carboxylate or phosphate groups, respectively. Additional examples of surfactants compatible with the biliquids disclosed herein may be found in Drew Meyers, Surfactant Science and Technology, 4th Edition. ISBN-13: 978-1119465850, which is incorporated by reference herein.

Non-limiting examples of a lipid include ionic fatty acyls, ionic glycerolipids, ionic glycerophospholipids, ionic sphingolipids, ionic saccharolipids, ionic polyketides, ionic sterol lipids, or ionic prenol lipids. Additional examples of lipids compatible with the biliquids disclosed herein may be found in Lipids: Biochemistry, Biotechnology, and Health 6th ed. by M. I. Gurr, J. L. Harwood, K. N. Frayn, D. J. Murphy, and R. H. Michell, which is incorporated by reference herein.

Non-limiting examples of a co-polymer include co-polymers with either acidic or basic functional groups in a given block that could become charged when the pH is taken into a certain range; the other block would have non-polar characteristics. Such co-polymers include block co-polymers containing poly-amino acid (PAA) or poly-nucleic acid (PNA) block co-polymers, wherein certain other blocks are non-polar alkyl or silicone in nature. Usually, at least one block having a polar nature is joined to a block having a non-polar nature to promote preferential adsorption of the block co-polymer onto interfaces between a polar liquid phase and a non-polar liquid phase.

In some embodiments, the surface-stabilizing material is an ionic surface-stabilizing material. The ionic surface-stabilizing material may be anionic or cationic. The ionic surface-stabilizing material may have an alkyl portion with a carbon number greater than or equal to 16. In some embodiments, the ionic surface-stabilizing material is an ionic surfactant, ionic lipid, an ionic block co-polymer, or any combination of two or more thereof. In some embodiments, the ionic surfactant comprises an ionic head group and a non-polar tail bonded to the ionic head group. In some embodiments, the ionic surfactant has a non-polar tail of $C_{12}$ or greater, $C_{13}$ or greater, $C_{14}$ or greater, $C_{15}$ or greater, $C_{16}$ or greater, $C_{17}$ or greater, or $C_{18}$ or greater.

A combination of a spatial range of the repulsive interaction, a strength of the repulsive interaction, an average droplet radius of the emulsion, a radial size polydispersity of the emulsion, a refractive index difference between the continuous liquid phase and the dispersed liquid phase, and a volume fraction of the emulsion may be adjusted to obtain the droplet structure that yields at least a structural color when illuminated with broad-spectrum light. As used herein, the "structural color" relates to color due to light diffraction and light scattering and not to optical absorption by any component materials (e.g., components within the biliquid material described herein). Structural color may be selected or controlled by adjusting average droplet radius, droplet volume fraction, zeta potential, and Debye screening length. Peak(s) in backscattering spectrum related to structural color may be controlled over wavelengths associated with deep ultraviolet to ultraviolet to visible to infrared to far-infrared ranges of the spectrum of electromagnetic radiation.

In the field of colloidal crystals, radial size polydispersity and charge polydispersity may impact the degree of crystallization. Accordingly, for emulsion systems, because adsorption of an ionic surface-stabilizing material is typically at a uniform surface concentration, radial size polydispersity of droplets also implies a similar charge polydispersity of droplets. The radial size polydispersity of the plurality of droplets of the emulsions described herein may be less than about 0.4. This includes a radial size polydispersity of about 0.0001 to less than 0.4, about 0.001 to less than 0.4, or about 0.01 to less than 0.4. This includes radial size polydispersity of the plurality of droplets of about 0.01, 0.05, 0.1, 0.15, 0.2, 0.25, 0.3, In some embodiments, the radial size polydispersity is less than 0.2, less than 0.15, or less than 0.1. In some embodiments, the radial size polydispersity of the plurality of droplets is from about 0.01 to less than about 0.15.

The average droplet radius of the emulsion may be less than about 500 nm. This includes an average droplet radius of about 5 nm to less than about 500 nm. In some embodiment, an average droplet radius is about 5 nm to about 200 nm. This includes about 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 nm, or any value therebetween.

In some embodiments, the repulsive interaction is a screened charge repulsion, and the biliquid material has a spatial range of the screened charge repulsion of greater than about 0.1 times the average droplet radius. The spatial range may be from about 5 nm to about 500 nm on an absolute scale, irrespective of average droplet radius.

Zeta potential is related to the surface density of adsorbed surfactant charge groups on the droplet surfaces. Negative zeta potential is observed for anionic surfactants; positive zeta potential is observed for cationic surfactants. The zeta potential associated with the screened charge repulsion may have a magnitude greater than or equal to about 10 mV. This includes a zeta potential of about 30 mV to about 200 mV. This includes a zeta potential of about 10, 20, 30, 40, 50, 60, 70, 80, 90, 100, 110, 120, 130, 140, 150, 160, 170, 180, 190, or 200 mV, or any value therebetween. In some embodiments, the zeta potential associated with the screened charge repulsion is about 10 mV to about 100 mV.

The Debye screening length is set by dielectric constant of the continuous liquid phase and the ionic strength of the continuous phase. The Debye screening length is not directly related to the magnitude of the zeta potential. The Debye screening length associated with the screened charge repulsion may be greater than about 5 nm. This includes a Debye screening length of greater than about 5 nm to 1000 nm. This includes a Debye screening length of about 5, 10, 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, or 1000 nm, or any value therebetween. In some embodiments, the Debye screening length is greater than about 10 nm. The range of the repulsion should be comparable to or larger than the spacing between the interfaces of droplets (i.e., interfacial spacing) in the emulsion. This interfacial spacing (distance between the nearest charge groups on neighboring droplets) is different than the center-to-center droplet spacing which is discussed herein in relation to Bragg scattering. In some embodiments, the Debye screening length is increased through one or both of deionization of the continuous liquid phase and dilution with deionized continuous liquid phase.

The biliquid materials disclosed herein may have an effective refractive index of the emulsion $n_{eff}$ of from about 1.2 to about 2.0. This includes an effective refractive index of about 1.2, 1.3, 1.4, 1.5, 1.6, 1.7, 1.8, 1.9, or 2.0, or any value therebetween.

The refractive index difference between the continuous liquid phase and the dispersed liquid phase may have a magnitude of about 0.001 to about 1. This includes a magnitude of about 0.001, 0.005, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.3, or any value therebetween. In some embodiments, the refractive index difference is about 0.001, 0.005, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.3, or any value therebetween. In some embodiments, the refractive index difference is about −0.001, −0.005, −0.01, −0.02, −0.03, −0.04, −0.05, −0.06, −0.07, −0.08, −0.09, −0.10, −0.11, −0.12, −0.13, −0.14, −0.15, −0.16, −0.17, −0.18, −0.19, −0.20, −0.21, −0.22, −0.23, −0.24, −0.25, −0.26, −0.27, −0.28, −0.29, or −0.3, or any value therebetween. In some embodiments, the refractive index difference has a magnitude of greater than about 0.005. In some embodiments, the refractive index difference has a magnitude of about 0.01 to about 0.3. The choice of a suitable refractive index difference to maximize the intensity of a backscattered structural color is related to the average droplet radius $<a>$ and the droplet volume fraction $\phi$.

The droplet volume fraction of the emulsion may be from about 0.001 to about 0.5. This includes about 0.005, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, or 0.5, or any value therebetween. In some embodiments, the droplet volume fraction is less than about 0.1.

The continuous phase may have an ionic strength of less than or equal to 0.1 mM. This includes an ionic strength of about 0.0001 mM to about 0.1 mM or about 0.001 mM to about 0.1 mM. This includes an ionic strength of about 0.0001, 0.0005, 0.001, 0.005, 0.01, 0.05, or 0.1 mM, or any value therebetween. In some embodiments, the biliquid material has a structural color based on its crystallinity or polycrystallinity and the continuous phase has an ionic strength of about 0.0001 mM to about 0.01 mM. In some embodiments, the biliquid material has a structural color based on its non-crystallinity and the continuous phase has an ionic strength of about 0.001 mM to about 1 mM.

In some embodiments, the pH of the emulsion is about 4.0 to about 5.3. This includes a pH of about 4.0, 4.1, 4.2, 4.3, 4.4, 4.5, 4.6, 4.7, 4.8, 4.9, 5.0, 5.1, 5.2, or 5.3, or any value therebetween. In some embodiments, the pH of the emulsion is about 5.4 to about 8.6. this includes a pH of about 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, or 8.6, or any value therebetween. In some embodiments, the pH of the emulsion is about 8.6, to about 11. This includes a pH of about 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, or 11, or any value therebetween.

The biliquid materials disclosed herein have a structurally-colored droplet structure that is hyperuniform, crystalline with long-range order, poly-crystalline with long-range order within a given crystallite, liquid crystalline with quasi-long-range order, non-crystalline with medium-range order, non-crystalline with short-range order, or a combination of two or more thereof.

Structures that are crystalline with "long-range order" refer to exhibition of periodic order having the property of translational invariance. The spatial pair correlation function of a crystalline material composed of objects displays non-zero values (i.e., delta-function like peaks) over a long spatial range (compared to the characteristic inter-object spacing) that is effectively limited only by the size of the crystal or crystallite. Structures that are poly-crystalline with long-range order within a given crystallite exhibit a set of smaller crystallites which can have random orientations with respect to each other.

Structures that are liquid crystalline with "quasi-long range order" refer to exhibition of some minor decay in their spatial pair correlation functions, but any decay is very slow and typically exhibits a power-law rather than an exponential form. In addition, the spatial pair correlation function exhibits non-zero values over a range that is many times the characteristic inter-object spacing. However, unlike crystalline long-range order, there is some decay evident.

Structures that are non-crystalline with "medium-range order" refer to structures that have a spatial pair correlation function that decays with a correlation length associated with the decay that is greater than about 3 times the characteristic inter-object spacing but typically full decay occurs before about 10 times the characteristic inter-object spacing. Although the spatial pair correlation function may not be directly measured, some aspects of it may be inferred in the width of the peak in the backscattering spectrum. The more narrow the peak, the greater the degree of order. For example, strongly jammed non-crystalline hyperuniform structures can exhibit medium-range order.

Structures that are non-crystalline with "short-range order" refer to structures that exhibit a decaying spatial pair-correlation function (defined by the positional structure of the objects) that decays fully with a correlation length that is less than or equal to about 3 times the characteristic inter-object spacing. Typically, materials with short-range order have exponentially decaying spatial pair correlation functions. For example, weakly jammed non-crystalline structures can exhibit short-range order.

In some embodiments, the biliquid material is a structurally-colored droplet structure that yields two or more structural colors, each of which comes from optical scattering of different spatial regions of the same emulsion.

In another aspect provided herein is a composition comprising a structurally colored structure or a crystalline structure, wherein the structurally colored structure or the crystalline structure comprises: (a) a nanoemulsion of a polar liquid phase and non-polar liquid droplets dispersed in the polar liquid phase, and (b) an ionic surfactant.

Methods

In another aspect, provided herein is a method of forming a biliquid material described herein. In some embodiments, the emulsion is a nanoemulsion.

In another aspect, provided herein is a method of forming a biliquid material, the method comprising:

forming an emulsion comprising a polar liquid phase and non-polar liquid droplets dispersed in the polar liquid phase; and reducing an ionic strength of the polar liquid phase to form the biliquid material as a structurally colored structure or a crystalline structure;

wherein:
the nonpolar liquid droplets are immiscible with the polar liquid phase; and
the emulsion is stabilized by an ionic surfactant adsorbed at an interface between the polar liquid phase and the non-polar liquid droplets.

In another aspect, provided herein is a method of forming a biliquid material, the method comprising
forming an emulsion comprising a plurality of droplets of a dispersed liquid phase in a continuous liquid phase;
reducing an ionic strength of the continuous liquid phase with a surface-stabilizing material that imparts a repulsive interaction between the plurality of droplets that inhibits coalescence of the plurality of droplets; and
adjusting a combination of a spatial range of the repulsive interaction, a strength of the repulsive interaction, an average droplet radius of the emulsion, a radial size polydispersity of the emulsion, a refractive index difference between the continuous liquid phase and the dispersed liquid phase, and a droplet volume fraction of the emulsion are adjusted to provide the biliquid material with a structurally-colored droplet structure that yields one or more structural colors when illuminated with broad-spectrum light;
wherein:
the dispersed liquid phase is immiscible with the continuous liquid phase;
the surface-stabilizing material is a surfactant, a lipid, a co-polymer, or a combination of two or more thereof;
the surface-stabilizing material is soluble in at least one of the continuous liquid phase and the dispersed liquid phase and preferentially adsorbs at the surfaces of the plurality of droplets; and
the structurally-colored droplet structure is hyperuniform, crystalline with long-range order, poly-crystalline with long-range order, non-crystalline with medium-range order, non-crystalline with short-range order, or a combination of two or more thereof.

In some embodiments, forming the emulsion comprises heating at a temperature above room temperature.

In some embodiments, forming the emulsion comprises forming an initial emulsion that is stabilized by an initial ionic surfactant having an initial C-number, and placing the initial emulsion in contact with a second ionic surfactant having a C-number that is greater than the initial C-number.

In some embodiments, the initial C-number is $C_{12}$ or greater. In some embodiments, the initial C-number is $C_{16}$ or greater. In some embodiments, the initial C-number is $C_{17}$ or greater. In some embodiments, the initial C-number is $C_{18}$ or greater.

The adsorption of the surface-stabilizing material onto droplet surfaces may be conducted at a temperature above room temperature, and then the temperature may be lowered so as to make this adsorption nearly irreversible, yielding an ultrastable emulsion with respect to dilution with deionized water. Accordingly, in some embodiments, placing the initial emulsion in contact with the surface-stabilizing material (e.g., an ionic surfactant) comprises heating at a temperature above room temperature. In some embodiments, placing the initial emulsion in contact with the surface-stabilizing material comprises heating at a temperature at or above 40° C. In some embodiments, placing the initial emulsion in contact with the surface-stabilizing material comprises heating at a temperature at or above 50° C. In some embodiments, placing the initial emulsion in contact with the surface-stabilizing material comprises heating at a temperature at or above 60° C. In some embodiments, placing the initial emulsion in contact with the surface-stabilizing material comprises heating at a temperature at or above 75° C.

In some embodiments, forming the emulsion comprises subjecting the emulsion to size fractionation. In some embodiments, size fractionation is performed subsequent to formation of the emulsion. In some embodiments, the radial size polydispersity is reduced through a droplet size fractionation procedure subsequent to formation of the emulsion.

In some embodiments, a pH of the emulsion that forms the crystalline structure is about 5.4 to about 8.6.

In some embodiments, a pH of the emulsion that forms the structurally colored structure is about 4.0 to about 5.3. In some embodiments, a pH of the emulsion that forms the structurally colored structure is about 8.6 to about 11.

In some embodiments, reducing the ionic strength of the polar liquid phase is performed by dilution with neutral deionized water.

In some embodiments, reducing the ionic strength of the polar liquid phase is performed by placing the emulsion in contact with a nanoporous membrane or gel that has a pore size sufficient to allow passage of ions in the polar liquid phase but small enough to block passage of the non-polar liquid droplets.

In some embodiments, reducing the ionic strength of the polar liquid phase is further performed using an ion exchange resin that removes the ions that pass through the nanoporous membrane or gel.

In some embodiments, the ion exchange resin is a mixed-bed ion exchange resin.

In some embodiments, the ionic strength of the polar liquid phase is reduced to ≤0.1 mM.

In some embodiments, the non-polar liquid droplets have an average radius of about 10 nm to about 200 nm. In some embodiments, the non-polar liquid droplets have an average radius of about 10 nm to about 150 nm. In some embodiments, the non-polar liquid droplets have an average radius of about 10 nm to about 100 nm. In some embodiments, the non-polar liquid droplets have an average radius of about 30 nm and about 100 nm.

In some embodiments, reducing the ionic strength of the polar liquid phase results in an enhanced charge repulsion between the non-polar liquid droplets.

In some embodiments, a Debye screening length in the polar liquid phase is greater than about 10 nm.

In some embodiments, a backscattered light from the biliquid material, when illuminated by directional white light, is in a visible range of wavelengths, yielding a color that arises from diffraction satisfying a Bragg criterion. Bragg criteria for certain types of lattices are shown in Example 2.

In some embodiments, a wavelength associated with a dominant peak in a spectrum of the backscattered light is proportional to an average droplet radius divided by a droplet volume fraction raised to the one-third power.

In another aspect, provided herein is a biliquid material formed by any one of the methods as described herein.

In some embodiments, the droplets in the structurally-colored emulsions disclosed herein have an internal structure, such as one or more internal compartments, that correspond to Janus or Cerberus droplets.

The present invention, thus generally described, will be understood more readily by reference to the following examples, which are provided by way of illustration and are not intended to be limiting of the present invention.

EXAMPLES

Example 1. Opalescent and Hyperuniform Photonic Nanoemulsions

Description: Opalescent and Hyperuniform Photonic Nanoemulsions

I. Introduction

The hydrophile-lipophile balance (HLB) of surfactant molecules is an established notion in surface science and emulsion science. The highly simplified numerical HLB scheme provides a constrained classification of surfactants, because it combines several different energetic factors, such as affinity of one or more head groups of a surfactant molecule to be in a polar (e.g. aqueous) phase relative to the affinity of one or more tail groups of a surfactant molecule to be in a nonpolar (e.g. oil) phase. While sometimes practically useful for guiding formulation of emulsions, the HLB scheme is constrained in predictive capacity, and it does not capture the full range of physical aspects that are important in forming and stabilizing certain types of emulsions.

The solubility of a given type of surfactant molecule in a liquid phase, such as water, depends on many factors. An important factor is the length of the hydrocarbon chain (or chains) corresponding to the 'tail' of a surfactant molecule (or for certain surfactant molecules, 'tails'). For a simple alkyl tail, the enthalpic energy cost (e.g. energetic penalty) of this non-polar tail being in a polar environment of water, relative to the entropic energy (which is proportional to thermal energy $k_B T$, where T is the temperature and $k_B$ is Boltzmann's constant), depends on the length of this tail. Consequently, relatively small changes in the carbon number, called the C-number, $N_C$ (e.g. number of carbons in the tail), can lead to big changes in the enthalpic energy cost relative to the entropic energy, and thus, can strongly influence the solubility of the surfactant in an aqueous solution phase. For a given fixed temperature, as the aliphatic chain length increases and the C-number rises, the surfactant's solubility in the aqueous phase will decrease. At higher surfactant concentrations, many surfactants form micellar phases (e.g. microemulsion phases), some of which can have a clear visual appearance and others of which can appear cloudy. The poor solubility of such higher C-number surfactants, whether these surfactants have ionic or polar head groups, typically has constrained their use in emulsification protocols for making oil-in-water (O/W) nanoemulsions, which typically have a very high surface-area-to-volume. In addition to not dissolving and remaining in solid form, some higher C-number surfactants can form very large micellar structures or microemulsion phases at high concentrations through attractive aggregation of the tails, leaving very few to almost no monomer surfactant molecules in a gas-like phase available to populate droplet interfaces that would otherwise be formed through flow emulsification. Thus, the availability of higher C-number surfactants to adsorb onto oil droplet surfaces can be constrained by the surfactant's solubility, and such adsorption is typically beneficial for reducing surface tension on droplet surfaces prior to emulsification as well as for providing long-term stability of droplets after emulsification.

However, if there might be an efficient method of getting higher C-number ionic surfactants to irreversibly adsorb onto the surfaces of droplets in order to generate a sufficiently high surface charge density on those droplets, beyond equilibrium adsorption that could be severely constrained by a surfactant's solubility (e.g. in water) at a particular temperature and pressure, then such a method could generate emulsions and/or nanoemulsions that have highly desirable properties, particularly enhanced stability even upon dilution with deionized water that does not contain surfactant molecules or other ions. Moreover, such highly stable emulsions and nanoemulsions could potentially have desirable photonic properties if the spacing between the droplets could be made uniform and if the refractive index of the droplets is different than that of the continuous phase. So, given the current approach regarding the creation of O/W emulsions and nanoemulsions, there remain unexplored possibilities for creating emulsions, and especially nanoemulsions, having especially high stability using irreversibly adsorbed surfactants, such as for example high C-number ionic surfactants, even upon extreme dilution with deionized solutions, compared to other types of emulsions and/or nanoemulsions that have been stabilized with surfactants, such as dodecyl sulfate, that adsorb and desorb in equilibrium from the surfaces of the droplets (or nanodroplets).

In addition to providing enhanced stability, when highly diluted with pure deionized water, such droplets and/or nanodroplets coated with irreversibly adsorbed high-C-number ionic surfactant molecules will typically interact through screened-charge electrostatic repulsions between their surfaces that have at least a minimum surface charge density of charged head groups. The Debye screening length $\lambda_D$ associated with these screened-charge repulsions would then be increased without destabilizing the emulsion, leading to enhancement of the repulsion between droplets over larger and larger range, the more the droplets are diluted and the ionic strength in the aqueous continuous phase is reduced. Once diluted, if the droplets are again sufficiently concentrated (e.g. by application of an osmotic pressure for instance through gravitational creaming, centrifugation, ultracentrifugation, centricon filtration, or dialysis) at such lower ionic strength in the aqueous continuous phase, then such charged droplets could form screened-charge-repulsive colloidal crystals that are hyperuniform and exhibit a color in the visible spectrum when illuminated with white light in a backscattering configuration. Moreover, such systems of droplets can also potentially create other classes of structurally hyperuniform materials including disordered hyperuniform materials that exhibit a color in the visible spectrum by diffraction and not absorption, particularly if the droplet size distribution is at least approximately uniform.

Nanoemulsions produced by typical high flow rate emulsification processes usually have wide droplet size distributions, such that the polydispersity of the droplet radial size distribution, specified as $\delta a/\langle a \rangle$, where $\delta a$ is the standard deviation of the droplet radial size distribution and $\langle a \rangle$ is the average of the droplet radial size distribution, is about 0.3 or larger. After direct production, such polydisperse nanoemulsions can be subsequently size-fractionated to reduce $\delta a/\langle a \rangle$ by repeated centrifugation and separation, provided that the mass density difference between the droplets (e.g. dispersed phase) and the continuous phase is greater than about 0.01 g/cm$^3$. When an emulsion at a droplet volume fraction $\phi$ that is less than about 0.2 is centrifuged at a high speed, an elastic plug of concentrated droplets will form at either the top or the bottom of the centrifuge tube. The plug will form at the top if the dispersed phase has a lower mass density than the continuous phase. Conversely, the plug will form at the bottom if the dispersed phase has a higher mass density than the continuous phase. The larger droplets travel to the end of the tube faster than the smaller droplets due to the difference in the steady-state velocities of sedimentation or creaming, which depend on the droplet size. So, the resulting plug of concentrated droplets has a gradient in droplet size. This plug can be physically divided into two or more pieces, since it is elastic, and the pieces will have reduced polydispersity compared to the original emulsion that had been loaded into the centrifuge tube. These pieces, in turn, can be separated from each other and dispersed in the continuous phase for further centrifugal separation. By repeating this centrifugation in conjunction with cutting the plug and combining like fractions, in a method known as centrifugal size fractionation, the polydispersity can be significantly decreased (e.g. $\delta a/\langle a \rangle$ can be made less than about 0.15) of the nanoemulsion.

By making and fractionating nanoemulsions having $\langle a \rangle$ less than about 100 nm, well below the range of wavelengths associated with visible light, it is shown that it is possible to create screened-charge-repulsive colloidal crystals of liquid nanodroplets that are highly opalescent, exhibiting strong Bragg diffraction of visible light at backscattering angles over large areas, reminiscent of solid opals. Here, by contrast to traditional opals made of solid materials, the photonic nanoemulsions form biliquid opals that are composed entirely of liquid phases that have self-assembled through charge repulsive interactions; moreover, these biliquid opals exhibit excellent stability against droplet coalescence. Moreover, by controlling both $\langle a \rangle$ and also the refractive index difference between the dispersed and continuous phases (e.g. according to the principles of Mie scattering theory), the typically undesirable effects of multiple scattering, which can lead to a white, hazy appearance, can be limited. It is noted here that opalescence and iridescence have technical explanations that are based on the physics of scattering of a polychromatic illumination (e.g. directional incident white light) by a material that possesses at least a form of long-range order that leads to color separation by diffraction from the ordered structure within the material; the color viewed can depend on angle. It is noted also that common understanding of opalescence and iridescence, which include multi-color, lustrous, shimmering, and rainbow-like, are not accurate technical descriptions.

By using an oil-in-water (O/W) emulsion made using a special route of formulation involving effectively insoluble octadecyl sulfate anions with a high C-number $N_C=18$, resulting from adding sodium octadecyl sulfate (SOS) to water and flow-emulsifying with a dispersion of a silicone oil, here it is shown that highly stable emulsions and/or nanoemulsions can be created that resist coalescence even after repeated dilution with deionized (DI) water and re-concentration using centrifugation. By contrast, O/W emulsions made using exactly the same method but using soluble dodecyl sulfate anions with lower $N_C=12$, resulting from adding sodium dodecyl sulfate (SDS) to water and flow-emulsifying with the same dispersion of silicone oil, destabilize after repeated dilution with deionized water and re-concentration using centrifugation. Moreover, it is shown that the highly stable SOS-stabilized O/W emulsions and/or nanoemulsions of silicone-oil having an average droplet radius $\langle a \rangle$ between about 30 nm and about 100 nm form very bright screened-charge-repulsive opals after very modest fractionation of droplet sizes and reconcentration using centrifugation. When illuminated with directional white light, these crystals exhibit colorful opalescence (e.g. Bragg diffraction) resulting from the periodic spacing of repulsive droplets which are allowed to freely rearrange upon dilution with deionized (DI) water. The refractive index difference between the silicone oil and the water also plays an important role in the visual appearance of the emulsion and/or nanoemulsion, and a sufficient difference in refractive index can provide adequate diffraction of the white visible light to generate bright opalescence. Thus, it is shown that the resulting form of soft matter produced through this route is a biliquid opal of charge-repulsive nanoscale droplets that is highly stable. This biliquid opal form of matter differs from natural and synthetic solid opals (solid colloidal objects in a solid continuous phase) and also from charge stabilized colloidal crystals of solid polymer or solid inorganic particles (solid colloidal objects in a liquid continuous phase). Moreover, beyond producing ordered biliquid opals of nanodroplets that have crystal size with maximal spatial dimensions from less than about 1 mm up to about 10 mm, it is also shown that strongly colored hyperuniform biliquid nanoemulsions can be created and tuned, which retain some disorder but have a very well defined average separation between droplets that, when illuminated with white light, causes wavelength-selective scattering of a particular color (e.g. narrow range of wavelengths) at a certain viewing angle.

II. Materials and Methods

Demonstration is made of a method of making charge-stabilized photonic nanoemulsions using a competitive adsorption technique where a previously made nanoemulsion (with given short chain sulfate surfactant, $\langle a \rangle$, and size distribution) is treated with a solution of a sulfate surfactant with a longer aliphatic chain length. The longer chain surfactant is able to displace the original surfactant from the droplet's interface while adsorbing practically irreversibly to the droplet's interface.

The nanoemulsions chosen for this method are oil-in-water nanoemulsions made through the homogenization (high flow rate emulsification, HFRE) of a pre-mix emulsion made with 10 cSt polydimethylsiloxane trimethyl terminated (abbreviation: PDMS, manufacturer: Gelest, viscosity 10 cSt, mass density $\rho=0.935$ g/mL) and an aqueous solution of sodium dodecyl sulfate (abbreviation: SDS, manufacturer: Fisher BioReagents, 99%). These nanoemulsions are size fractionated to narrow the droplets size distribution by following a procedure outlined in FIG. 1 and detailed below. This size fractionated nanoemulsion is treated with an aqueous solution of sodium octadecyl sulfate abbreviation: SOS, manufacturer: ACROS Organics, 99%); then the SDS is washed away through a repeated series of wash steps (N), also detailed below. The washed concentrated nanoemulsion plug is diluted with DI water in order to produce brilliant colloidal crystals or a colored non-crystalline hyperuniform state.

In order to determine the long and short chain surfactants, testing is made of the stability of multiple simple sulfate surfactants; sodium dodecyl sulfate, sodium n-tetradecyl sulfate (abbreviation: STS, manufacturer: Alfa Aesar, 95%), sodium n-hexadecyl sulfate (abbreviation: SHS, manufacturer: Alfa Aesar, 99%), and sodium n-octadecyl sulfate. This was done by producing oil-in-water nanoemulsion for each surfactant while keeping the oil constant (10 cSt PDMS) then washing the resulting nanoemulsion with DI water repeatedly, using a similar wash step procedure.

II.A.i Opalescent and Hyperuniform Nanoemulsions by Competitive Adsorption-Desorption An oil-in-water pre-mix emulsion is made by slowly adding 10 cSt PDMS oil to a 50 mM SDS surfactant solution in deionized water (Millipore Milli-Q Academic, resistivity≈18 MΩ-cm) while the surfactant solution is agitated with a hand mixer (PowerGen, model 125S1, speed set at 6 on the adjustable dial, saw-tooth bottom stator) for 5 minutes. The weights of sodium dodecyl sulfate and 10 cSt polydimethylsiloxane will vary depending on the total volume of pre-mix emulsion however, the volume fraction φ is kept constant at 0.15. The emulsion droplets' average hydrodynamic radius (<a>) is reduced further, without changing the pre-mix emulsion's composition, by exposing it to a high pressure and high strain-rate flow environment using a microfluidic homogenizer (Microfluidics M-110P homogenizer: 75 μm Y-type diamond interaction chamber with a cooling coil submerged in an ice water bath, 8 passes).

The resulting nanoemulsion is droplet size fractionated through the use of centrifugation (Beckman L8-55 ultracentrifuge: swinging bucket SW-28 rotor, polycarbonate tubes, 18,000 rpm for 19 hours). Centrifugation causes the droplets to cream (when the silicone oil is less dense than water), and the droplets form a concentrated emulsion as a white opaque elastic plug at the top of the tube. The droplets creaming rates are dependent on their size so larger droplets cream faster and be found at the top of the plug while smaller droplets cream slower and can be found at the bottom of the plug. This elastic plug is physically removed from the polycarbonate centrifuge tube with a small flat metal spatula and cut into two equal pieces with the small metal spatula or razor blade. Similar cuts (fractions) are combined and dispersed in 10 mM SDS aqueous solution and centrifuged again. This size fractionation process is repeated a total of three times to account for the imperfections in this droplet-size-separation-by-creaming process (e.g. small droplets trapped near the top of the plug because they initially started there before the centrifugation started).

Measurement is made of the average radius <a> of the size fractionated nanoemulsion by using a dynamic light scattering instrument (DLS, Photocor, wavelength λ=633 nm, scattering angle of 90 deg, intensity weighted) which calculates <a> as well as an uncertainty for the standard deviation of the mean (not the standard deviation of the entire size distribution). This involves the dilution of a portion of this nanoemulsion to a final volume fraction $\varphi \approx 10^{-4}$-$10^{-5}$ in order to prevent multiple scattering. The sample can be added back to the stock nanoemulsion in preparation for the next part of the procedure so no droplets are lost during this step.

Figure 2:
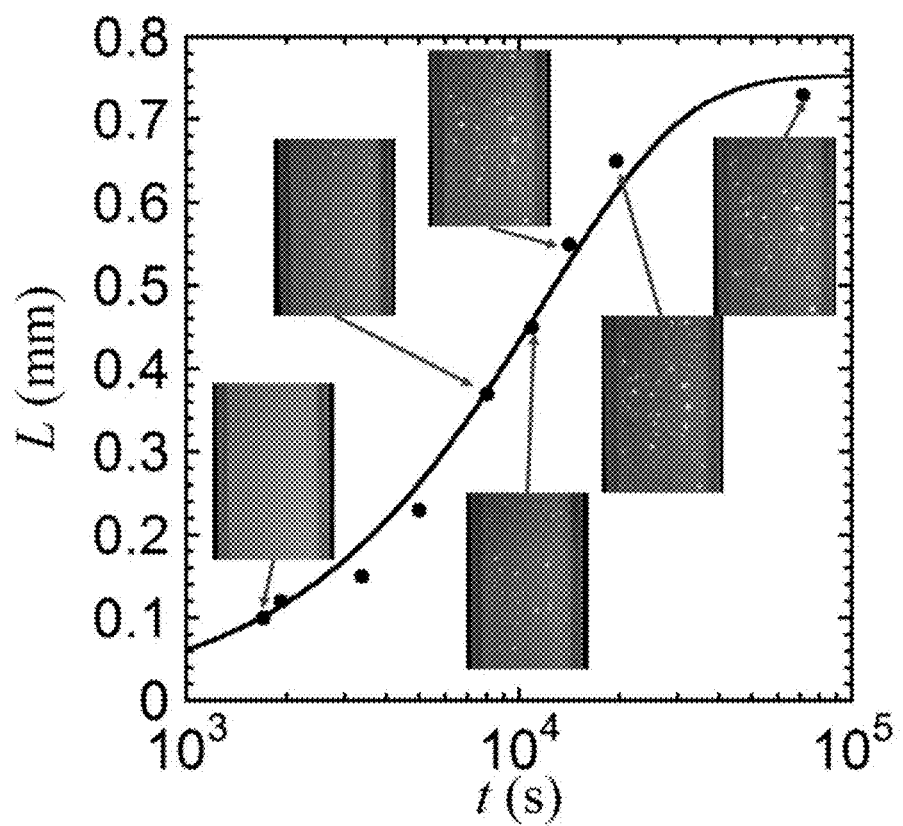
FIG. 2 describes crystallization formation kinetics for a monodisperse nanoemulsion tracked by measuring the longest crystal side (L) present in the sample as time (t) progresses after dilution. The size fractionated nanoemulsion (<a>=48 nm) was washed four times after SOS treatment and diluted to $\phi=0.016$ and electrical conductivity $\sigma_e$=16 µS/cm. As time progresses, the colloidal crystals grow in size as shown in the increasing trend in crystal length. The colloidal crystals also become more prevalent (increase in crystal volume fraction) in the nanoemulsion which is shown by the picture insets. Line: Empirical fit with L=c*(1−e$^{-t/b*}$), where c*=0.74 mm and b*=1.1×10$^4$ s. Photograph insets: Photographs are taken as the NEM droplets form colloidal crystals and correspond with their measured crystal lengths (red arrows).

These size fractionated nanoemulsions are diluted (dilution factor≈20×) with a 5 mM SOS(aq) aqueous solution and heated to 75° C. using a hot water bath (Thermo Scientific Neslab RTE7 water bath with a Digital Plus temperature controller) for 30 min. This heating ensures that the sodium octadecyl sulfate (SOS), which is insoluble at room temperature and atmospheric pressure, becomes completely soluble in the aqueous phase and can interact with the droplets interface and preferentially competitively adsorb (displacing the SDS which is largely desorbed). After these hot nanoemulsions cool to room temperature (≈23° C.), they are washed by repeated centrifugation (18,000 rpm for 8 hours) and DI water dispersion wash steps. The wash step procedure starts by removing the aqueous phase outside of the concentrated nanoemulsion plug, then the concentrated plug is dispersed the with DI water and centrifuged to create the plug which corresponds with that wash step. The centrifugation time is shortened during this step because the plugs do not need to be as elastic (not as concentrated) due to the fact that they do not need to be precisely cut or extensively handled during the wash steps. Instead of removing the plug from the tube during these wash steps, the nanoemulsion plug is gently pushed to one side and the aqueous phase is decanted. This wash procedure continues until the nanoemulsion's electrical conductivity <20 μS/cm (≈3 washes). At this point, portions of the nanoemulsion are removed, diluted with DI water, and allowed to sit for a day to see if the nanoemulsion will crystallize (FIG. 2). The same procedure is used to make colored hyperuniform samples, however the color appears shortly (<5 seconds) after the nanoemulsion is homogenously diluted.

Three samples containing nanoemulsion crystallites, wherein the crystallites within each sample have a different color in backscattering (e.g. through diffraction) when illuminated with white light, were obtained using three different nanoemulsion samples with particular combinations of <a> and φ. As shown in FIG. 3, a nanoemulsion with <a>=40 nm, φ=0.021, and $\sigma_e$=11 μS/cm yields crystals that backscatter blue light, <a>=48 nm, φ=0.016, and $\sigma_e$=16 μS/cm yields crystals that backscatter green light, and <a>=80 nm, φ=0.021, and $\sigma_e$=16 μS/cm yields crystals that backscatter red light. The sample that produced crystals that scatter green light can be taken and its φ can be changed to trap it in a non-crystalline hyperuniform state where the nanoemulsion appears to backscatter predominantly one wavelength when illuminated with white light. As shown in FIG. 4, when φ=0.05 a hyperuniform nanoemulsion having <a>=48 nm backscatters blue light, when φ=0.03 a hyperuniform nanoemulsion backscatters green light, and when φ=0.015 a hyperuniform nanoemulsion scatters red light.

II.A.ii Nanoemulsion Stability Dependence on Increased Aliphatic Chain Length

In this section, the emulsification and wash procedures are similar to the above section except there is no need for surfactant exchange, since the nanoemulsions in this section are produced directly from the desired final surfactant, such that SDS is not used in this process to produce nanoemulsions that have SOS, SHS, and STS surfactants. Four different PDMS oil-in-water nanoemulsions are produced (30,000 psi, 8 passes, 50° C., φ=0.15) from a pre-mix emulsion, using $2.68 \times 10^{-4}$ mol of solid SOS, SHS, STS, or SDS added to 50 g of deionized water. The emulsions are heated so that the added SOS and SHS could completely dissociate and dissolve into the aqueous phase. The temperature was kept at 50° C. for the nanoemulsion made with STS and SDS, even though both of these surfactants are soluble at this concentration at room temperature; so, all the nanoemulsions described in this section were produced at the same temperature conditions to ensure uniformity of comparison. All four of the nanoemulsions are washed with DI water however the procedure is modified from the washing process described in the previous section.

Figure 5:
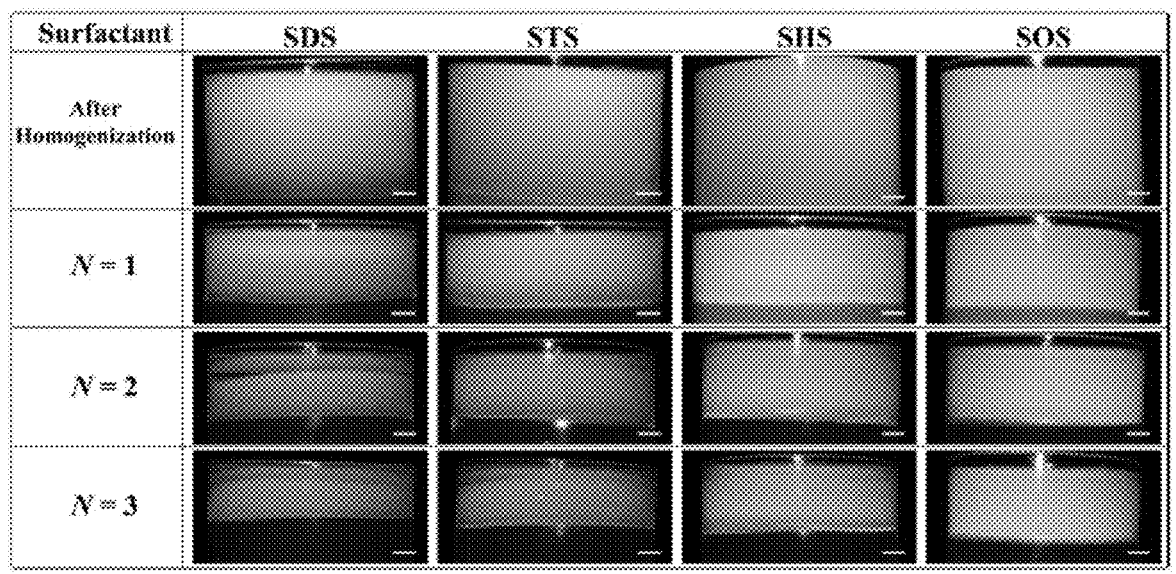
FIG. 5. Comparison is made of the effect of surfactant chain length on the opalescent nature of the resulting oil-in-water nanoemulsion (stabilizer: see surfactant in top row of figure, oil: PDMS 10 cSt) as a function of wash steps (N). Each surfactant is able to create a stable oil-in-water nanoemulsion after homogenization (no visible coalescence on top of the plug), however as the NEM is washed, both SDS (wash steps 2 and 3) as well as STS (wash step 3) show signs of coalescence. The NEM containing STS has a blue band along the bottom of its plug (N=1 to N=3) indicating a hyperuniform state however, no crystallites were observed. The nanoemulsions stabilized with SHS and SOS also have a band of color along the bottom of the plugs (N=1) however, in subsequent wash steps, iridescence is observed. The NEMs produced with SHS and SOS showed a thin layer (<0.05 cm) of coalescence throughout the three wash steps. Crystalline regions are present at the bottom of the white opaque plugs for both oil-in-water nanoemulsions stabilized with SHS (blue and green crystals, N=2 and 3, <a>=61±3 nm) and SOS (red and green crystals, N=2 and 3, <a>=68±2 nm). The colors in the crystalline regions above depend on the viewing angle relative to the light source, so these colors result from optical diffraction, not absorption. In the remaining portion of the plug, the droplets are in a jammed disordered structure that does not have a well-defined characteristic spatial periodicity, so the plug multiply scatters light and appears white. (Scale bar=0.3 cm).
Figure 6:
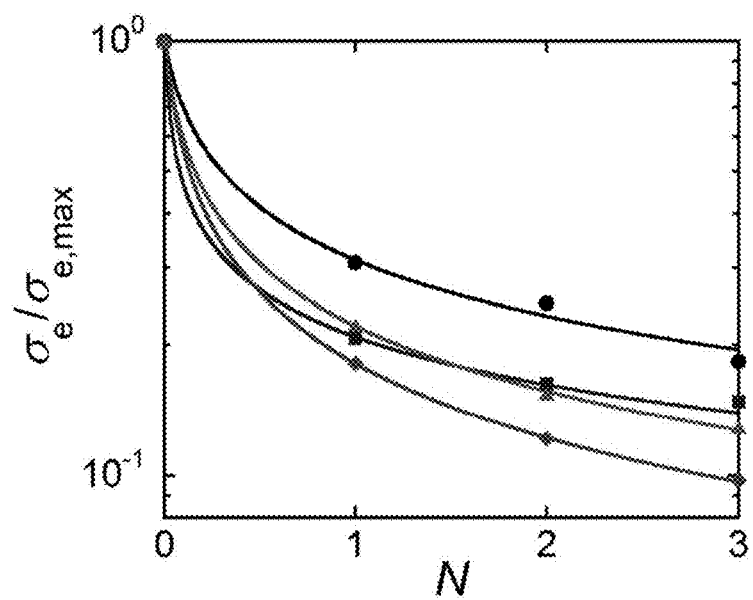
FIG. 6. shows the electrical conductivities ($\sigma_e$) for these oil-in-water nanoemulsions (stabilizers: SDS (black circle), STS (blue square), SHS (green diamond), and SOS (red triangle); oil: PDMS 10 cSt) are measured for each wash step (N) and normalized to its electrical conductivity after homogenization ($\sigma_{e,max}$ (µS/cm)=86.4 (SDS), 69.6 (STS), 74.0 (SHS), and 53.0 (SOS)). Blue and green crystalline regions are present during the second wash step ($\sigma_e$=9.0 µS/cm) and persists to the third wash step for the oil-in-water nanoemulsion stabilized with SHS. Red and green crystalline regions are present during the second wash step ($\sigma_e$=8.0 µS/cm) and persists to the third wash step for the oil-in-water nanoemulsion stabilized with SOS. (Line) Empirically fit with $\sigma_e/\sigma_{e,max}=1/(1+(N/c))^b$ where c=0.08 and b=0.45 (SDS, black line), c=0.01 and b=0.36 (STS, blue line), c=0.06 and b=0.60 (SHS, green line), and c=0.06 and b=0.52 (SOS, red line); all correlation coefficients of fits have $R^2$>0.97.

After the nanoemulsions are centrifuged (right after they have been homogenized), the top half of the resulting elastic plug is removed and discarded, leaving just the bottom half of the plug which will continue on in the washing process (called the zeroth wash step). The bottom portion of the plugs are subjected to three consecutive wash steps (centrifuged at 17,400 rpm for 6 hours) and photographed at the end of each centrifugation to observe the degree of coalescence present in each plug (FIG. 5). The electrical conductivity $\sigma_e$ is measured using a portable conductivity meter (Apera Instruments PC400S) for each nanoemulsion at each wash step after the nanoemulsion is suspended but before it is concentrated. The $\sigma_e$ of the nanoemulsions decrease as the nanoemulsions are washed with DI water as shown in FIG. 6.

Coalescence is observed during wash step 2 for the nanoemulsion made with SDS (0.3 cm thick layer) as well as during wash step 3 for the nanoemulsions made with SDS and STS (0.2 cm thick layer for each). The nanoemulsions made with SHS and SOS had a thin layer of coalescence (<0.05 cm) during wash step 2 and 3. There is no observed opalescence in the nanoemulsions made with SDS or STS; however, the STS nanoemulsion has a vibrant blue band along the bottom of the plug in wash step 1, 2, and 3. Nanoemulsions made using SHS and SOS, respectively, each exhibit a band of opalescence at the bottom of the plug after completing centrifugation for both wash steps 2 and 3. NEMs made using SHS yield a predominantly blue-green opalescent band, whereas NEMs made using SOS yield a predominantly green-red opalescent band. Both nanoemulsions containing SHS and SOS are also observed to have green-red colored bands at the bottom of their plugs in wash step 1 (FIG. 5). The <a> of the opalescent regions of the SHS and SOS plugs were measured to be 61±3 nm and 68±2 nm, respectively, by sampling these regions and using dynamic light scattering.

III. Discussion

Throughout the procedures provided above and in the supplementary section, demonstration is made that there are multiple different pathways that can be used to form iridescent biliquid opals, resulting from Bragg diffraction of oil nanodroplets that have been self-organized into stable colloidal crystals by reduction of ionic content in the continuous aqueous phase. These biliquid opals are made possible through the use of high C-number surfactants that irreversibly adsorb onto droplet surfaces, thereby conferring an increased stability against dilution as a consequence of the choice of surfactant type and non-equilibrium history of preparation. Photonic opalescent nanoemulsions are successfully made from two different silicone oils as well as two different surfactants by an emulsification method followed by repeated washes. Also shown is that the stability of the NEMs increases as the C-number of the alkyl sulfate surfactant is raised, assessed by diluting the NEM with deionized water, reconcentrating it via centrifugation or ultracentrifugation, and observing the amount of oil droplet coalescence subsequent to this dilution and reconcentration. Also demonstrated is the ability to produce bulk colloidal crystals on the millimeter scale which strongly backscatter light having wavelengths in the visible spectrum using liquid droplets with nanoscale <a><100 nm.

Figure 3A:
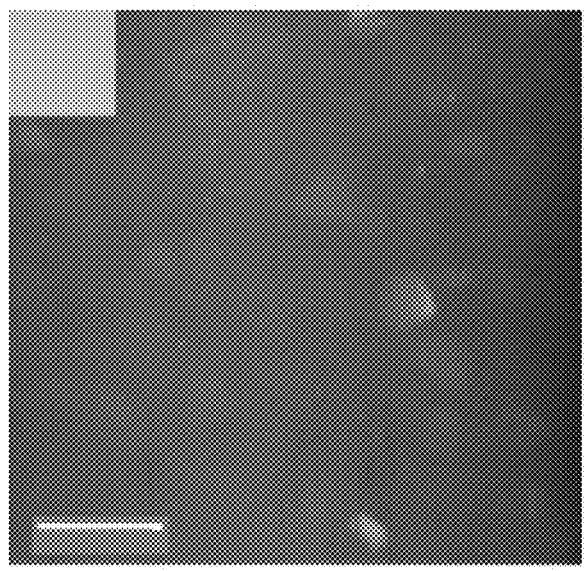
FIGS. 3A-3C show photographs of three different size-fractionated nanoemulsion samples produced using the surfactant exchange procedure which formed three differently colored colloidal crystals, imaged in a backscattering configuration. These samples were photographed between 3 and 5 days after the concentrated nanoemulsions were diluted with DI water.
Figure 3B:
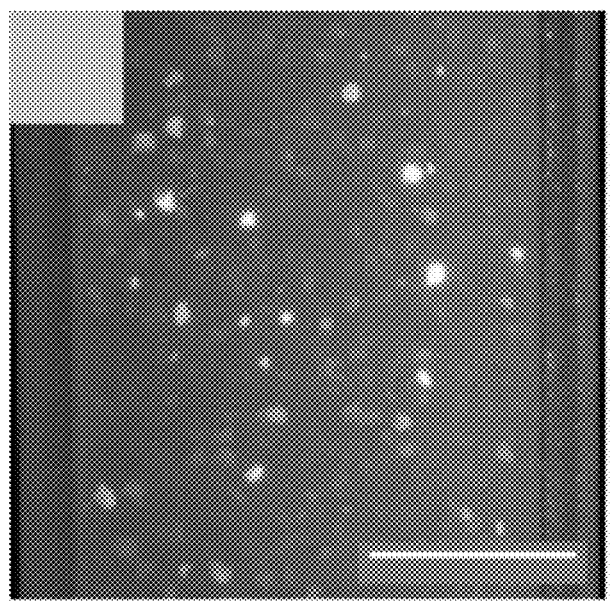
Figure 3C:
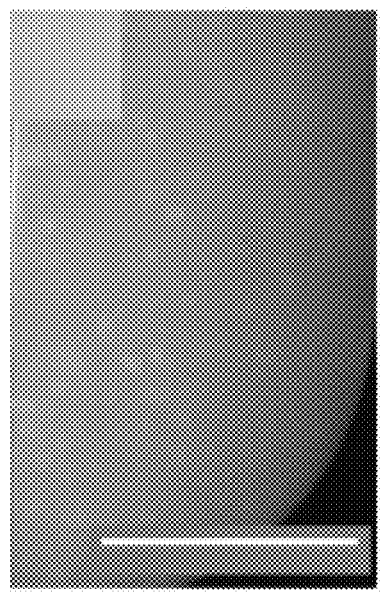
Figure 4A:
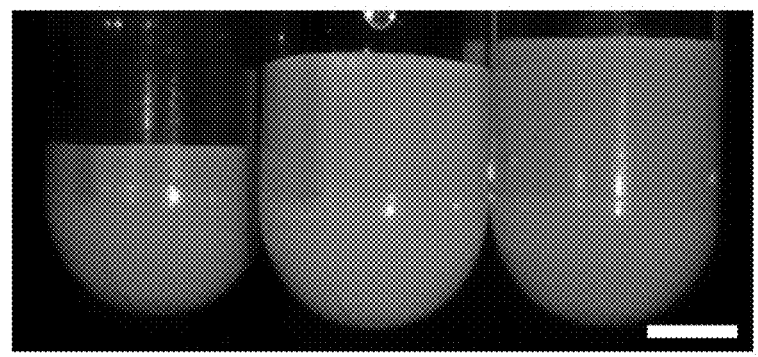
FIGS. 4A-4B.
Figure 4B:
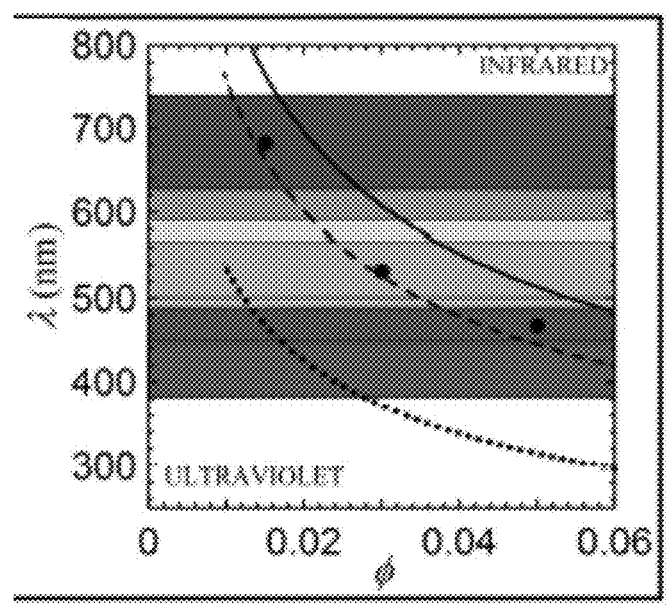

It is shown that bulk crystal formation can yield scattered light spans the visible wavelengths, FIGS. 3A-3C, akin to colloidal crystals made with inorganic and polymer particles. These colloidal crystals have a crystalline volume fraction which ranges from 30% to 50% depending on the size and chemical makeup of the container as well as the length of time the sample remains undisturbed. When the NEM is diluted in a plastic (polycarbonate) container, the crystals tend to grow to a larger size compared to when they are grown in glass. This is most likely due to ions leaching over time from the surface of the glass into the NEM, thereby slightly increasing the ionic content and decreasing the screening length over time. This effect can be minimized by washing and soaking the glass container in DI water with a mixed bed ion exchange resin; an example of crystals grown in washed glass containers is shown in FIG. 3B. Another factor which will influence the crystal growth is the time that the sample is left undisturbed and in a sealed environment however, the majority of crystal growth happens within 24 hours (FIG. 2).

Manipulation can be made of the overall color of the NEM without producing crystals but through hyperuniform backscattering diffraction by controlling $\varphi$ while keeping <a> constant in the absence of optically absorbing colored additives. In FIG. 3, the more concentrated NEM's ($\varphi \approx 5\%$) blue color is due primarily to hyperuniform backscattering (close but not identical to satisfying the Bragg backscattering condition). Likewise, the green hyperuniform NEM ($\varphi \approx 3\%$) and red hyperuniform NEM ($\varphi \approx 1.5\%$) also have corresponding colors that are due to backscattering diffraction from a larger average separation between droplets that have a hyperuniform structure but not strictly long-range crystalline order. Modeling is made of this phenomena by calculating the expected backscattered wavelength based off the primitive cells for simple cubic (SC), body-centered-cubic (BCC), and face-centered-cubic (FCC) as detailed in Appendix A. Each of the samples are assigned a wavelength by comparing the observed color with a color chart. This assigned wavelength was plotted against the measured volume fraction of the respective nanoemulsion sample, then comparison is made of this volume fraction to the expected scattered wavelengths in a FCC lattice, FIG. 4. The predicated scattered wavelengths from the nanoemulsion are in good agreement with the predicted wavelengths of scattered light in a FCC lattice, however they correlate best with the {200} not {111} Miller indices.

Figure 7A:
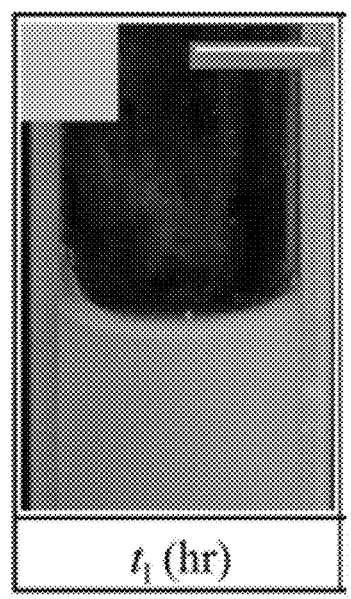
FIGS. 7A-7E. Series of photographs detailing colloidal crystal formation from a concentrated nanoemulsion plug and addition of DI water, imaged in backscatter. The time (ti) that elapsed after the concentrated nanoemulsion is diluted with DI water is listed beneath their respective images.
Figure 7B:
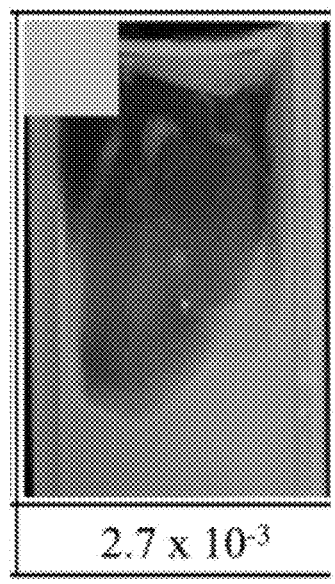
Figure 7C:
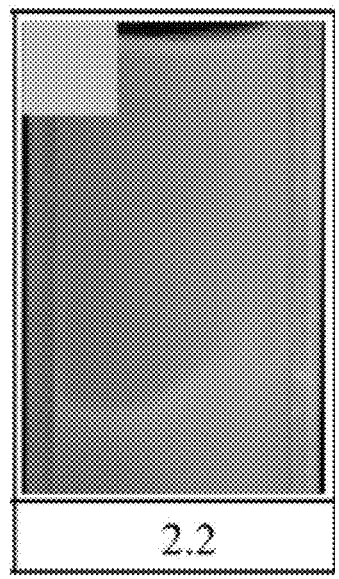
Figure 7D:
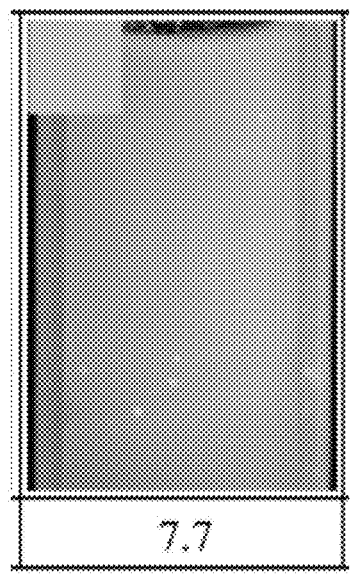
Figure 7E:
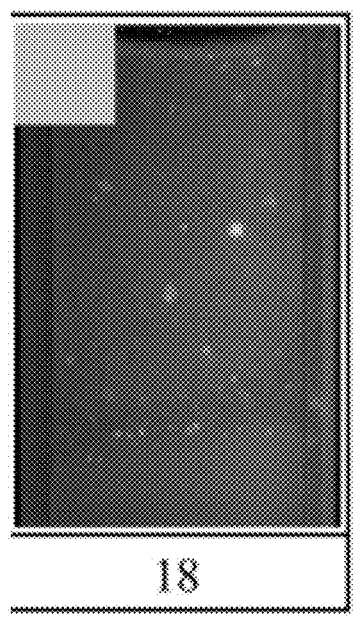

Also observed is crystal formation by diluting a concentrated NEM with DI water by layering the water on top of the NEM being careful not to prematurely mix the two layers. FIGS. 7A-7E shows a series of photographs taken at selective time points to illustrate this observation. The concentrated NEM appears blue however, as the NEM droplets start to mix with the DI water and become dilute, more colors begin to appear (FIGS. 7A-7C). As shown in FIG. 4, the colors observed in FIG. 7C correlate with the expected $\varphi$ in each part of the container; red near the top where the NEM is most dilute to yellow, green and blue as the NEM is more concentrated. In this experiment, the hyperuniform state is transient as the NEM will begin to crystallize. In FIG. 7D-7E, the crystals grow in size and number until the NEM near the top of the tube begins to jam. At this point the crystals movement becomes slower and no large increases in crystal growth are observed. The color of the crystals present in FIG. 7E correspond with the expected $\varphi$ in each part of the container; green crystals are present in the more dilute portion of the sample while cyan crystals are present in the more concentrated regions.

Figure 8A:
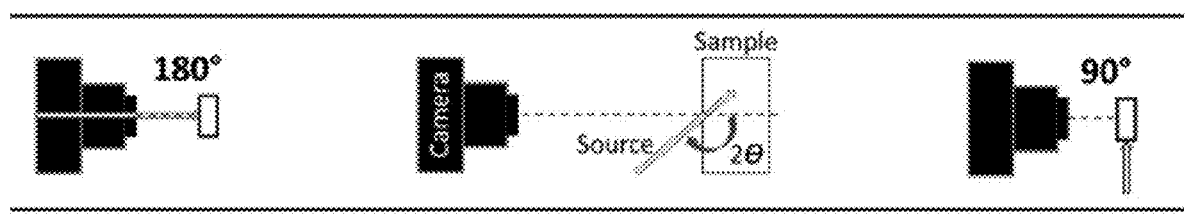
FIGS. 8A-8B.
Figure 8B:
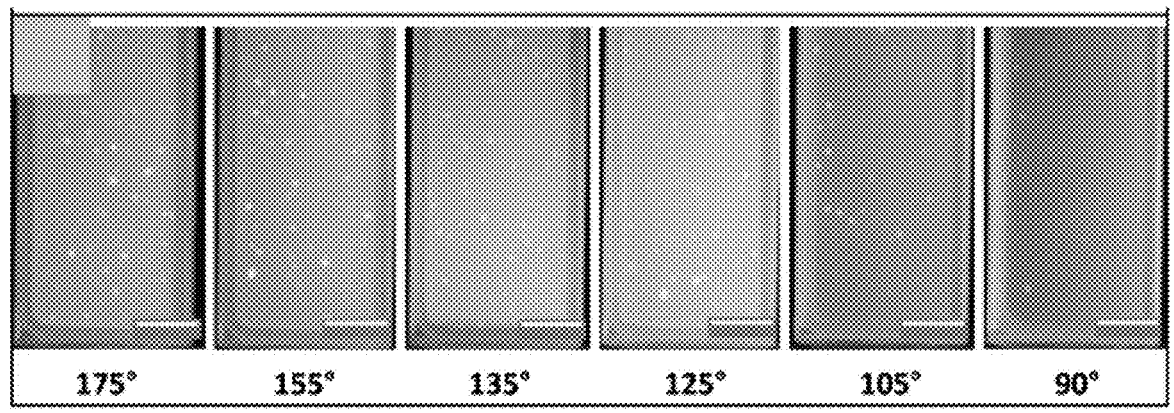

Observed is the angle-dependent color-selectivity in the diffraction from opalescent NEMs, which is indicative of Bragg scattering and can be expressed in the context of ordered NEMs as: $m\lambda = 2dn_{eff}\sin(\theta)$, where m is an integer, d is an average spacing between ordered planes of droplets in a crystal, $n_{eff}$ is the effective refractive index of the NEM which can be estimated as $n_{eff} = n_{oil}\varphi + n_{wat}(1-\varphi)$ based on an effective medium approximation, $n_{oil}$ represents the refractive index of oil, $n_{wat}$ represents the refractive index of water, and $2\theta$ is the scattering angle. The refractive index enters into the Bragg formula because the wavelength associated with scattering condition is reduced in a dielectric medium (compared to vacuum or air which has a refractive index very close to vacuum). Herein, when reference is made to wavelength $\lambda$, this typically refers to wavelength in vacuum or air, not in the dielectric medium; the property of color of light is most rigorously defined using frequency of the electromagnetic radiation, which is the same in vacuum, in air, and in a dielectric medium. For droplet radii and volume fractions in the ranges typical of the experiments herein, the integer m (order of scattering) is equal to 1 in order to have wavelengths (in air) in the visible spectrum; larger values of m would cause the wavelengths to be in the ultraviolet. As the scattering angle is decreased from back-scattering (e.g. decreased from $2\theta = 180°$), the $\sin(\theta)$ factor decreases and the color-selective diffraction wavelength is reduced. As shown in FIG. 8, when illuminated with white light, a NEM has crystallites that backscatter green light at $2\theta \approx 180°$ but instead these crystals scatter bluish cyan light when the scattering angle is decreased to $2\theta=90°$. A more complete discussion of the equations related to Bragg scattering for different crystal types and crystal planes, identified in terms of Miller indices, is given in Appendix A.

Also demonstrated is a direct emulsification method to make bulk colloidal crystals by making and homogenizing the pre-mix emulsion at 75° C. While the resulting nanoemulsion was able to form colloidal crystals, FIG. 9, they were not able to grow to the size observed for the nanoemulsions made by competitive adsorption. This could be attributed to the differences of the two surfactants, SDS and SOS, and their ability to stabilize new droplet interfaces produced in the homogenizer. The increased solubility of SDS could help it adsorb onto the new interfaces and stabilize them before the droplets coalesce while SOS may not be as effective in this particular aspect.

Figure 10:
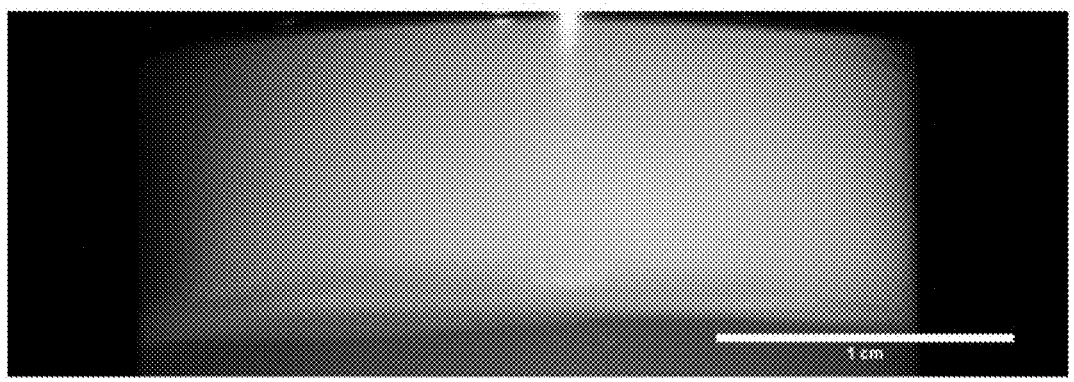
FIG. 10. Oil-in-water nanoemulsion after centrifugation and 4 washing steps (stabilizer: SOS; oil: PDMS 10 cSt). At the bottom of the plug of concentrated droplets, a biliquid opal is formed as a consequence of droplet crowding and screened-charge repulsions between the negatively charged interfaces of droplets. Washing has reduced the ionic strength in the continuous aqueous phase, thereby increasing the Debye screening length associated with the screened-charge repulsion. Red, blue and green crystalline regions are present at the bottom of the white opaque plug ($<a>=95\pm1$ nm); the colors depend on the viewing angle relative to the light source, so these colors result from optical diffraction, not absorption. A minor amount of coalescence (oil droplets merging into an oil layer) can be seen at the top of the plug. In between, the droplets are in a jammed disordered structure that does not have a well-defined characteristic spatial periodicity, so the plug multiply scatters light and appears white.

While room temperature emulsification with SOS will yield an opalescent NEM (FIG. 10), the amount of droplets that coalesce can be decreased. There was a noticeable decrease in coalescence when the pre-mix and homogenizer were heated to 50° C. which is most likely due to an increase in SOS's solubility (FIG. 5). If there are more SOS molecules in solution during the emulsification process, then more SOS molecules have a chance to populate newly formed interfaces. The addition of HCl (aq) and acidic isopropanol also decreased the amount of coalescence throughout the wash steps (FIGS. 12-15, and 16). In the case of HCl (aq), the acid may be protonating some of the sulfate head groups changing the surfactant's affinity for the oil phase. Over multiple wash steps, as the hydrophilic acid is washed away, the head groups will deprotonate becoming charged on the interface. Addition of acidic isopropanol is more complicated due to the fact that isopropanol can be a cosurfactant and solvent (for PDMS), both of which will lead to a reduced <a> (<a>=58 nm compared to <a>=95 nm).

Figure 11:
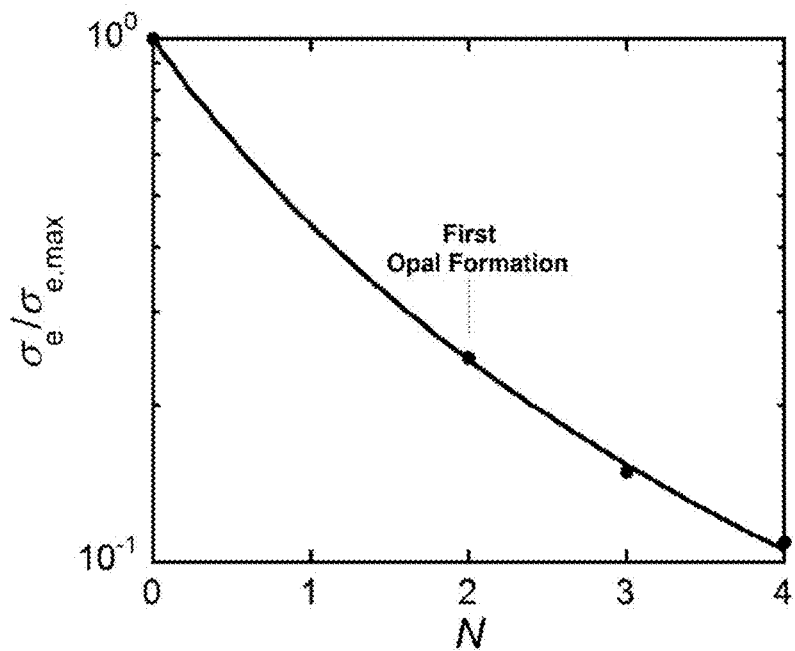
FIG. 11. The electrical conductivities ($\sigma_e$) of this oil-in-water nanoemulsion (stabilizer: SOS; oil: PDMS 10 cSt) are measured for each wash step (N) and normalized to its electrical conductivity after homogenization ($\sigma_{e,max}=22$ $\mu$S/cm). Red, blue and green crystalline regions are present during the second wash step ($\sigma_e=5$ $\mu$S/cm) and persists through subsequent wash steps. (Line) Empirical fit to $\sigma_e/\sigma_{e,max}=1/(1\pm(N/c))^b$, where c=2.1 and b=2.1; $R^2=0.999$.
Figure 12:
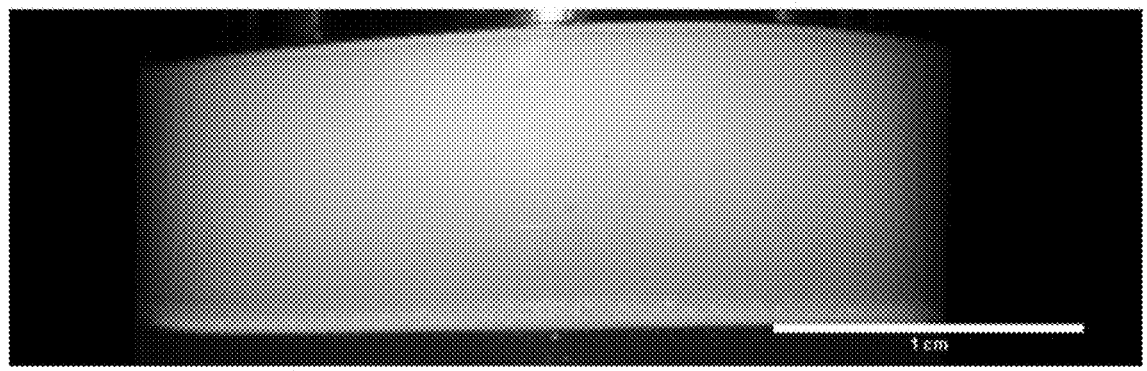
FIG. 12. Oil-in-water nanoemulsion after centrifugation and 4 wash steps (stabilizer: SOS in HCl (aq); oil: PDMS 10 cSt). At the bottom of the plug of concentrated droplets, a biliquid opal is formed as a consequence of droplet crowding and screened-charge repulsions between the negatively charged interfaces of droplets. Washing has reduced the ionic strength in the continuous aqueous phase, thereby increasing the Debye screening length associated with the screened-charge repulsion. Blue and green crystalline regions are present at the bottom of the white opaque plug ($<a>=110\pm2$ nm); the colors depend on the viewing angle relative to the light source, so these colors result from optical diffraction, not absorption. In the remaining portion of the plug, the droplets are in a jammed disordered structure that does not have a well-defined characteristic spatial periodicity, so the plug multiply scatters light and appears white.
Figure 13:
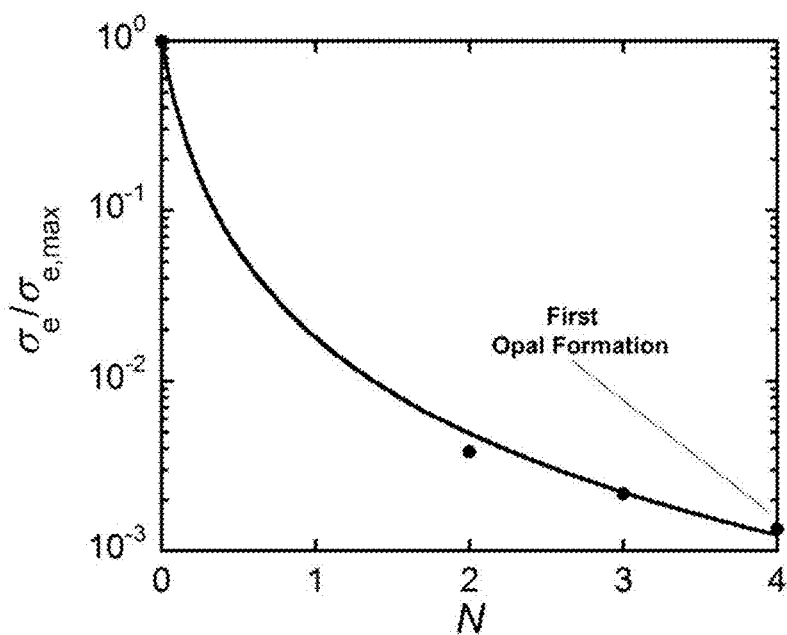
FIG. 13. The electrical conductivities ($\sigma_e$) of this oil-in-water nanoemulsion (stabilizer: SOS in HCl (aq); oil: PDMS 10 cSt) are measured for each wash step (N) and normalized to its electrical conductivity after homogenization ($\sigma_{e,max}=20$ mS/cm). Blue and green crystalline regions are present during the second wash step ($\sigma_e=27$ $\mu$S/cm). (Line) Empirical fit to $\sigma_e/\sigma_{e,max}=1/(1\pm(N/c))^b$, where c=0.2 and b=2.1; $R^2=0.999$.
Figure 17:
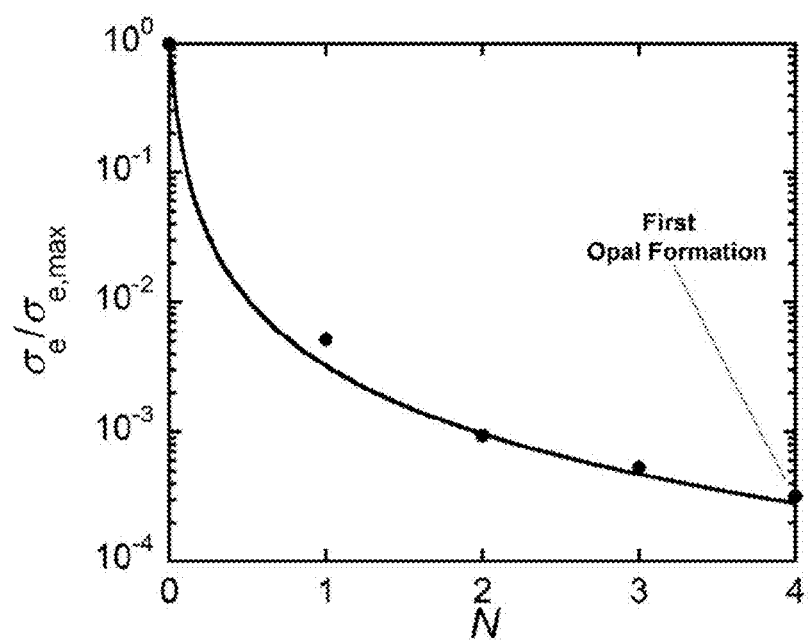
FIG. 17. The electrical conductivities ($\sigma_e$) of this oil-in-water nanoemulsion (stabilizer: SOS in acidic isopropanol; oil: PDMS 10 cSt) are measured for each wash step (N) and normalized to its electrical conductivity after homogenization ($\sigma_{e,max}$=37 mS/cm). Red, yellow, and green crystalline regions are present during the second wash step ($\sigma_e$=12 µS/cm). (Line) Empirical fit to $\sigma_e/\sigma_{e,max}$=141+(N/c))$^b$ where c=0.04 and b=1.8; $R^2$=0.999.

The conductivity decrease for NEMs made without any acidic component is about one order of magnitude (FIG. 6 and FIG. 11) while NEMs made with an acidic component is over two orders of magnitude (FIGS. 13 and 17). The electrical conductivity decreases as the NEMs progresses through the wash steps because the ionic species in the bulk continuous phase are removed and replaced with deionized water. There is a bigger difference between the conductivities of the first and last wash step for NEMs made with HCl(aq) or acidic isopropanol are due to the contribution of the hydrophilic acid to the overall conductivity of the NEM.

While there are multiple examples of iridescent or opalescent colloidal crystals, these primarily rely on solid particles or micron sized liquid droplets made of either inorganic or organic polymer. The material designed herein is substantially different from these examples. Solid suspended particles, dispersions, have covalently bound ionically charged species which prevent aggregation and provide repulsive interactions to form a crystal lattice. Emulsion systems do not have any covalently bound charges but instead rely on adsorption (reversible in most cases) of surfactant molecules which stabilize the oil droplet's interface either by charge repulsion or steric interactions. Due to the reversible nature of this adsorption, more surfactant should be added during each dilution step or the interface will become less populated which can lead to coalescence (e.g. SDS in FIG. 5). In the method provided herein, design is made of a procedure to overcome many of the drawbacks associated with using an emulsion system and produced colloidal crystals from long range ordering of nanoscale droplets. Addition of surfactant during each dilution can be omitted due to the nature of the surfactant adsorption in the nanoemulsions which allows dilution and washing the nanoemulsions with DI water. This increases the Debye screening length to such an extent that the Debye screening length (calculated for a salt, NaCl) becomes comparable to <a> when the opalescent and hyperuniform conditions, stated above, are met ($\sigma_e$=20 to 10 μS/cm, $\lambda_D$=24 to 34 nm). The electrical conductivities reported herein are nanoemulsion conductivities, not aqueous conductivities of salts which implies that the Debye screening length would be slightly higher if the charged droplet contributions were removed from the electrical conductivity signal. Even at these low ionic strength (low molar concentration) conditions, the droplets remained sufficiently charged stabilized to survive repeated centrifugation and dilution steps while maintaining an appropriate surface charge to form colloidal crystals.

Multiple colloidal crystals are made from oil-in-water ultra-stable nanoemulsion droplets whose <a> is far below the wavelength of visible light. These crystals can be formed by concentration of a dilute NEM with centrifugation or dilution of a concentrated monodisperse NEM with DI water. Demonstrated is the importance in the choice of surfactants used to produce colloidal crystals from nanoemulsions and other charged surfactants with an appreciable tail length, such that its affinity for the disperse phase is much greater than the continuous phase, can be used for this application. The color of the nanoemulsions can be further modified by using an oil or surfactant which has some characteristic adsorption which occurs in or close to the visible spectrum. The methods stated above are applicable to any oil/surfactant combination which produces oil-in-water nanoemulsions which are stable at low ionic content in the continuous phase.

Example 2. Appendix A

Simple Cubic (SC) Lattice
Edge length of unit cell: $L_{uc}$
Number of spheres per unit cell: $N_{sc}=1$
Distance between centers of nearest neighboring spheres: $d_{nn}=L_{uc}$ Volume fraction of sphere(s) in unit cell: $\phi=N_{pc}(4\pi/3)a^3/L_{uc}^3$ Solving for $L_{uc}$ in terms of $\phi$ and a: $L_{uc}=[(4\pi/3)^{1/3}]a/\phi^{1/3}$
Bragg backscattering condition (m is an integer): $2dn_{eff}=m\lambda$
First order backscattering m=1 means Bragg condition for SC {100}: $\lambda=2dn_{eff}=2 L_{uc} n_{eff}$ So, for SC: $\lambda=2[(4\pi/3)^{1/3}](a/\phi^{1/3})n_{eff}=4.28 a/\phi^{1/3}$
Body Centered Cubic (BCC) Lattice
Edge length of unit cell: $L_{uc}$
Number of spheres per unit cell: $N_{bcc}=2$
Distance between centers of nearest neighboring spheres: $d_{nn}=3^{1/2}(L_{uc}/2)$
Volume fraction of sphere(s) in unit cell: $\phi=N_{bcc}(4\pi/3)a^3/L_{uc}^3$
Solving for $L_{uc}$ in terms of $\phi$ and a: $L_{uc}=[(8\pi/3)^{1/3}]a/\phi^{1/3}$
Miller indices yielding coherent diffraction from BCC: {110}, {200}, {211}, {310}, . . . Bragg 1st order backscattering condition BCC {110}: $[2d110]n_{eff}=\lambda$
For Miller indices BCC {110}: $d_{110}=L_{uc}/2^{1/2}$
For 1st order backscattering BCC {110}: $\lambda=(2/2^{1/2})[(8\pi/3)^{1/3}](a/\phi^{1/3})n_{eff}=3.819 a/\phi^{1/3}$
Face Centered Cubic (FCC) Lattice
Edge length of unit cell: $L_{uc}$
Number of spheres per unit cell: $N_{fcc}=4$
Distance between centers of nearest neighboring spheres: $d_{nn}=2^{1/2}(L_{uc}/2)$ Volume fraction of sphere(s) in unit cell: $\phi = N_{fcc}(4\pi/3)a^3/L_{uc}^3$ Solving for $L_{uc}$ in terms of $\phi$ and a: $L_{uc} = [(16\pi/3)]^{1/3} a/\phi^{1/3}$ Miller indices yielding coherent diffraction from FCC: {111}, {200}, {220}, {311}, . . . Bragg 1st order backscattering condition FCC {111}: $[2d111]n_{\it{eff}} = \lambda$ For Miller indices FCC {111}: $d_{111} = L_{uc}/3^{1/2}$ For 1st order backscattering FCC {111}: $\lambda = (\frac{2}{3}^{1/2})[(16\pi/3)^{1/3}] (a/\phi^{1/3}) n_{\it{eff}} = 3.930 \, a/\phi^{1/3}$ In the above equations, $n_{\it{eff}}$ is the effective refractive index of the nanoemulsion: $n_{\it{eff}} = n_{wat}(1-\phi) + n_{oil}\phi$, where $\phi$ is volume fraction of oil droplets, $n_{wat} \approx 1.33$ is the refractive index of water and $n_{oil}$ is the refractive index of oil (for PDMS oil used in these experiments $n_{oil} \approx 1.39$).

The Bragg condition for optical diffraction of order m in a medium with refractive index $n_{\it{eff}}$ is: $m\lambda = [2d_{hkl} \sin(\theta_{hkl})] n_{\it{eff}}$, where $d_{hkl}$ represent d-spacings between certain periodic crystal planes, and $2\theta_{hkl}$ are scattering angles defined relative to those planes, and h, k, l are Miller indices corresponding to these planes. The d-spacings in terms of the edge length of the unit cell are: $d_{hkl} = L_{uc}/(h^2+k^2+l^2)^{1/2}$ For 1st order scattering, use m=1 is used. For backscattering conditions, the scattering angles is $2\theta_{hkl} = 180$ deg, and $\sin(\theta_{hkl}) = 1$.

Example 3. Supplemental Information

S.I. Other Methods Used to Produce Crystalline Nanoemulsions

While the method provided in Section II.A.i yielded some of the best results, determination is made of other routes to produce hyperuniform crystalline nanoemulsions.

S.II.a Bulk Crystalline Iridescent Nanoemulsions by Direct Emulsification

A mixture of 1.2 g SOS, 56.30 g of PDMS, and 300.00 g of DI water is warmed to 75° C. and sheared to make a pre-mix emulsion. This pre-mix emulsion's <a> is further reduced by passing it through a microfluidic homogenizer (30,000 psi for 8 passes) while the interaction chamber and cooling coil are in contact with a 75° C. water bath. Once the NEM has cooled to room temperature, it is loaded into a centrifuge and spun at 18,000 rpm for 19 hours. The newly formed elastic NEM plug is removed from the centrifuge tube at which point the sample can be size fractionated. This is done by discarding the top eighth of the plug then the remaining portion of the plug is cut in half. Halves with similar <a> are combined, diluted with DI water, and size fractionated again following the same procedure a total of four times. The fractionated NEM ($\approx$2 g, $\phi \approx 0.30$) is diluted with 30 mL of DI-water to which 0.1 g SOS has been added. This dilute NEM/SOS mixture is heated to 75° C. until the SOS fully dissolves then the NEM is allowed to cool to room temperature. This step ensures the interfaces of the droplets are fully saturated with the ionic surfactant, giving it the charge stabilization it needs to form a colloidal crystal. The NEM is washed four more times to remove excess SOS and decrease the ionic content of the bulk continuous phase.

Figure 9:
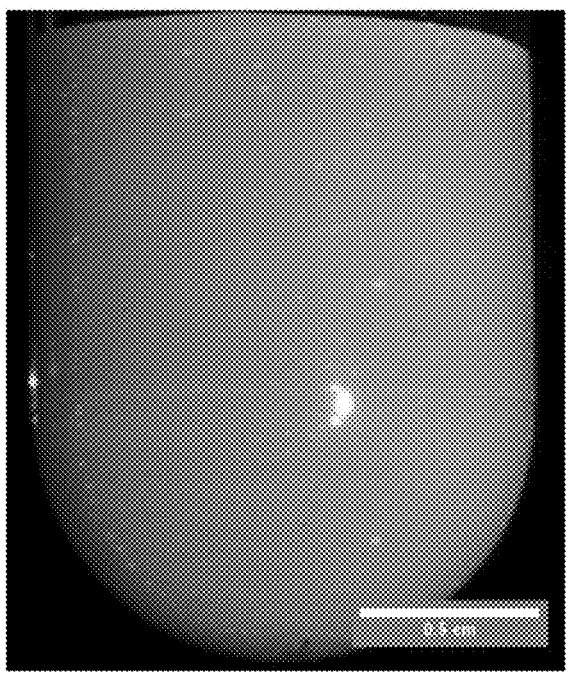
FIG. 9. Photograph of green colloidal crystals made from size fractionated nanoemulsion droplets made by the direct production method, imaged in a backscatter configuration 6 hours after dilution. This NEM had been size fractionated four times, each time the bottom half of the plug is used which results in a NEM with $<a>=53.8\pm0.2$ nm. A portion of the concentrated plug is diluted with DI water until a volume fraction $\phi=0.027$ and electrical conductivity $\sigma_e=16$ $\mu$S/cm at which point colloidal crystals will start to appear.

A portion of the washed concentrated NEM is diluted with DI water to a $\phi \approx 0.015$-0.03 and a final electrical conductivity between 10 µS/cm-20 µS/cm, then this dilute NEM is placed in a plastic container. After a short time (<1-2 hours) the sample will begin to crystallize and the crystals will continue to grow in size and number as shown in FIG. 9 (~8 hours). The NEM shown in FIG. 9 has been size fractionated four times, each time the bottom half of the plug is taken, which results in a NEM with <a>=53.8±0.2 nm and after dilution with DI water $\phi$=0.027 and $\sigma_e$=16 µS/cm.

S.II.b Localized Crystalline Iridescent Nanoemulsions by Direct Emulsification

Unlike the methods presented in sections II.A.i and S.II.a, which yielded crystals found anywhere in the dilute nanoemulsion, the following procedures produce colloidal crystals found at the concentrated nanoemulsion plug/bulk continuous phase interface, localized to that macroscopic interface, after centrifugation (Section II.A.ii, FIG. 5).

S.II.b.i. Production of O/W Nanoemulsion Using Octadecylsulfate Only

A SOS surfactant solution is made by adding 0.1 g SOS to 5 g of deionized water and swirled for about 3 minutes in a glass tapered 50 mL conical tube at room temperature T=296 K. The cloudiness indicates the potential for large micelle formation and/or partial dissolution. In a separate glass beaker, 3.6 g of PDMS and 21.4 g of deionized water are weighed out. A pre-mix emulsion is made by slowly adding the SOS solution to the PDMS oil-water mixture (total addition time$\approx$1 minute) while the oil-water mixture is being agitated by a hand mixer. The resulting pre-mix emulsion appears as an opaque white emulsion ($\phi \approx 0.13$) and there are no noticeable solid chunks of SOS in the emulsion which indicates the SOS was consumed during this emulsification step.

This pre-mix emulsion is homogenized at 20,000 psi peak liquid pressure for a total of 8 passes then centrifuged at 10,000 rpm for 8 hours a total and washed with DI water for a total of 4 wash steps. For this non-water and non-oil composition, namely solely SOS, diffracting colored colloidal crystals of nanodroplets are seen at the bottom of the plug (e.g. opalescence is observed) after this second 'wash step' (see FIG. 10 and FIG. 11). Observation is made of additional oil breakout at the top of the plug (see FIG. 10), indicating that this nanoemulsion is not extremely stable with regard to strong osmotic compression. By contrast, nanoemulsion at the bottom of the plug has experienced a much lower osmotic pressure, so no coalescence is observed in the opalescent region containing the colloidal crystals. The <a> of a portion of nanoemulsion, extracted from the colored opalescent region near the bottom of the plug after the second wash step, is 95±1 nm.

S.II.b.ii Production of O/W Nanoemulsion using Octadecylsulfate and Aqueous Acid A surfactant solution is prepared by adding 0.1 g of SOS to 5.0 g of 5% v/v HCl (aq) (made by dilution with de-ionized water from a more concentrated stock solution of HCl: Ricca, 50% v/v) which is then swirled together for about 3 minutes in a glass tapered 50 mL conical tube. The resulting SOS-(aqueous HCl solution) mixture appears cloudy, indicating that the SOS did not completely dissociate into single solubilized molecules. In a separate glass beaker, 3.6 g of 10 cSt PDMS and 21.4 g of deionized water are weighed out, yielding two separate liquid phases separated by a meniscus. The SOS-(aqueous HCl solution) mixture is added slowly to the beaker containing the two separate liquid phases using the same conditions as described in Section SII.b.i. The newly formed pre-mix emulsion of microscale droplets has a $\phi \approx 0.13$ and [HCl]=0.8% v/v. There are no observed solid chunks of SOS in the dilute emulsion indicating that the surfactant was fully consumed during this emulsification process. This pre-mix is homogenized at 20,000 psi peak liquid pressure, centrifuged at 10,000 rpm for 8 hours, and is washed to wash step 4. A band of opalescent NEM appears along the bottom of the plug in fourth wash step (see FIG. 12 and FIG. 13). The <a> of a portion of nanoemulsion, extracted from the colored opalescent region near the bottom of the plug after the fourth wash step, is <a>=110±2 nm.

S.II.b.iii Production of O/W Nanoemulsion Using Octadecylsulfate and Acidified Isopropanol A surfactant solution is made by adding 0.2 g of SOS into 10 mL of 0.1 N acidic isopropanol which is then swirled together for about 3 minutes in a glass tapered 50 mL conical tube. The resulting mixture appears cloudy indicating that the SOS does not dissociate into single molecules. A pre-mix emulsion is made by adding the above surfactant solution (addition time≈1 minute) to an oil-water mixture of 7.4 g of 10 cSt PDMS and 45 g of deionized water while the oil-water mixture is being agitated by a hand mixer ($\phi$≈0.14). The resulting pre-mix emulsion appears as an opaque white emulsion and there is no observable solid SOS after this emulsification procedure indicating the SOS was consumed during this step. This pre-mix is then homogenized at a peak liquid pressure of 20,000 psi, centrifuged at 17,000 rpm for 6 hours, and washed to wash step 4. This process is repeated for the 1,1,3,5,5-pentaphenyl-1,3,5-trimethyltrisiloxane (abbreviation: PPTMS, manufacturer: Gelest, viscosity 170-175 cSt, mass density $\rho$=1.09 g/mL) silicone oil with no substitutions to the above method other than 8.6 g of PPTMS is used to reach the same $\phi$ due to the difference indensities.

Figure 14:
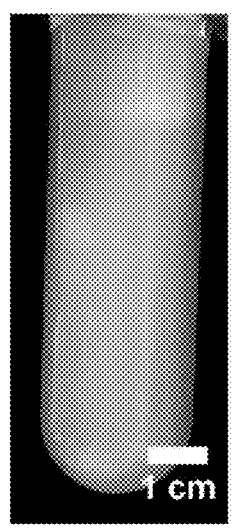
FIG. 14. Oil-in-water nanoemulsion (stabilizer: SOS in acidic isopropanol; oil: PDMS 10 cSt) in the process of being resuspended, for its second wash step, with deionized water. The colors present in this centrifuge tube correlate with the amount of nanoemulsion that has resuspended. In the lower portion of the tube (red) there are very few droplets which are fully redispersed as well as small clumps (portions of the plug not yet resuspended) of nanoemulsion which have not creamed toward the top of the plug. Towards the top of the tube (yellow, green, and blue) there is a higher concentration of droplets as well as some larger clumps of NEM which have creamed to the top of the tube.
Figure 15:
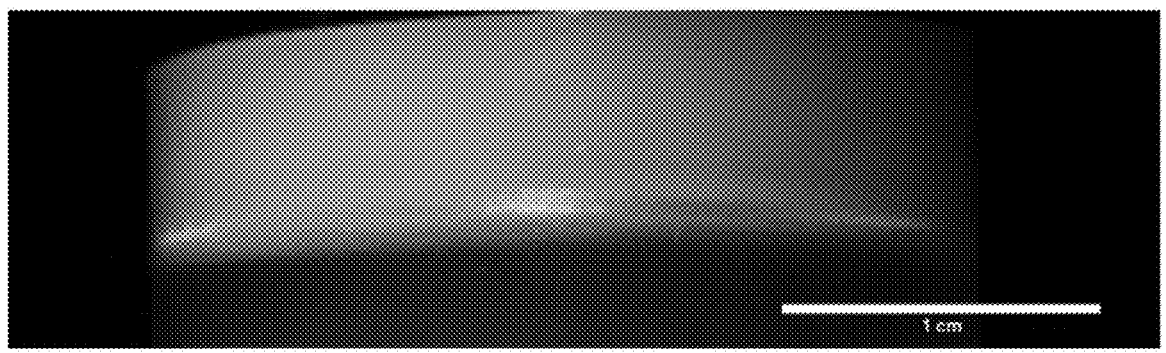
FIG. 15. Oil-in-water nanoemulsion after centrifugation and 4 wash steps (stabilizer: SOS in acidic isopropanol; oil: PDMS 10 cSt). At the bottom of the plug of concentrated droplets, a biliquid opal is formed as a consequence of droplet crowding and screened-charge repulsions between the negatively charged interfaces of droplets. Washing has reduced the ionic strength in the continuous aqueous phase, thereby increasing the Debye screening length associated with the screened-charge repulsion. Red, yellow, and green crystalline regions are present at the bottom of the white opaque plug ($<a>=59.5\pm0.5$ nm); the colors depend on the viewing angle relative to the light source, so these colors result from optical diffraction, not absorption. A blue-purple band is present above the crystalline region due to the droplets being in a hyperuniform state. In the remaining portion of the plug, the droplets are in a jammed disordered structure that does not have a well-defined characteristic spatial periodicity, so the plug multiply scatters light and appears white.
Figure 16:
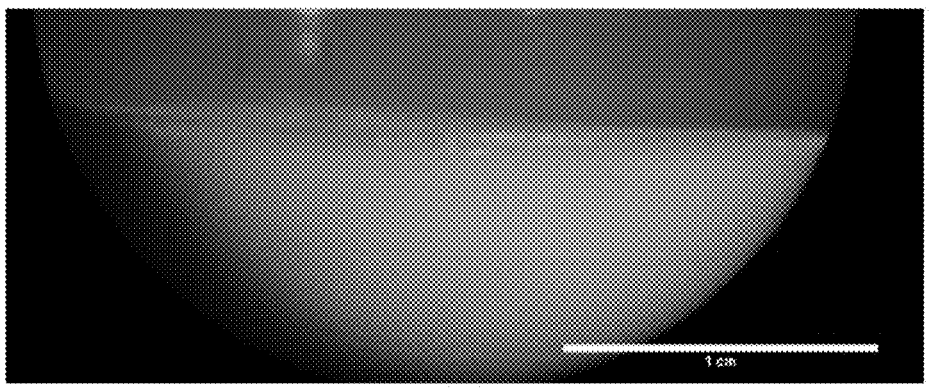
FIG. 16. Oil-in-water nanoemulsion after centrifugation and 4 wash steps (stabilizer: SOS in acidic isopropanol; oil: PPTMS). At the bottom of the plug of concentrated droplets, a biliquid opal is formed as a consequence of droplet crowding and screened-charge repulsions between the negatively charged interfaces of droplets. Washing has reduced the ionic strength in the continuous aqueous phase, thereby increasing the Debye screening length associated with the screened-charge repulsion. Blue, green, red, and yellow crystalline regions are present at the top of the white opaque plug ($<a>=92.8\pm0.5$ nm); the colors depend on the viewing angle relative to the light source, so these colors result from optical diffraction, not absorption. In the remaining portion of the plug, the droplets are in a jammed disordered structure that does not have a well-defined characteristic spatial periodicity, so the plug multiply scatters light and appears white.

During the second and third wash steps with the nanoemulsion made from PDMS oil, the dilute nanoemulsion took on multiple opaque colors when the concentrated nanoemulsion plug is resuspended in deionized water (FIG. 14). These colors fade to a turquoise/green when the NEM is fully resuspended and stay that color until they are centrifuged to form an opaque white plug. There was no such color or color change present for the nanoemulsion made from PPTMS oil. In the fourth wash step, there was opalescence present in the plugs for both oils (see FIG. 15, FIG. 16, and FIG. 17).

The <a> is measured by diluting of a portion of nanoemulsion extracted from the colored opalescent region near the bottom of the plug (PDMS) or top of the plug (PPTMS) after the fourth wash step. The resulting opalescent NEMs have <a>=59.5±0.5 nm (PDMS) and <a>=92.8±0.5 nm (PPTMS).

Reducing Ionic Strength of Ultrastable Nanoemulsions Using Ion Exchange Resin

Ion exchange resins can be used to reduce the ionic strength of aqueous solutions. Ion exchange resins can come in a variety of types. In particular, mixed-bed ion exchange resins (which can trap and effectively remove both positive and negative ionic species) are typically useful for reducing the ionic strength of aqueous solutions, which contain dissolved ionic species, to very low levels. For example, ion exchange resins can be used to cause the crystallization of aqueous dispersions of colloidal and nanoscale solid polymer spheres that have charges on their surfaces (e.g. to create colloidal crystals of sulfate-stabilized polystyrene nanospheres). However, ionic emulsions, which typically have reversibly adsorbed ionic surfactants as stabilizers to prevent droplet coalescence, coalesce when directly exposed to ion exchange resins, since the resin effectively traps and removes the stabilizing ionic surfactant, and this drives continuous desorption of surfactant from droplet interfaces, thereby causing droplet coalescence as the surface concentration of surfactant on droplet interfaces is reduced. While causing coalescence of droplets to facilitate their removal can potentially be useful for water purification purposes, it is undesirable for the purposes of making long-lived photonic structures composed of nanoemulsion droplets. Thus, it is desirable to employ ion exchange resins for the purposes of making photonic nanoemulsions that could potentially have useful optical properties of hyperuniformity and/or opalescent crystals. In the herein disclosure, use is made of ion exchange resins to overcome this constraint that has previously precluded the creation of photonic nanoemulsions.

In an embodiment, the ionic strength in the continuous phase of an ultrastable oil-in-water nanoemulsion, which is stabilized with a non-desorbing ionic surfactant or lipid, is reduced by placing the nanoemulsion in contact with an ion exchange resin that traps and effectively removes ions from the continuous aqueous phase, thereby lowering the ionic content in the continuous phase below a level to induce rearrangement, mediated through enhanced droplet repulsion, of at least a portion of constituent nanodroplets into at least one of a hyperuniform structure and a crystalline structure without causing significant coalescence of nanodroplets.

In a further embodiment, a mixed-bed ion exchange resin is used to reduce the ionic strength of the continuous aqueous phase of an ultrastable oil-in-water nanoemulsion that is stabilized with a non-desorbing ionic surfactant or lipid, thereby increasing the Debye screening length such that enhanced repulsive interactions between the charged surfaces of nanodroplets causes the formation of at least one of a hyperuniform structure and a crystalline structure composed of many of the nanodroplets.

In an additional embodiment, a mixed-bed ion exchange resin is used in combination with a nanoporous membrane that has a pore size that is large enough that such ions can freely pass through it but small enough that nanodroplets of the nanoemulsion cannot pass through it. Such nanoporous membrane separates an aqueous continuous phase that is in contact with the mixed-bed ion exchange resin on one side of said nanoporous membrane with the same aqueous continuous phase that is in contact with said nanodroplets on the other side of said nanoporous membrane. Thus, water molecules and ions in the aqueous continuous phase can pass through said nanoporous membrane, whereas nanoemulsion droplets cannot pass through the nanoporous membrane. In addition, said nanoporous membrane is compatible with the nanoemulsion in the sense that the nanodroplets do not coalesce or otherwise destabilize when the nanodroplets encounter the nanoporous membrane. Optionally, flowing, agitating, or stirring both the nanoemulsion and/or said ion exchange resin can be performed to increase the rate of reduction of ionic strength in the continuous phase of the nanoemulsion, which is constrained by the transport of ions through the nanoporous membrane. This use of an ion exchange resin in combination with a nanoporous membrane thereby allows the reduction in ionic strength of the continuous phase of an ultrastable nanoemulsion without the need for repeated ultracentrifugation steps.

Zeta Potential of Ultrastable Fractionated Nanoemulsions that Form Opalescent Crystals Measurement is made of the zeta potential of an ultrastable fractionated (octadecyl sulfate)-stabilized poly-dimethylsiloxane (PDMS) oil-in-water nanoemulsion, which is shown and identified in FIG. 3B, FIG. 7, and FIG. 8, using a Malvern Zetasizer ZS using a standard protocol recommended by the manufacturer of this electrophoretic-light scattering instrument. Dilution is made of 0.18 mL of this concentrated nanoemulsion (initial $\phi$=0.18, average droplet radius <a>=48 nm) with 1.82 mL of a 10 mM sodium chloride solution. The final $\phi$ of this diluted nanoemulsion is 0.016, and the ionic strength in the continuous phase remains close to that of the initial sodium chloride solution. Loading is made of a sufficient volume of this diluted nanoemulsion into an appropriate optical cuvette suitable for zeta potential measurements using the Malvern Zetasizer ZS, according to the manufacturer's instructions. The measured zeta potential of octadecyl-sulfate stabilized nanodroplets in this ultrastable fractionated nanoemulsion, as reported by the Malvern Zetasizer ZS, is $\zeta=-95.0$ mV (average of three independent trials taken at a temperature of $T=25°$ C.). The magnitude of this zeta potential value (e.g. $|-95$ mV$|=95$ mV) is large enough to impart not only strong stability against droplet coalescence to the nanoemulsion (typical for values >60 mV) but also strong repulsive interactions between neighboring nanodroplets. If the ionic strength of the continuous aqueous phase of an ultrastable nanoemulsion could be lowered adequately without causing desorption of ionic amphiphiles from the surfaces of droplets, then such strong repulsive attractive interactions can potentially be employed to cause droplet rearrangements into structures that would have interesting and useful photonic properties.

In an embodiment, the magnitude of a zeta potential of nanodroplets stabilized in an oil-in-water nanoemulsion that is made to be ultrastable through the use of a strongly adsorbed ionic surfactant, such as octadecyl sulfate, onto the surfaces of these nanodroplets is about 30 mV or greater, and such about 60 mV or greater.

Dependence of Droplet Structure on Ionic Strength of Aqueous Continuous Phase

Figure 18:
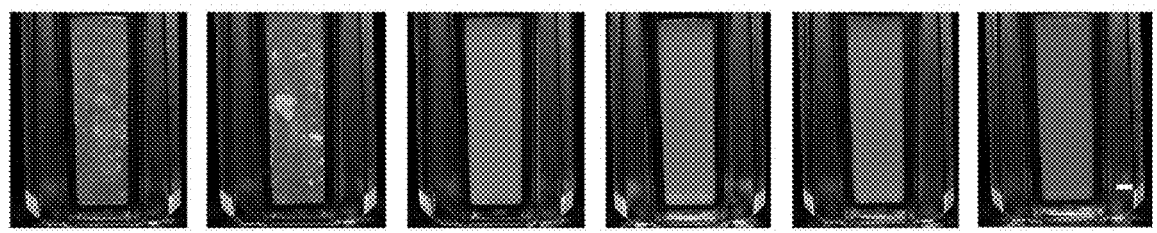
FIG. 18. Backscattering color macrophotography images of monodisperse poly-dimethylsiloxane (PDMS) oil-in-water nanoemulsions stabilized with sodium octadecyl sulfate (SOS), fractionated 4 times (C2221*: middle, middle, middle, top plug sections) having average droplet radius <a>=39.9±0.2 nm (uncertainty in mean), after dilution with aqueous solutions of sodium chloride (NaCl) of 1 µM, 5 µM, 10 µM, 50 µM, 100 µM, and 10 mM, respectively (left to right), yielding a final droplet volume fraction φ=0.018 and NaCl concentration in the continuous aqueous phase of: 0.88 µM, 4.38 µM, 8.76 µM, 43.8 µM, 87.6 µM, and 8.76 mM (left to right). Thus, as the ionic strength of the continuous phase is changed the optical properties of this nanoemulsion can be tuned from crystalline at the low ionic strength (green crystals: backscattering spectroscopy peaks at $\lambda_{max}$=506 nm—leftmost image, and $\lambda_{max}$=500. nm—second image from left) to hyperuniform at intermediate ionic strength (uniform green appearance: third, fourth, and fifth images from left) to hazy-whitish at high ionic strength (uniform: rightmost image). When the ionic strength of the nanoemulsion is kept low (e.g. below ≈7 µM after adding NaCl(aq)) the nanoscale droplets in the nanoemulsion are observed to self-assemble into long-lived crystals that can reach several millimeters in size. As the ionic content of the nanoemulsion is increased from this point, crystal formation is no longer observed; instead, a non-crystalline hyperuniform state is formed. As the ionic content is increased further, the backscattered green light becomes less intense until it disappears. The built-in white-light flash from the Nikon D5000 camera provides a near-backscattering illumination and detection configuration; clear plastic sample cells are used to prevent ion leaching (which can be a problem with some types of glass cells). Scale bar (white) in rightmost image: 1 mm.
Figure 19A:
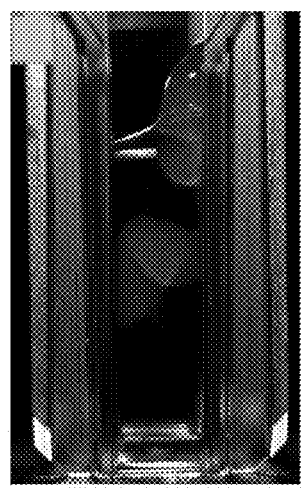
FIGS. 19A-19D. Backscattering color macrophotography images of a monodisperse poly-dimethylsiloxane (PDMS) oil-in-water nanoemulsion stabilized with sodium octadecyl sulfate (SOS), fractionated 4 times (C2222*: middle, middle, middle, middle plug sections) having average droplet radius <a>=37.7±0.1 nm (uncertainty in the mean) and initial concentrated droplet volume fraction φ=0.16, as this concentrated nanoemulsion is added to an optical cuvette that has been filled with deionized water.
Figure 19B:
Figure 19C:
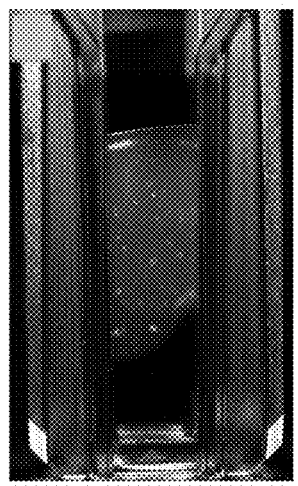
Figure 19D:
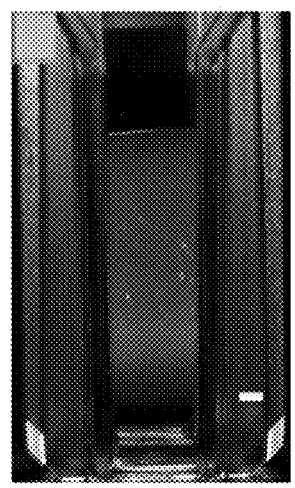

The Debye screening length $\lambda_D$ of an aqueous solution at low ionic strength I is proportional to the inverse square root of the ionic strength of that solution. An accepted formula used to compute $\lambda_D$ for aqueous solutions of monovalent ions as a function of I is: $\lambda_D=0.304/I^{1/2}$, where $\lambda_D$ is in nanometers (nm=$10^{-9}$ m) and I is a concentration expressed in units of molar (M=mol/L). SDS, STS, SHS, and SOS all are monovalent amphiphilic salts, and NaCl is also monovalent, so all salts that have been used in the study as a function of ionic strength are monovalent. For monovalent salts, the ionic strength corresponds to the molar concentration of the salt. By systematically varying the concentration of monovalent ions in the continuous aqueous phase of a fractionated monodisperse ultrastable nanoemulsion, which have been explored experimentally and reported in FIG. 18, observation is made of different kinds of bulk assembly of highly fractionated OS-coated PDMS nanodroplets having average radius $<a>=39.9$ nm at a fixed final droplet volume fraction of $\phi=0.018$. Observation is made of assembly into crystals which backscatter in the green part of the visible spectrum at two low ionic strengths (which is assumed to be primarily set by the much larger volume of NaCl solution): $I=0.88\times10^{-6}$ M and $4.38\times10^{-6}$ M. These ionic strengths correspond to Debye screening lengths of $\lambda_D=324$ nm and 145 nm, respectively. It is noted that the crystals formed at these two different ionic strengths have approximately the same measured peak wavelengths via backscattering spectrometery of $\approx500$ nm; so, the readily apparent green color of these crystals in backscattering is at most weakly dependent on I (and hence $\lambda_D$) and instead depends primarily on $<a>$ and the droplet volume fraction $\phi$. However, at a slightly higher $I=8.76\times10^{-6}$ M, corresponding to a lower $\lambda_D=102$ nm, crystals are no longer formed, and instead a hyperuniform structure that appears to be green in backscattering is observed. Thus, for this particular nanoemulsion's $<a>$ and surface concentration of octadecyl sulfate on the nanodroplets, observation is made that the crossover between crystalline and hyperuniform structures occurs at a Debye screening length between $\lambda_D=145$ nm and $\lambda_D=102$ nm. Also observed are two other hyperuniform structures of nanoemulsion after dilution with NaCl solutions, each of which appears to be green in backscattering: $I=43.8\times10^{-6}$ M, corresponding to $\lambda_D=45.9$ nm; and $I=87.6\times10^{-6}$ M, corresponding to $\lambda_D=32.5$ nm. As $\lambda_D$ decreases, it is noticed that the brilliance of the saturation in the backscattered green color is reduced. Finally, at much larger ionic strength, $I=8.76\times10^{-3}$ M, corresponding to $\lambda_D=3.2$ nm, the green color in backscattering is not readily observed, and absence of hyperuniformity is apparent. Thus, it is shown that both crystalline and hyperuniform structures can be obtained from the same fractionated nanoemulsion by controlling the ionic strength, and therefore Debye screening length, in that nanoemulsion's continuous phase.

In an embodiment, an ionic strength of an aqueous continuous phase of a fractionated ultrastable oil-in-water nanoemulsion is about 0.1 mM or below, such as about 0.01 mM or below, yielding at least one of a hyperuniform droplet structure exhibiting a uniform color in backscattering with white light illumination and a crystalline droplet structure exhibiting a predominant opalescent color in backscattering with white light illumination.

Polydispersity of Fractionated Ultrastable Nanoemulsions Influences their Capacities to Form Hyperuniform Structures and Crystalline Structures A radial droplet size distribution of a nanoemulsion, $p_a(a)$, has a size polydispersity $\delta a/<a>$ which is quantitatively specified as the standard deviation of the nanoemulsion's radial droplet size distribution, specified as $\delta a$, divided by the mean of the nanoemulsion's radial droplet size distribution, specified as $<a>$. Each fractionation step employed in the herein disclosure has been designed to reduce the size polydispersity of a nanoemulsion. The total volume of nanodroplets in a fractionated nanoemulsion after a fractionation step is also reduced compared to the total volume of nanodroplets in the original starting nanoemulsion before the fractionation step. If a fractionation involves splitting each plug into 3 sections (top, middle, bottom), designated by *, rather than 2 (top, bottom), then a higher degree of droplet size selectivity is conferred after each fractionation step. However, if in a given fractionation step each plug is split into 3 sections, rather than 2, the total volume of resulting fractionated droplets after that fractionation step involving splitting into 3 sections will be smaller than the total volume of resulting fractionated droplets after splitting into 2 sections.

Colloidal crystallization of solid spherical particles can be achieved through charge repulsion and increasing the Debye screening length, yielding a high degree of overlap of Debye layers and a magnitude of a repulsive interaction in a pair potential between the solid spherical particles that is well in excess of $k_BT$, where $k_B$ is Boltzmann's constant and T is the temperature, and that achieving such crystallization depends on the size polydispersity of those solid spherical particles. Crystallization can be suppressed for a size polydispersity greater than about 0.06 to about 0.08, assuming a uniform surface charge density exists on all solid spherical particles. Less is understood about the influence of polydispersity on the formation of non-crystalline hyperuniform structures of charge-repulsive solid spheres in 3D.

Figure 21:
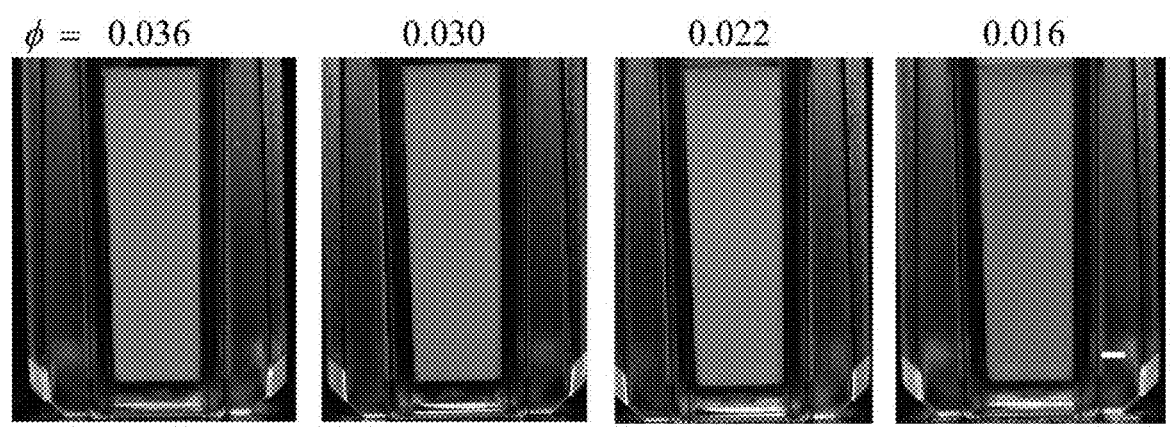
FIG. 21. Backscattering color macrophotography images of poly-dimethylsiloxane (PDMS) oil-in-water nanoemulsions stabilized with sodium octadecyl sulfate (SOS), having average droplet radius <a>=57.7±0.3 nm (uncertainty in mean) which has been produced with 8 passes through the high-flow rate microfluidizer and yet has not been fractionated (corresponding to the starting nanoemulsion labelled F). After performing hot surfactant exchange, the nanoemulsion has been washed to obtain a low conductivity in the aqueous continuous phase of ≈10 µS/cm. Non-crystalline hyperuniform nanoemulsions can be produced by treating a non-fractionated nanoemulsion with sodium octadecyl sulfate followed by repeated wash steps to lower the ionic strength in the aqueous continuous phase, leading to strong repulsion. The color of this nanoemulsion, observed in backscattering, can be tuned by dilution with deionized water. As the volume fraction φ of the oil is decreased the observed color transitions from blue through to red. Based on prior measurements of similarly emulsified nanoemulsions, an estimate of the polydispersity of radial droplet size distribution of this nanoemulsion is in the range from ≈0.3 to ≈0.4. White scale bar=1 mm, bottom right.
Figure 22:
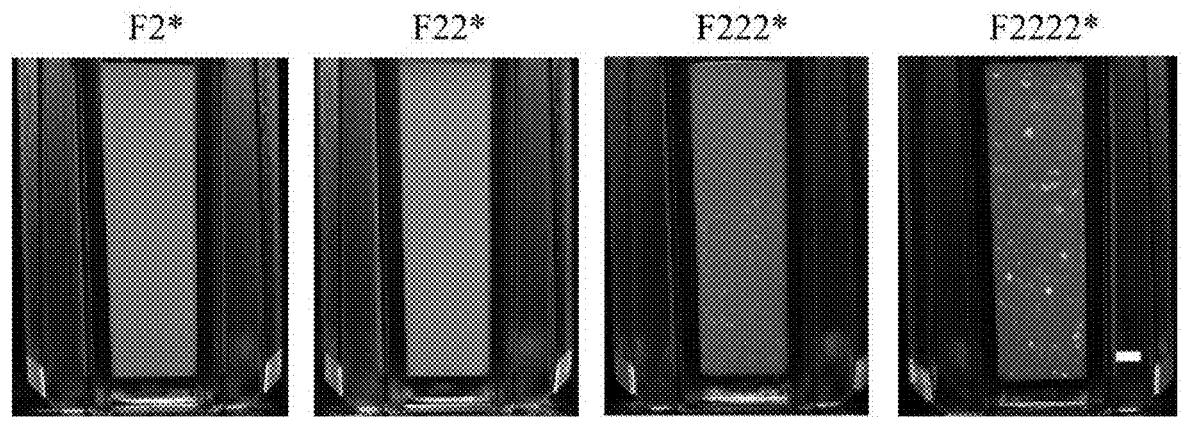
FIG. 22. Backscattering color macrophotography images of poly-dimethylsiloxane (PDMS) oil-in-water nanoemulsions stabilized with sodium octadecyl sulfate (SOS), having a $\phi$=0.030 which have droplet size distributions that have been size-fractionated to different degrees (F2*=one fractionation step, F22*=two fractionation steps, F222*=three fractionation steps, and F2222*=four fractionation steps) and all washed to the same conductivity of ≈10 μS/cm. Here, the * means that the concentrated plug of nanoemulsion was cut into thirds (1=top, 2=middle, 3=bottom) in each fractionation step. As a consequence of additional fractionation steps, the polydispersity of the nanoemulsion decreases from left to right. If the nanoemulsion is fractionated two times or less, no crystals are observed but a non-crystalline hyperuniform structure which backscatters green visible light is observed. At and above three fractionation steps (e.g. for F222* and F2222*), green opalescent crystallites form and are observed in backscattering configuration when illuminated with white light. It is estimated that the fractions F222* and F2222* have droplet radial size distributions with polydispersities near or less than 0.1. More crystals present in the more highly fractionated F2222* than in F222*. White scale bar=1 mm, bottom right.
Figure 23:
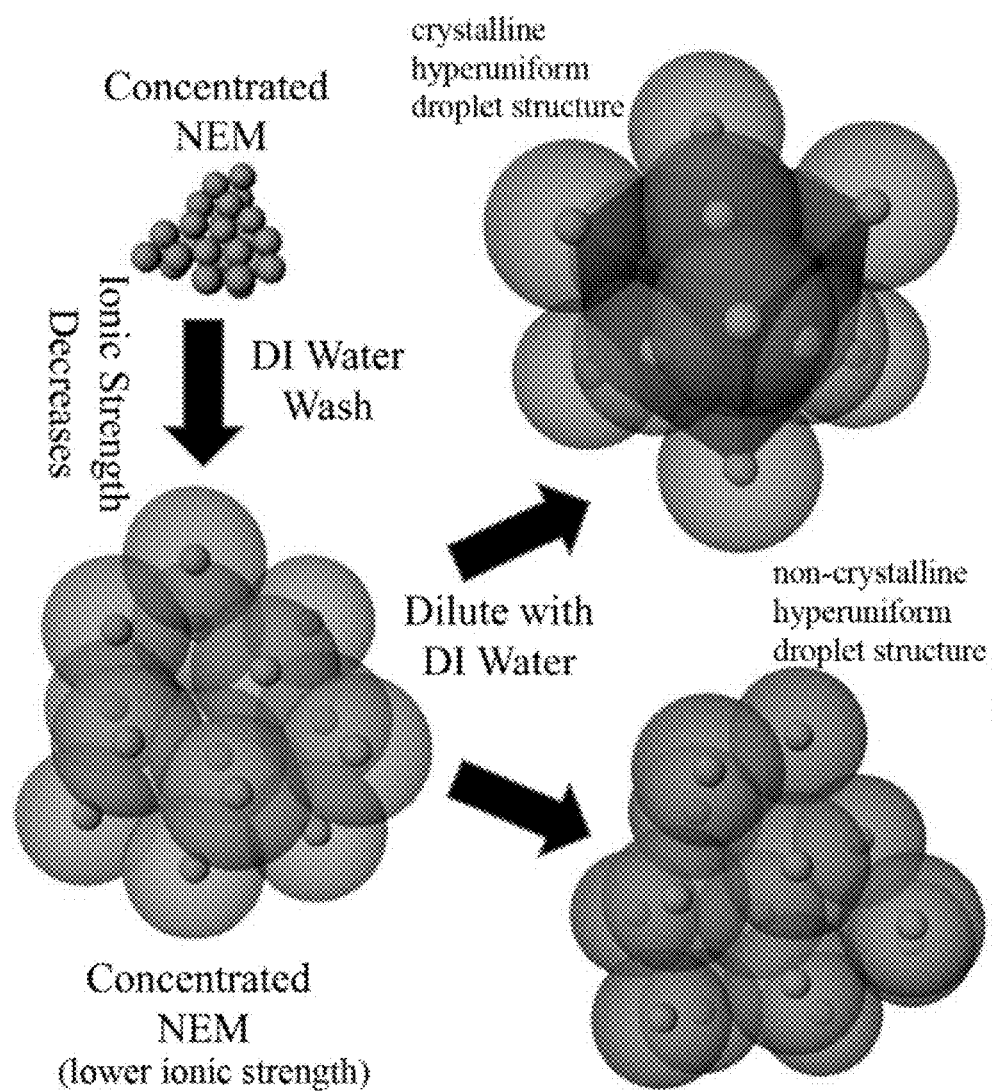
FIG. 23. Reducing ionic strength in the continuous phase of PDMS oil-in-water nanoemulsions stabilized by SOS surfactant while simultaneously reducing droplet volume fraction $\phi$, achieved by washing and diluting with deionized water, leads to a stable hyperuniform biliquid photonic materials. Schematic diagram (left): green spheres are charged droplets and blue-purple regions represent the range of screened charge repulsion beyond droplet surfaces, proportional to the Debye screening length. Nanoemulsions having narrower droplet size distributions, corresponding to a greater number of centrifugal size-fractionation steps and reduced size polydispersity, form crystalline hyperuniform structures that exhibit a strong and narrow peak in their backscattering spectra when illuminated with white light (upper right, see photo images and backscattered intensity $I_{back}$ versus wavelength $\lambda$ in FIG. 24). These strong narrow peaks are evidence of Bragg scattering of a selected wavelength in the backscattering direction, characteristic of crystalline opalescence (e.g. iridescence). Images of opalescent crystals show that the wavelength of nearly monochromatic backscattered light can be tuned by changing $\phi$. In addition to narrow peaks in the visible wavelength range, a strong narrow peak in the ultraviolet region of the spectrum, corresponding to $\lambda$<400 nm, can also be obtained. Nanoemulsions having wider droplet size distributions, corresponding to fewer or no fractionation steps and increased size polydispersity, form non-crystalline hyperuniform structures of droplets that exhibit strong but wider peaks in their backscattering spectra (lower right, see photo images and $I_{back}$ vs $\lambda$ in FIG. 25). Uniform colors in backscattering are observed from these non-crystalline hyperuniform structures of droplets, and the colors are set by a combination of wavelength, average droplet size, polydispersity, and ionic strength.
Figure 24A:
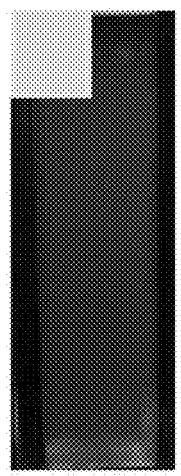
FIGS. 24A-24G. Backscattering color macrophotography images of crystalline hyperuniform PDMS oil-in-water nanoemulsions stabilized using sodium octadecyl sulfate (SOS) after fractionating 3 times to reduce droplet size polydispersity. Corresponding backscattering spectra ($I_{back}$ in arbitrary units) are normalized to the largest backscattering signal shown ($I_{back,max}$). From these spectra, the peak wavelength in backscattering ($\lambda_{max}$) and the broadness of that peak ($\lambda_w$, defined as full width at half maximum intensity value) are measured for each crystalline nanoemulsion.
Figure 24B:
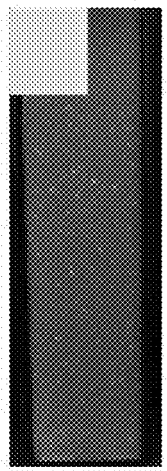
Figure 24C:
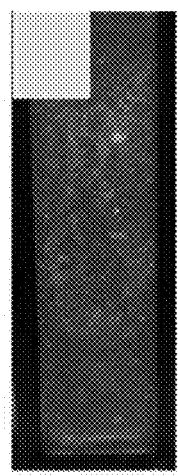
Figure 24D:
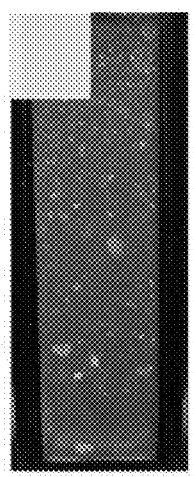
Figure 24E:
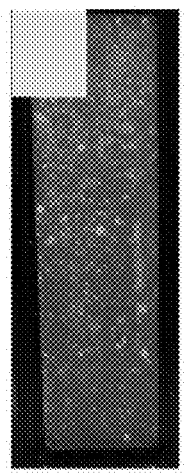
Figure 24F:
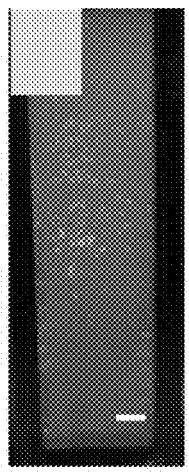
Figure 24G:
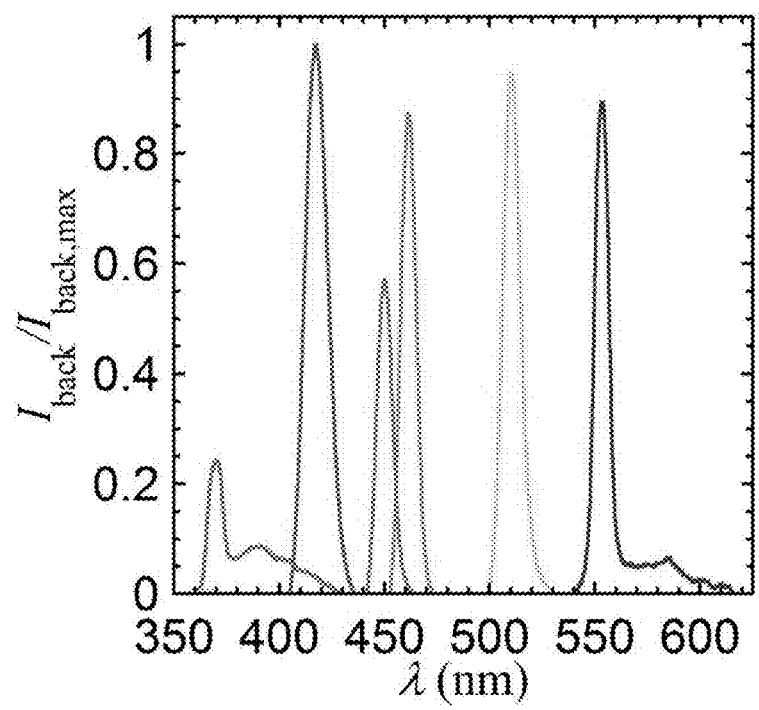
Figure 25A:
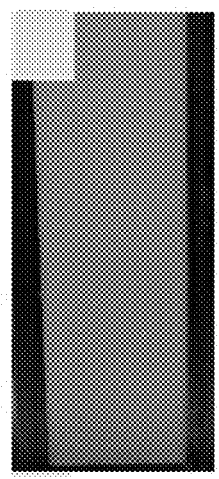
FIGS. 25A-25E. Backscattering color macrophotography images of dilute non-crystalline hyperuniform PDMS oil-in-water nanoemulsions stabilized with SOS after 3 fractionation steps. Backscattering spectra ($I_{back}$) which has been normalized to the largest backscattering signal shown ($I_{back}$,max). These spectra show broad backscattering peaks having a peak wavelength $\lambda_{max}$ and full width at half-maximum intensity $\lambda_w$.
Figure 25B:
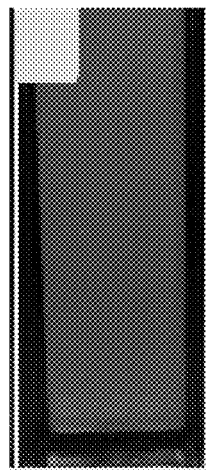
Figure 25C:
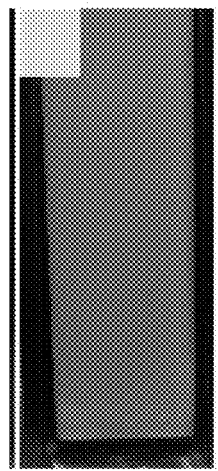
Figure 25D:
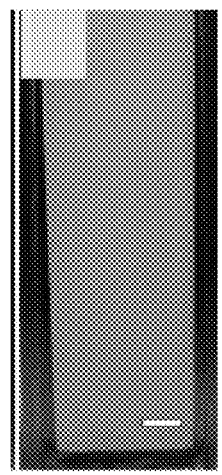
Figure 25E:
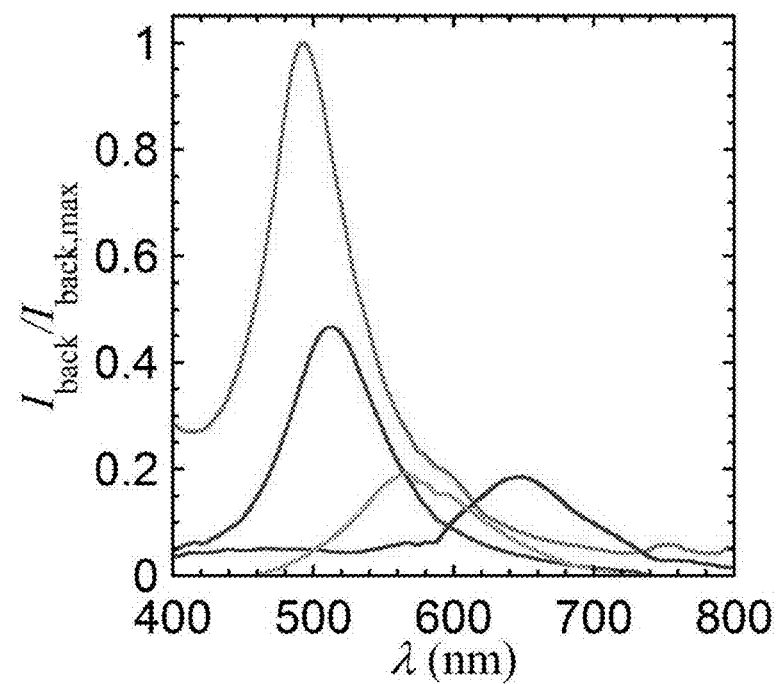

Experimentally, it is found that colored non-crystalline hyperuniform structures of fractionated ultrastable nanoemulsions can be achieved throughout a bulk sample at a level of size polydispersity corresponding to the original unfractionated nanoemulsion, resulting from use of the microfluidic homogenizer after the number of passes elsewhere described, using the procedures specified (see FIG. 21). Experimentally, it is also found that opalescent crystalline structures of fractionated ultrastable nanoemulsions can be achieved throughout a bulk sample at a level of size polydispersity corresponding to applying three or more fractionation steps to the original unfractionated nanoemulsion, resulting from use of the microfluidic homogenizer after the number of passes elsewhere described, using the procedures specified and described (see FIG. 22). Observations of non-crystalline hyperuniform (HU) nanoemulsions and opalescent crystalline (X) nanoemulsions, after creating different nanoemulsions having different $<a>$, fractionating them to different degrees to reduce $\delta a/<a>$, and then reducing ionic strength of the continuous phase while also lowering $\phi$ through dilution, are summarized in Table S1.

In an embodiment, the size polydispersity of an ultrastable nanoemulsion that forms an opalescent crystalline structure is about 0.1 or below, such as about 0.09 or below.

In an additional embodiment, the size polydispersity of an ultrastable nanoemulsion that forms a colored non-crystalline hyperuniform structure is about 0.4 or below, such as about 0.3 or below.

In an additional embodiment, the size polydispersity of an ultrastable nanoemulsion is reduced by at least two fractionation steps, thereby conferring a low enough size polydispersity that a colored non-crystalline hyperuniform structure is formed upon reduction of the ionic strength in the continuous phase.

In an additional embodiment, the size polydispersity of an ultrastable nanoemulsion is reduced by at least three fractionation steps, thereby conferring a low enough size polydispersity that an opalescent crystalline structure is formed upon reduction of the ionic strength in the continuous phase.

Moreover, based on optical backscattering spectra of opalescent crystalline nanoemulsions, which reveals a very sharp peak at a well-defined wavelength, it is concluded that a self-assembled photonic bandgap material is obtained that is entirely composed of liquids and contains little or no solid particles. This system is referred to as a photonic nanoemulsion. Moreover, by varying $<a>$ and $\phi$, demonstrated is effective tuning of the bandgap of a photonic nanoemulsion to correspond to optical wavelengths over the entire visible range.

In an embodiment, a band gap of a photonic nanoemulsion, which has been formed through charge repulsion between nanodroplets, is tuned by controlling at least one of the average droplet radius $<a>$ and the droplet volume fraction $\phi$ of the photonic nanoemulsion.

Refractive Index Difference Between the Dispersed and Continuous Phases

For the examples, use is made of 10 cSt PDMS oil from Gelest, which is reported to have a refractive index of approximately $n_{oil}=1.40$ at room temperature. In the absence of significant ionic content, which is the case for both crystalline and hyperuniform structures of nanoemulsions that have been created, the refractive index of water at the same temperature is $n_{water}=1.33$. Thus the refractive index difference, defined by $\Delta n=n_{oil}-n_{water}$, is $\Delta n=0.07$ for the examples of opalescent and hyperuniform nanoemulsion systems. By using different viscosity (e.g. molecular weight) PDMS oils, it is possible to vary $\Delta n$. Likewise, a wide range of other oil types can also be used provided that $\Delta n$ is not so close to zero as to effectively index-match the dispersed oil phase with the aqueous continuous phase. However, using very large $\Delta n$ is also not be desirable, particularly for nanoemulsions having larger $<a>$ approaching 100 nm, as a consequence of multiple scattering, which can cause the backscattered colors to become whitish, cloudy, or hazy in appearance (e.g. to reduce color saturation).

In an embodiment, a fractionated ultrastable oil-in-water nanoemulsion that yields at least one of opalescent crystalline structures or colored non-crystalline hyperuniform structures is composed of an oil that has a refractive index difference with respect to water, with $\Delta n$ that is between about 0.01 and about 0.3.

Influence of pH on the Formation of Hyperuniform and Opalescent Nanoemulsions

The pH of the MilliQ deionized water used in the experiments is effectively neutral pH=7, and the concentration of hydronium ions $[H_3O^+]=10^{-7}$ M is equal to the concentration of hydroxide ions $[OH^-]=10^{-7}$ M at room temperature. Measurement is made of the pH of fractionated monodisperse ultrastable nanoemulsions having $<a>=39.9$ nm that have formed crystals upon dilution with pure deionized water to be pH=6.98 at a temperature of T=298 K; a standard calibrated pH probe was placed directly into the crystallized nanoemulsion after it had formed. So, demonstration is made that photonic opalescent crystalline nanoemulsions have been obtained at near-neutral pH values. Based on the study using controlled concentrations of NaCl shown in FIG. 18, it can be reasonably proposed that opalescent crystalline forms of anionically stabilized (e.g. octadecyl sulfate stabilized) nanoemulsions can be obtained and remain stable at room temperature down to an acidic pH $5.4=-\log_{10}(4.38\times10^{-6})$, neglecting other ionic content in a nanoemulsion that could be present before dilution. In weakly acidic conditions, the predominant hydronium ion, as compared to hydroxide ions, can play an important role in screening the negative charges on the sulfate groups of the octadecyl sulfate. If the pH of the aqueous continuous phase is reduced further to a lower pH, but still above the pKa of the sulfate group, then a non-crystalline hyperuniform structure that still exhibits color in backscattering can be obtained. Conversely, in weakly basic solutions, charge neutrality dictates that some cationic species should be also in the aqueous solution at a nearly equal concentration to balance the excess in hydroxide ion concentration. This cationic component in the aqueous continuous phase (e.g. $Na^+$ if NaOH is added to raise pH) and also causes screening of the sulfate charges on the surfaces of the nanodroplets. So, deduction is made that opalescent crystalline nanoemulsion structures can be obtained at room temperature from a weakly acidic solution having a pH down to about pH 5.4 to a weakly basic solution having a pH up to about pH 8.6. Hyperuniform nanoemulsions occur in two different pH ranges: (1) from a pH of about 5.4 down to at least about $4.06=-\log_{10}(87.6\times10^{-6}$ M) and possibly towards the pKa of the sulfate charge group, and (2) from a pH of about 8.6 up towards higher pH. At a sufficiently low pH, as the pH approaches the pKa of the sulfate charge groups, these groups become fully protonated and thus charge-neutral; therefore, the nanoemulsion in such a condition is unstable to droplet coalescence since the charge-repulsion between droplet interfaces is effectively removed.

In an embodiment, an opalescent fractionated ultrastable nanoemulsion has a pH between about 5.4 and about 8.6.

In an embodiment, a hyperuniform fractionated ultrastable nanoemulsion has a pH between about 4.0 and about 5.3.

In an embodiment, a hyperuniform fractionated ultrastable nanoemulsion has a pH between about 8.6 and about 11.

Observations of Differently Colored Opalescent and Hyperuniform Nanoemulsions

Table S1 summarizes the different colors and types of structures observed for a variety of fractionated ultrastable nanoemulsions having different <a> and φ at reduced ionic strength. The observations include colors of violet, blue, cyan, green, orange, and red. Since the spectrum of visible light is continuous, these colors crudely capture the dominant wavelength associated with backscattered light, when the nanoemulsion is illuminated with white visible light in a backscattering configuration. Thus, each nanoemulsion selectively backscatters a particular dominant color as a consequence of diffraction. At other observation angles than 180 degree backscattering, the apparent color of the nanoemulsion changes in a manner that is roughly in accord with Bragg's law. It is found that the observations are overall consistent with the theoretical prediction that $<a>/\phi^{1/3}$ is proportional to the observed peak backscattering wavelength, even if the constant of proportionality is not exactly the same for hyperuniform non-crystalline nanoemulsions as for opalescent crystalline nanoemulsions.

Figure 20A:
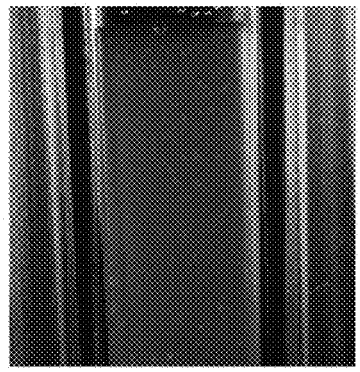
FIGS. 20A-20C. Backscattering color macrophotography images of monodisperse poly-dimethylsiloxane (PDMS) oil-in-water nanoemulsions stabilized with sodium octadecyl sulfate (SOS), fractionated 4 times (C2222*: middle, middle, middle, middle plug sections) having average droplet radius <a>=37.7±0.1 nm (uncertainty in mean) and φ=0.017.
Figure 20B:
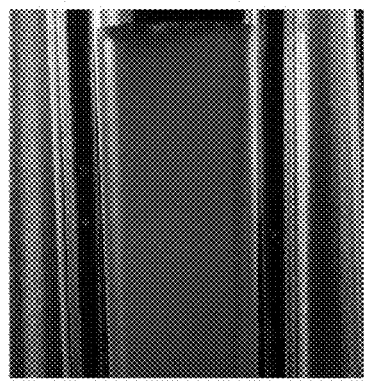
Figure 20C:
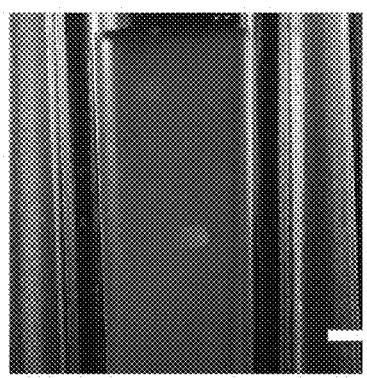

Using Ultrasonic Agitation to Increase Crystal Sizes of Opalescent Nanoemulsions Empirically, it is found that mild ultrasonic agitation using an ultrasonic bath can be used to de-crystallize fractionated ultrastable oil-in-water nanoemulsions that have formed crystals, yielding temporary hyperuniform non-crystalline states immediately after ultrasonication (see FIG. 20). However, because the crystalline structure is the equilibrium structure, via entropic excitations and charge repulsions between the nanodroplets, the nanoemulsion system self-assembles rapidly back into crystals (e.g. roughly 100 seconds to fully self-assembly millimeter size crystals after the ultrasonication has been stopped). Using this approach, even without exploring all different possible ultrasonic parameters (e.g. frequency, amplitude, and duration of the applied ultrasonic excitation), this allows control and increase of the overall spatial sizes of individual crystals of nanodroplets by about a factor of 10 (see FIG. 20).

The intensity of this ultrasonic agitation is low enough that droplets are not ruptured and coalescence of droplets does not occur. The evidence for this is based on the observation that the crystals of nanodroplets reform after the ultrasonication has been stopped, and the crystallization is sensitive to the polydispersity and sizes of the nanodroplets, which would have been altered through such rupturing and/or coalescence processes, if they had occurred. So, because observation is made of predominantly the same color of crystal and no significant reduction in the overall crystal volume in the nanoemulsion sample results a long time after ultrasonication, it is concluded that the ultrasonication causes positional rearrangement of nanodroplets into a temporarily disordered, de-crystallized, out-of-equilibrium hyperuniform structure.

Nanoemulsion Crystals: A Biliquid Photonic Bandgap Material

Given the sharpness and narrowness of the peaks in the backscattering spectra from crystalline nanoemulsions (see FIG. 24A-24G), such nanoemulsion crystals represent a photonic bandgap material, since the incident light is very strongly backscattered in a very narrow wavelength range, leading to a very highly reduced transmission in the same very narrow wavelength range. In some embodiments, a photonic bandgap material is created by causing a reduced-polydispersity nanoemulsion to organize into a crystalline structure. Moreover, the wavelength corresponding to the photonic band-gap of such a biliquid crystalline nanoemulsion can be tuned from the ultraviolet through the visible and into the infrared regions of wavelengths. It is noted that such biliquid crystalline nanoemulsions are ordered hyperuniform structures.

Non-Crystalline Hyperuniform Nanoemulsions: Uniformly Colored Biliquid Materials Non-crystalline hyperuniform nanoemulsions, when illuminated using directional white light, appear as uniformly colored in backscattering (see FIG. 25A-25E), and the backscattered color can be tuned by adjusting the average droplet radius, droplet size polydispersity, droplet volume fraction, and ionic strength in the continuous phase. Such non-crystalline hyperuniform nanoemulsions exhibit broader peaks in their backscattering spectra (see FIG. 25), as compared to crystalline nanoemulsions.

Alternative Compositions of Crystalline and Non-Crystalline Hyperuniform Emulsions It can be reasonably proposed that a continuous phase other than water can be used to create crystalline and non-crystalline hyperuniform emulsions having color-selective optical properties, provided that the continuous phase is chosen so as to maintain stability of the emulsion and is immiscible with the dispersed droplet phase.

While demonstration is made of both crystalline and non-crystalline hyperuniform emulsions using oil-in-water emulsion compositions (e.g. polar-liquid continuous phase and nonpolar-liquid dispersed droplet phase), it can be reasonably proposed that other emulsion types using other types of surfactant stabilizers can be employed to create crystalline and non-crystalline hyperuniform emulsions. In particular, water-in-oil, and oil-in-oil types of emulsions, in which charges exist predominantly at the interfaces of droplets between the immiscible liquid materials, can be created using a similar methods as described herein, involving electrostatic repulsive interactions between like charges on, just inside, or just outside the droplets' surfaces. In the case of nonpolar liquids used as a continuous phase, the phenomenon of charge-screening is not readily produced, yet it is understood that effective Debye screening lengths in such nonpolar materials are typically very large since ions are not typically soluble to a high degree in these materials. Thus, nonpolar continuous phases should be able to transmit charge-repulsion between droplets at sufficient range to enable the creation of crystalline and non-crystalline hyperuniform emulsions.

It can be reasonably proposed that the materials used in the composition of the continuous phase and of the dispersed phase of emulsions formed by electrostatic repulsive interactions into either crystalline or non-crystalline hyperuniform structures do not strictly have to be simple liquids, but rather can be solutions, liquid crystals, dispersions, polymeric liquids, ferrofluids, and other types of complex fluids.

TABLE S1

Observed Opalescent Crystalline and Hyperuniform Nanoemulsions

| Fraction | $<a>$ (nm) | φ | color | X/HU | $\sigma_e$ (μS/cm) | $\lambda_{max}$ (nm) | $<a>\phi^{1/3}$ (nm) |
|---|---|---|---|---|---|---|---|
| A121 | 48 | 0.050 | violet | HU | — | — | 130 |
| A112 | 51.3 | 0.045 | violet | X | — | 440 | 144 |
| B222* | 40 | 0.021 | blue | X | 11 | — | 145 |
| C2222* | 37.7 | 0.017 | blue | X | 9 (aq) | 452 | 147 |

TABLE S1-continued

Observed Opalescent Crystalline and Hyperuniform Nanoemulsions

| Fraction | $<a>$ (nm) | $\phi$ | color | X/HU | $\sigma_e$ ($\mu$S/cm) | $\lambda_{max}$ (nm) | $<a>$ $\phi^{1/3}$ (nm) |
|---|---|---|---|---|---|---|---|
| A112 | 51.3 | 0.036 | blue | X | — | 476 | 155 |
| A121 | 48 | 0.030 | cyan | HU | — | — | 154 |
| D121 | 49 | 0.030 | cyan/green | X | — | 503 | 158 |
| C2221* | 39.9 | 0.016 | cyan/green | X | 7 (aq) | 500 | 158 |
| A112 | 51.3 | 0.030 | green | X | — | 505 | 165 |
| A112 | 51.3 | 0.026 | green | HU | — | 546 | 173 |
| D121 | 49 | 0.022 | green | HU | — | 550 | 175 |
| D2222 | 53 | 0.027 | green | X | 16 | — | 177 |
| A121 | 48 | 0.016 | green | X | 16 | — | 190 |
| A112 | 51.3 | 0.020 | orange | HU | — | 612 | 189 |
| A121 | 48 | 0.015 | red | HU | — | — | 195 |
| D121 | 49 | 0.014 | red | HU | — | 642 | 203 |
| A112 | 51.3 | 0.016 | red | HU | — | 646 | 204 |
| E111 | 80 | 0.021 | red | X | 14 | — | 290 |

Fractionated ultrastable poly-dimethylsiloxane (PDMS) oil-in-water nanoemulsions that have yielded at least one of a crystalline and a hyperuniform structure after a concentrated washed plug of nanoemulsion has been diluted with deionized water to a lower final volume fraction $\phi$. Fraction: refers to a particular starting unfractionated nanoemulsion (A, B, C, D, E) and then the sequence of sections from the concentrated plugs after each ultracentrifugation step. For Fractions that do not have a final *: each plug was split into two equal sections at each step (top=1, bottom=2). For Fractions that do have a final *: each plug was split into three equal sections at each step (top=1, middle=2, bottom=3). The hydrodynamic radius $<a>$ is measured by DLS. The observed color in backscattering configuration when illuminated with white light. Observed structure of nanoemulsion in a bulk sample is given by X/HU: X=crystal, HU=hyperuniform non-crystalline. Electrical conductivity measurements of the nanoemulsion is $\sigma_e$: if (aq) is present, then this number refers to measured conductivity of just the nanoemulsion's continuous phase. Measured peak wavelength that is observed in backscattering is $\lambda_{max}$. Also shown are calculated values of $<a>/\phi^{1/3}$ For reference, commonly used wavelength ranges associated with various colors are: violet (380-450 nm), blue (450-485 nm), cyan (485-500 nm), green (500-565 nm), yellow (565-590 nm), orange (590-625 nm), and red (625-740 nm).

Example 4. Hyperuniform Photonic Nanoemulsions and Biliquid Opals

Figure 26A:
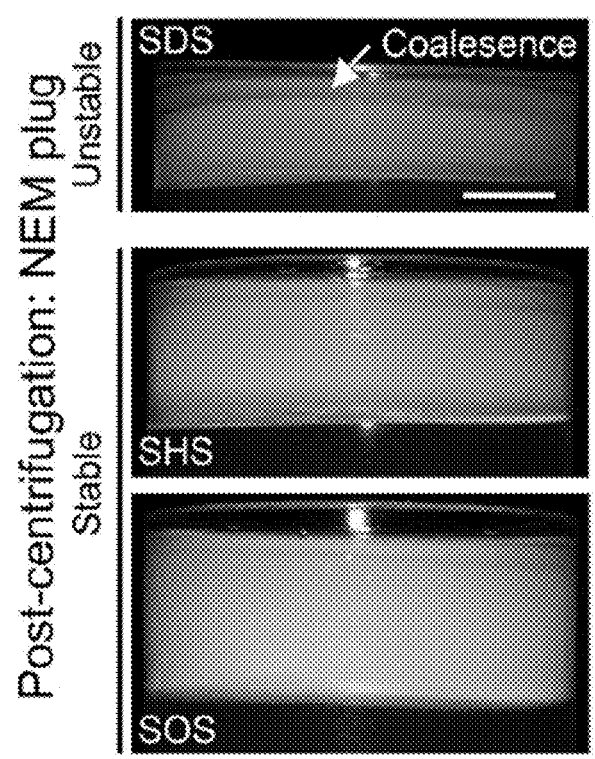
FIG. 26A: Size-fractionated poly-dimethylsiloxane (PDMS) O/W nanoemulsions made using sodium dodecyl sulfate (SDS) surfactant coalesce after repeated centrifugation and dilution with deionized water to reduce ionic strength I. Using higher carbon-number surfactants sodium hexadecyl sulfate (SHS) and sodium octadecyl sulfate (SOS) yields ultrastable PDMS O/W nanoemulsions since HS⁻ and OS⁻ adsorption onto droplet interfaces is effectively irreversible (see Methods in Example 5, FIG. 30). Small multi-color bands are observed at the bottoms of the SHS and SOS plugs. Scale bar: 5 mm (same for all images).

To make photonic oil-in-water (O/W) nanoemulsions, a combination of high flow-rate emulsification[23] (HFRE) to reach nanoscale average droplet radii $<a>$, subsequent centrifugal fractionation[23, 24] to reduce droplet size polydispersity $\delta a/<a>$, and centrifugal deionization to reduce the ionic strength I in the continuous aqueous phase (see Methods in Example 5, Extended Data Table 1, FIG. 26A) is used. Hot HFRE is performed at a temperature $T_{HFRE} \approx 50°$ C. using a long-tail ionic surfactant, such as sodium octadecyl sulfate (SOS), that has a higher solubility and greater capacity to adsorb onto newly created droplet interfaces. Alternatively, O/W nanoemulsions made by HFRE at room temperature ($T_r \approx 23°$ C.) using a smaller chain length surfactant, such as sodium dodecyl sulfate (SDS), can be surfactant-exchanged through competitive adsorption-desorption using a heated SOS solution at $T_{exch} \approx 75°$ C., thereby populating nanodroplet surfaces predominantly with SOS. The resulting hot nanoemulsion is then cooled to room temperature, which greatly reduces the SOS desorption rate from droplet interfaces and confers a high degree of stability to the droplets through screened charge repulsion even after repeatedly fractionating and centrifugally deionizing (see Methods in Example 5, Extended Data FIG. 26 and FIG. 27). The resulting nanoemulsion droplets have zeta potentials[25, 26] $\zeta$ in the range from about −45 mV to −55 mV (see Methods in Example 5, Extended Data Table 1) and remain stable against coalescence even when concentrated to high droplet volume fractions $\phi$ even after significant deionization. Such ultra-stable fractionated nanoemulsions (USF-NEMs) thus overcome limitations of desorption of other more common ionic surfactants that have shorter tails (e.g. SDS), which leads to droplet coalescence while lowering I through deionization, yet also provide reduced $\delta a/<a>$ known to facilitate crystallization of charged solid colloidal particles through electrostatic repulsion[11]. Moreover, this highly parallel fabrication protocol provides bulk quantities of concentrated USF-NEMs of a variety of oils and long-chain surfactants that can be used for many different purposes, including exploring nanodroplet self-assembly and structure-dependent photonic material properties.

Extended Data Table 1:
Characteristics of deionized nanoemulsion concentrates.

| NEM fraction | $<a>$ (nm) | $\delta a/<a>$ | $\mu_e$ ($\mu$m/s)/(V/cm) | $\zeta$ (mV) | $\phi_I$ |
|---|---|---|---|---|---|
| A111 | 64.4 ± 0.5 | 0.16 ± 0.04 | −4.1 ± 0.2 | −53 ± 3 | 0.263 ± 0.005 |
| A112 | 57.9 ± 0.7 | 0.13 ± 0.06 | −4.4 ± 0.2 | −56 ± 4 | 0.179 ± 0.006 |
| A121 | 59.9 ± 0.6 | 0.13 ± 0.04 | −4.3 ± 0.1 | −55 ± 3 | 0.149 ± 0.005 |
| A122 | 53.7 ± 0.4 | 0.14 ± 0.05 | −4.4 ± 0.3 | −56 ± 4 | 0.139 ± 0.007 |
| A211 | 47.8 ± 0.8 | 0.13 ± 0.05 | −3.9 ± 0.5 | −50 ± 7 | 0.208 ± 0.005 |
| A212 | 41.5 ± 0.6 | 0.15 ± 0.06 | −3.5 ± 0.2 | −45 ± 3 | 0.179 ± 0.006 |
| A221 | 39.1 ± 0.3 | 0.11 ± 0.04 | −3.0 ± 0.4 | −39 ± 5 | 0.165 ± 0.006 |
| A222 | 34.1 ± 0.3 | 0.14 ± 0.04 | −3.3 ± 0.1 | −42 ± 1 | 0.155 ± 0.005 |
| B121+ | 48.2 ± 0.4 | 0.18 ± 0.03 | −3.5 ± 0.1 | −45 ± 2 | 0.181 ± 0.007 |
| B2221 | 39.9 ± 0.2 | 0.08 ± 0.02 | −3.2 ± 0.1 | −43 ± 2 | 0.173 ± 0.007 |
| B2222 | 37.7 ± 0.4 | 0.07 ± 0.03 | −4.4 ± 0.2 | −56 ± 3 | 0.162 ± 0.005 |
| C2211 | 56.3 ± 0.5 | 0.08 ± 0.03 | −3.9 ± 0.2 | −50 ± 4 | 0.219 ± 0.005 |
| D | 54.1 ± 0.8 | 0.30 ± 0.08 | −3.4 ± 0.2 | −43 ± 2 | 0.241 ± 0.006 |
| D2 | 54.2 ± 0.8 | 0.25 ± 0.06 | −3.4 ± 0.1 | −44 ± 1 | 0.233 ± 0.007 |
| D22 | 53.6 ± 1.3 | 0.21 ± 0.05 | −3.5 ± 0.3 | −44 ± 4 | 0.229 ± 0.007 |
| D222 | 53.3 ± 0.4 | 0.14 ± 0.03 | −3.5 ± 0.2 | −45 ± 3 | 0.239 ± 0.005 |
| D2222 | 53.3 ± 0.1 | 0.10 ± 0.02 | −3.4 ± 0.1 | −43 ± 1 | 0.212 ± 0.005 |

Each fraction name (left column) begins with a letter designating a particular starting unfractionated nanoemulsion, and provides the sequence of fractionation steps through an ordered list of numbers (see Methods in Example 5). Reported herein are average droplet hydrodynamic radii $<a>$ and polydispersities $\delta a/<a>$, measured using dynamic light scattering (see Methods in Example 5), as well as the average electrophoretic mobility $\mu_e$ and zeta potential $\zeta$ of constituent nanodroplets (see Methods in Example 5). Uncertainties in $<a>$ represent s.d. of the respective means, calculated from cumulant analysis. Uncertainties in $\delta a/<a>$, $\mu_e$, and $\zeta$ represent s.d. of three trials for each. Initial (i.e. pre-dilution) volume fractions $\phi_I$ of the concentrates are measured gravimetrically (see Methods in Example 5); uncertainties in $\phi_I$ represent propagated s.d. using uncertainties of pre- and post-evaporation mass measurements.

Figure 26B:
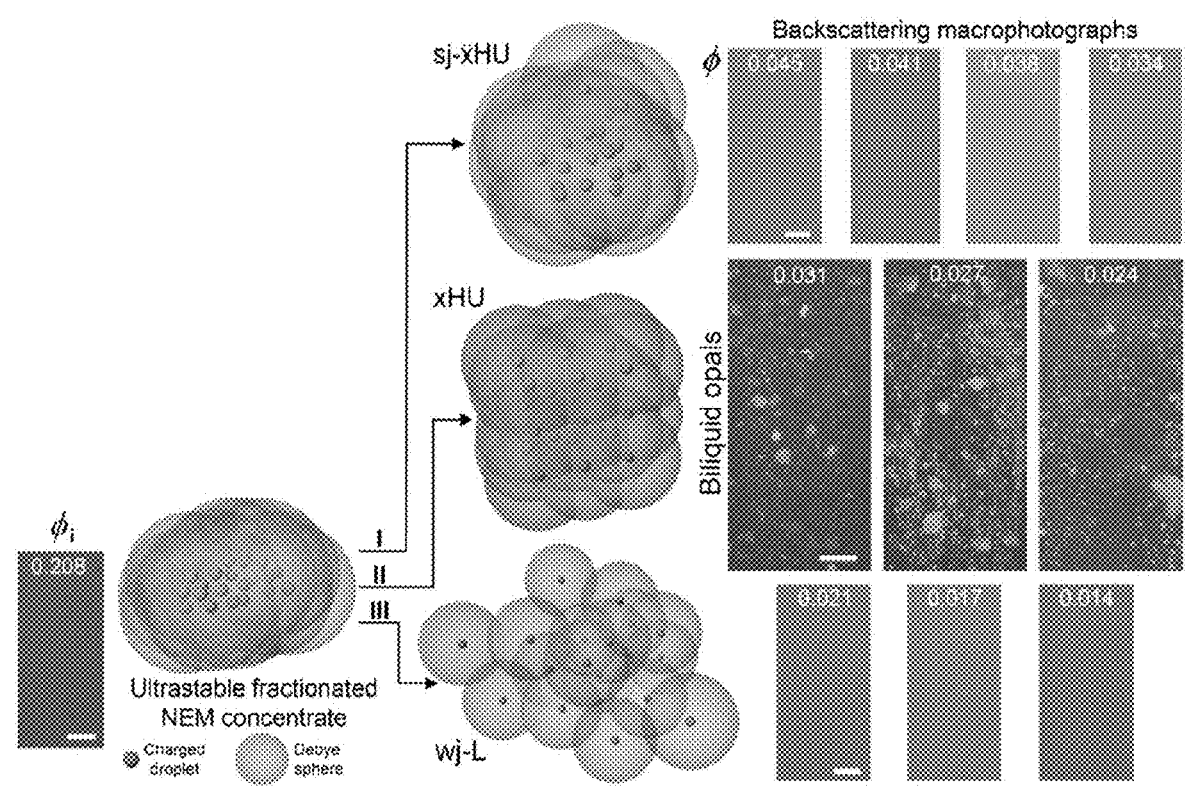
FIG. 26B: Fractionated SOS-stabilized PDMS O/W nanoemulsion concentrate having average droplet radius <a>=47.8 nm (A211, $\phi_i$=0.21, see FIG. 30) at reduced I (backscattering macrophotograph BMP, left) is diluted with different volumes of deionized water in a final step, lowering the final droplet volume fraction $\phi$ as well as I (schematic, see Methods in Example 5). Less dilution (path I) yields electrostatic strongly jammed non-crystalline hyperuniform (sj-x̄HU) disordered nanodroplet structures which have strong photonic colors and a uniform appearance (BMPs, upper right). Debye spheres around charged nanodroplets highly overlap, indicating strong electrostatic repulsion relative to thermal energy $k_BT$ More dilution (path II) yields crystalline hyperuniform (xHU) ordered nanodroplet structures that exhibit brilliant monochromatic opalescence as a consequence of Bragg scattering from a subset of crystallites having specific orientations (BMPs, middle right). Even more dilution (path III) yields weakly jammed liquid-like (wj-L) disordered nanodroplet structures that uniformly display only muted colors (BMPs, lower right). White scale bars: 1.0 mm.
Figure 26C:
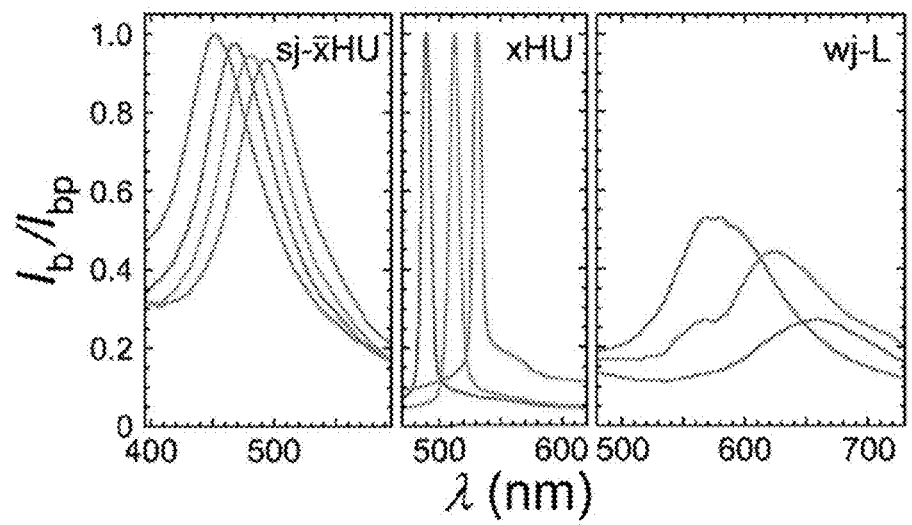
FIG. 26C: Visible backscattering spectra (intensity $I_b$ normalized by peak intensity $I_{bp}$ versus light wavelength 2, see Methods in Example 5) of photonic sj-$\bar{x}$HU (left), xHU (center), and wj-L (right) nanoemulsions. Curves are color coded to BMPs in FIG. 26B; xHU spectra exhibit very narrow peaks which are all normalized to unity. Peaks of disordered sj-$\bar{x}$HU and wj-L structures are on a common intensity scale to show higher color saturation of sj-$\bar{x}$HU, and only the peak at $\phi=0.045$ set to unity.
Figure 27A:
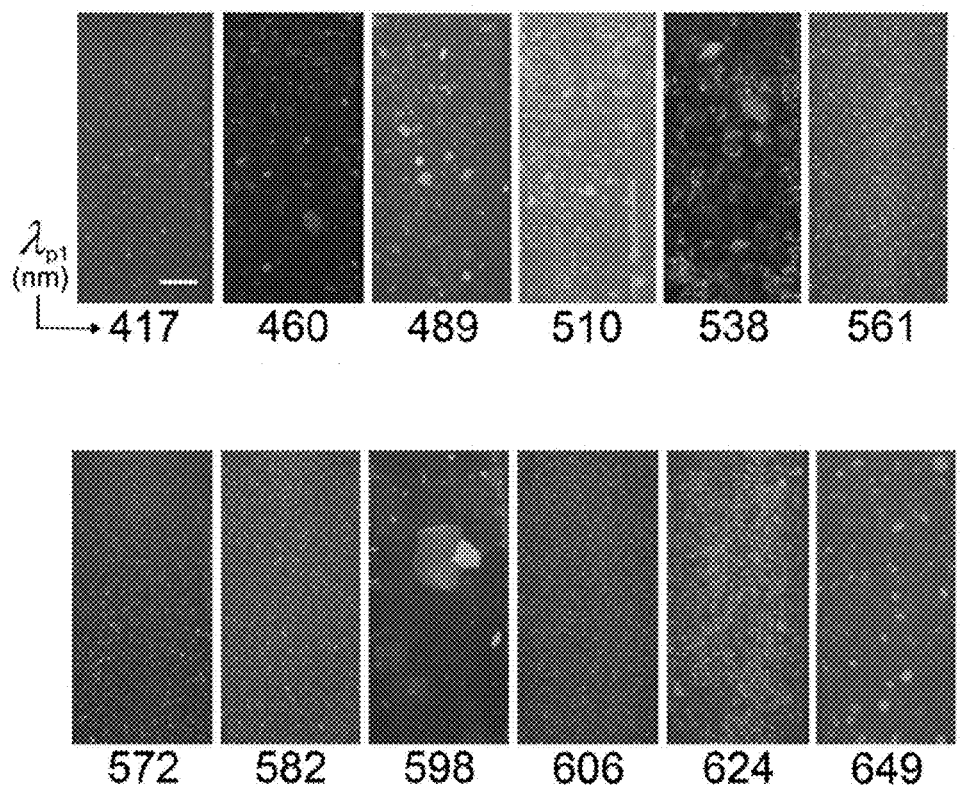
FIGS. 27A-27C. Controlling backscattered colors of crystalline biliquid opals through the volume fraction $\phi$ and average droplet radius $<a>$ of fractionated nanoemulsions.
Figure 27B:
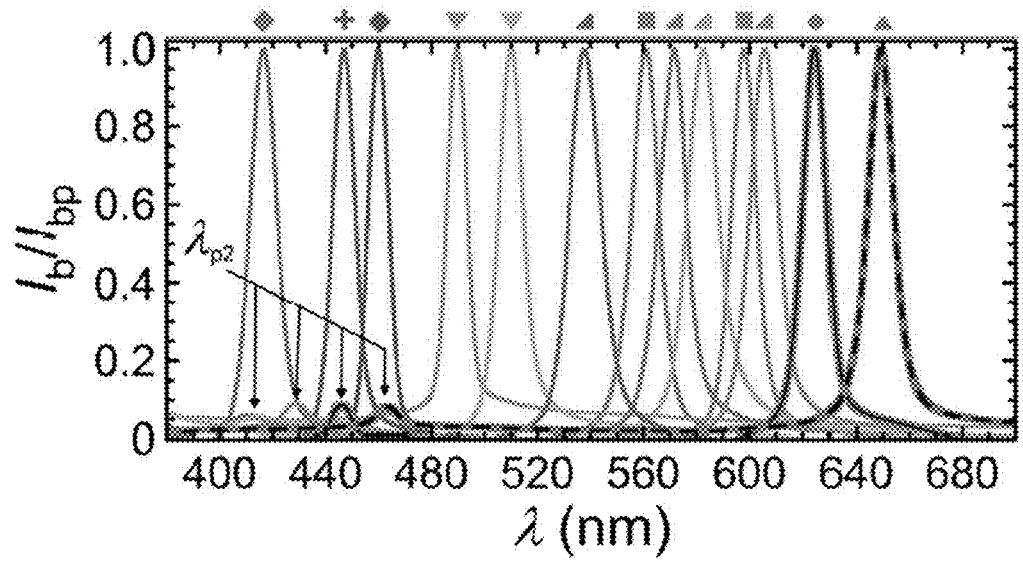
Figure 27C:
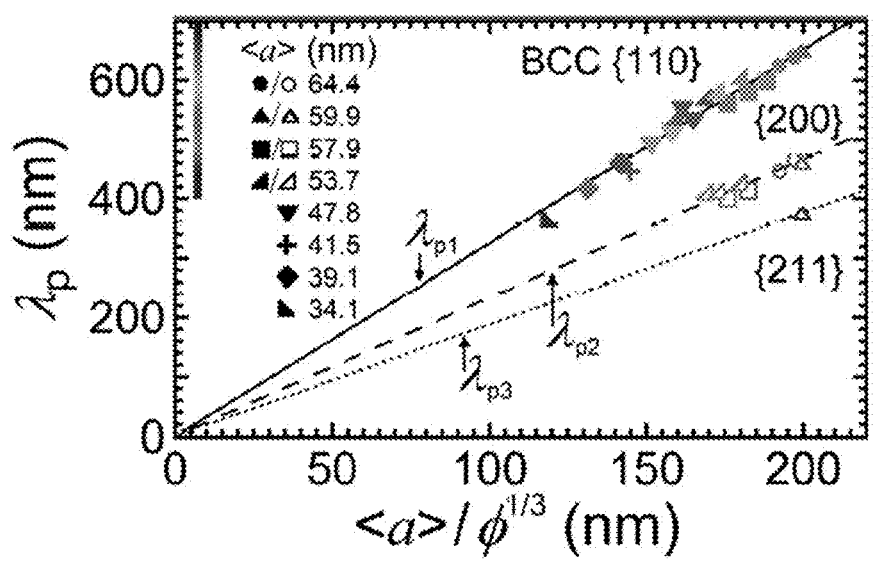
Figure 28A:
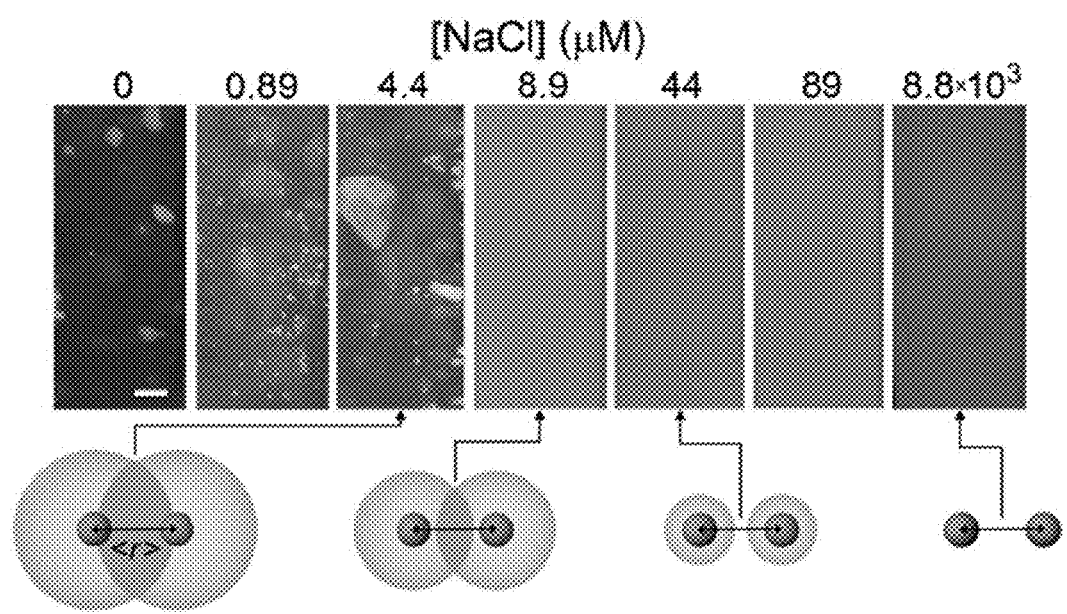
FIGS. 28A-28F. Tuning photonic nanodroplet structures through ionic strength I and pH in the aqueous continuous phase of ultrastable fractionated nanoemulsions.
Figure 28B:
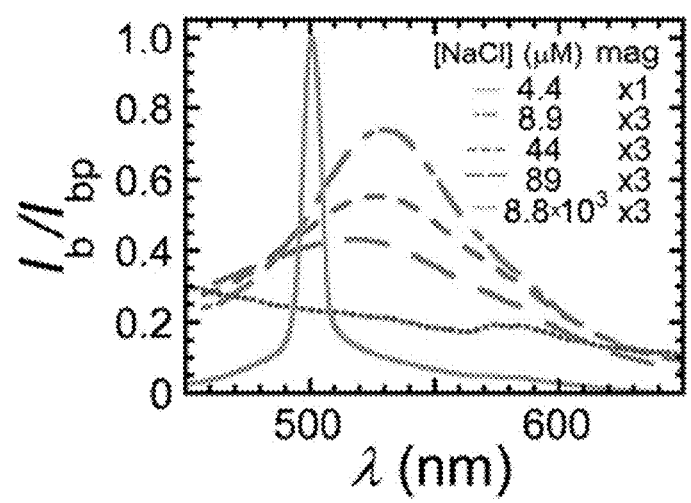
Figure 28C:
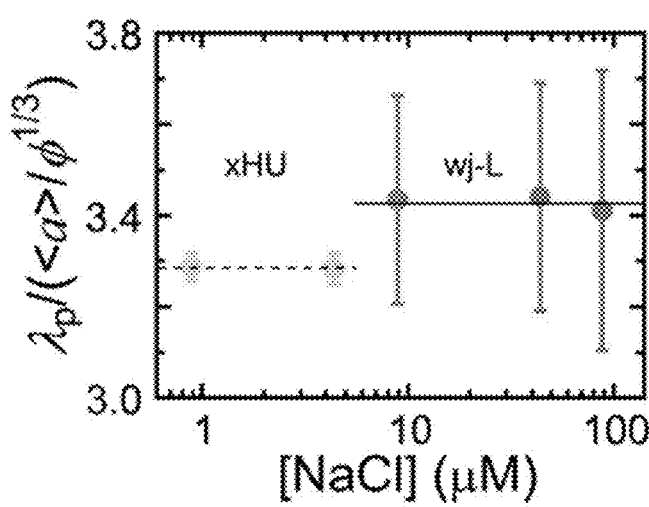
Figure 28D:
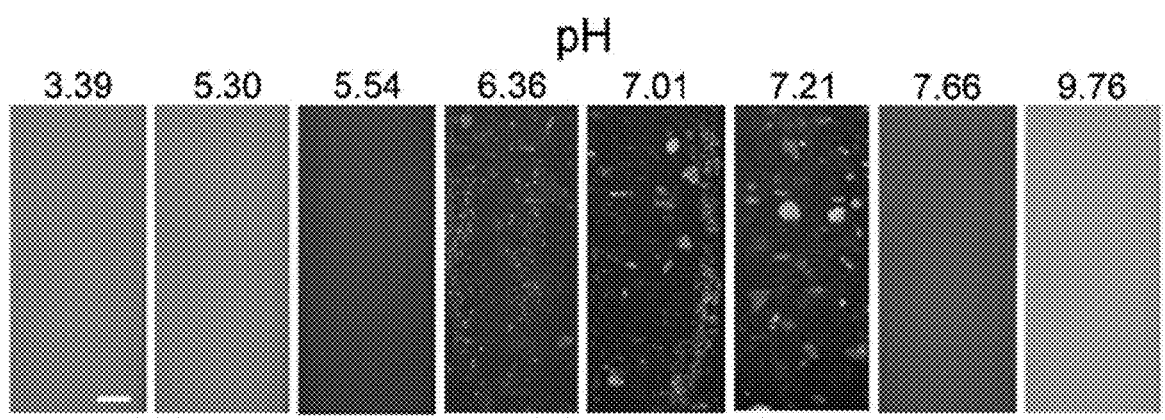
Figure 28E:
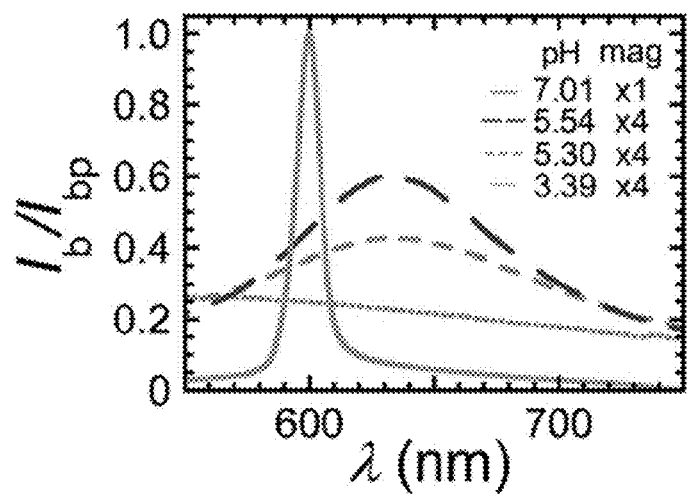
Figure 28F:
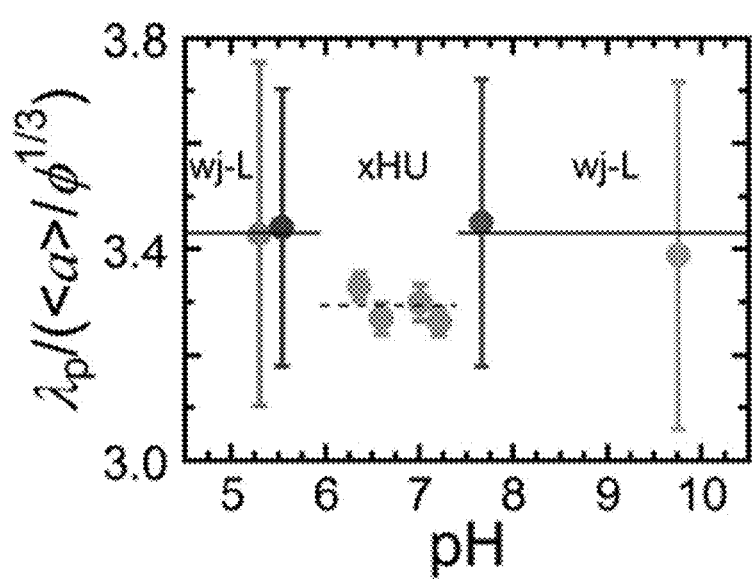
Figure 29A:
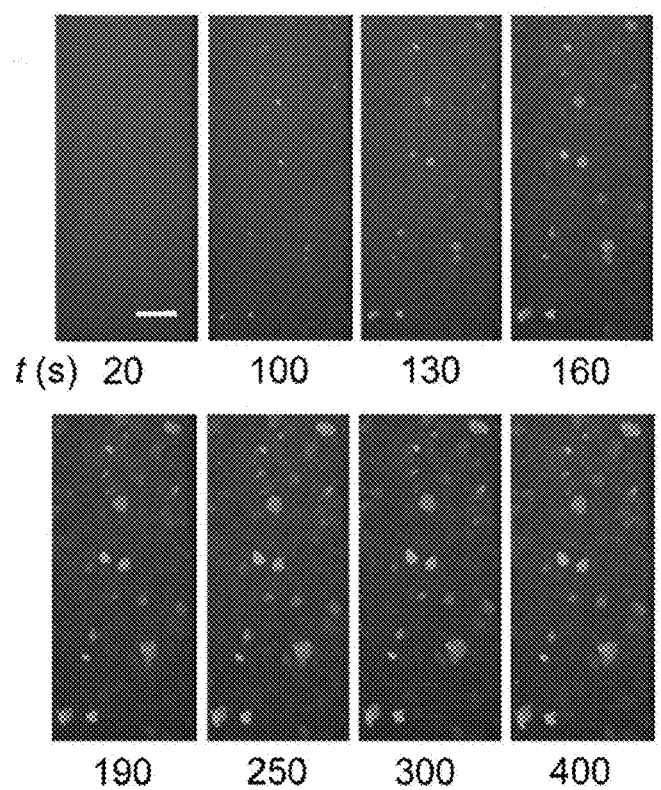
FIGS. 29A-29F. Kinetics of crystallite formation in monochromatic and bichromatic biliquid opals following dilution and ultrasonic mixing.
Figure 29B:
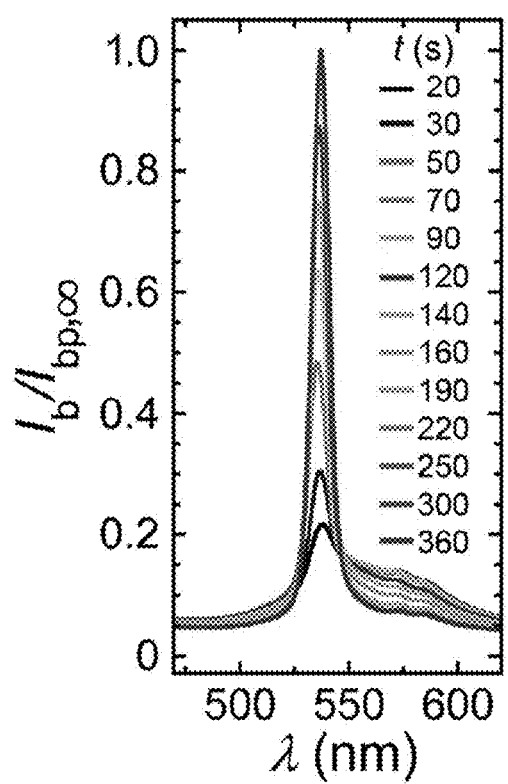
Figure 29C:
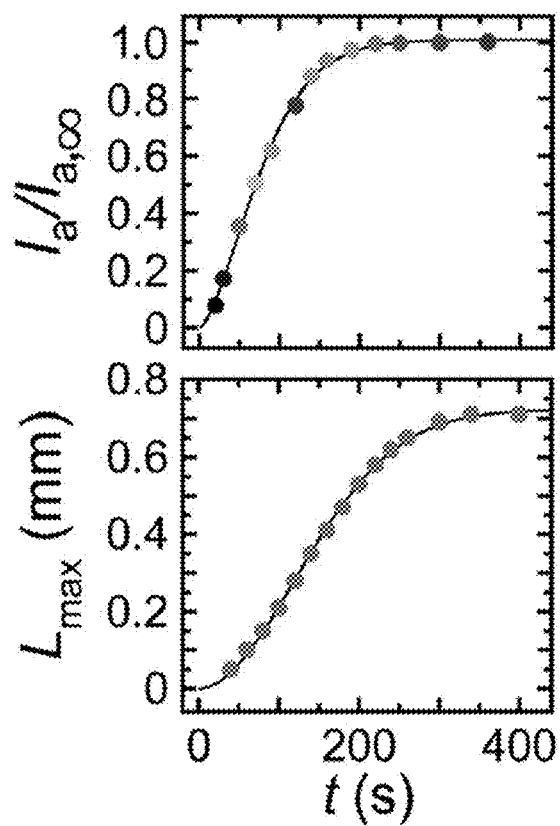
Figure 29D:
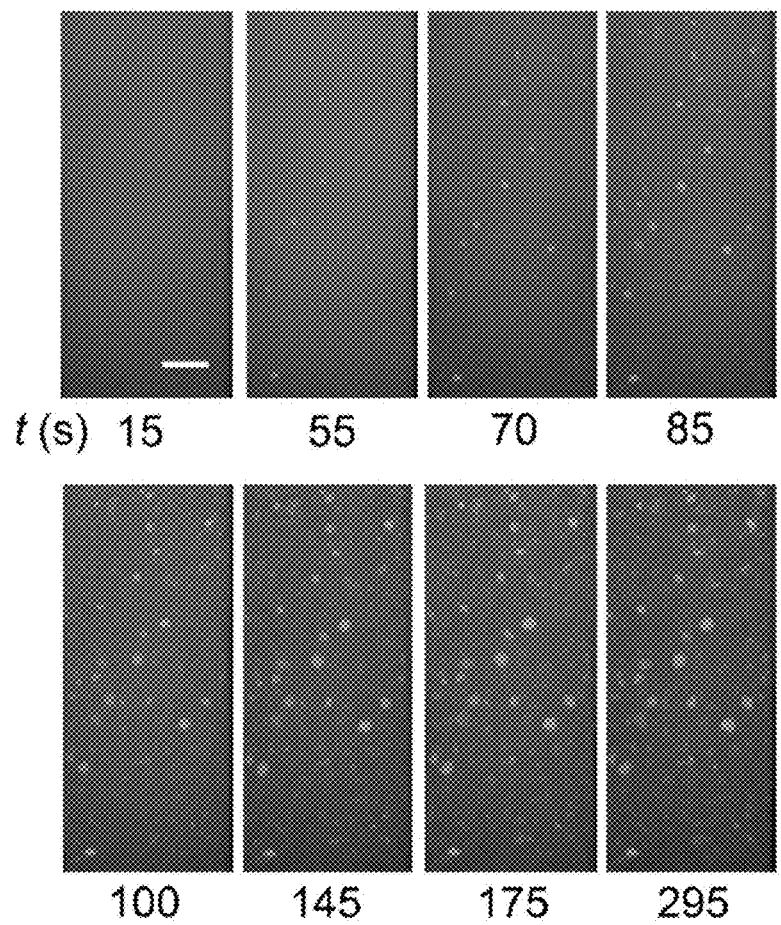
Figure 29E:
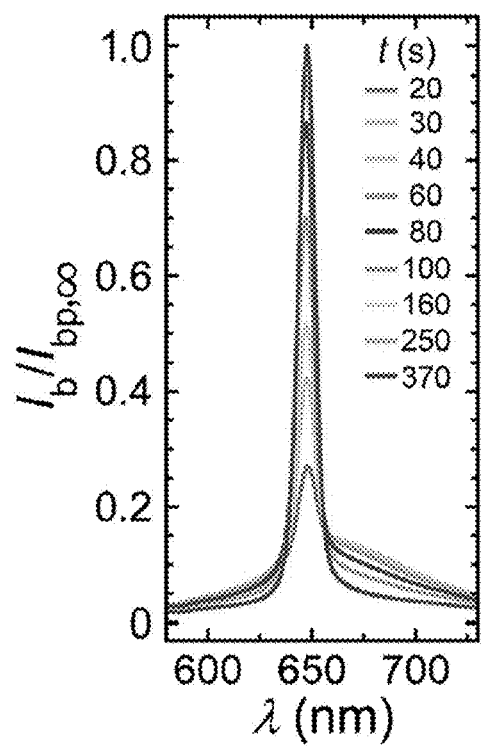
Figure 29F:
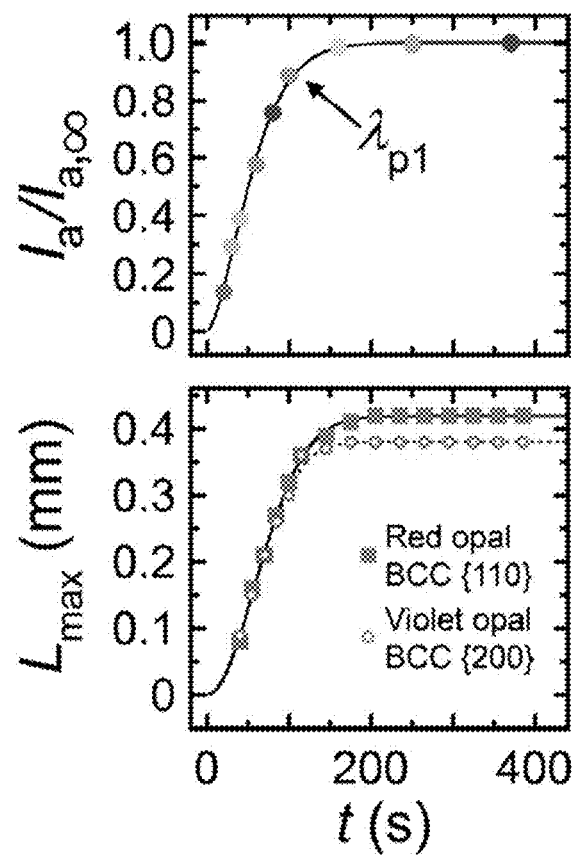

Starting with a concentrated washed USF-NEM, composed of jammed disordered droplets of poly-dimethylsiloxane (PDMS, Gelest; viscosity: 10 cSt; refractive index: n=1.40) silicone oil and stabilized by SOS, aliquots are systematically diluted to different final $\phi$ using deionized water (see Methods in Example 5, FIG. 26B). The range of final $\phi$ have been chosen to set average interdroplet center-to-center separations, $<r>$, lower than but in the vicinity of the wavelength of light, 2, in the visible range, yet substantially larger than $<a>$. The final I is low enough that the Debye screening length[26] $\lambda_D$ associated with the repulsion between the charged nanodroplets is proximate to or in excess of $<r>$, leading to strongly repulsive pair interactions compared to thermal energy $k_B T$, where $k_B$ is Boltzmann's constant and T is the temperature, for all but the largest dilution volumes. Moreover, $<a>/\lambda_D$ is typically considerably less than unity. For higher final $\phi$, when directionally illuminating the diluted USF-NEMs with white light and observing backscattering macrophotographs (BMPs, see Methods in Example 5), vibrantly colored nanoemulsions (FIG. 26B) are found, corresponding to strongly jammed[27,28] non-crystalline hyperuniform (sj-$\overline{x}$HU) droplet structures which do not have long range order but do have a very regular distribution of interdroplet separations. This hyperuniformity is also revealed through peaks in the measured optical backscattering spectra (OBS, Methods in Example 5, FIG. 26C-left). At intermediate $\phi$, strikingly, a regime of differently colored self-assembled biliquid opals containing crystallites that all exhibit a single monochromatic opalescence in backscattering (FIG. 26C-center) are found. This process of forming such biliquid opals of repulsive droplets by reducing $\phi$ and I is referred to as 'rejamming crystallization', and these photonic nanoemulsions have crystalline hyperuniform structures (xHU). Further evidence of Bragg scattering from photonic xHU nanoemulsions is seen in the OBS, which have extraordinarily narrow peaks, even compared to sj-$\overline{x}$HU structures. Biliquid opals exhibit iridescence, or variation in selectively scattered color from xHU crystallites as the angle between the illumination and detector is varied away from 180 degrees, consistent with Bragg's scattering law (see Methods in Example 5, Extended Data FIG. 28). At even higher dilutions and lower $\phi$, the crystallites no longer form as a consequence of weakened repulsion, caused by larger interdroplet spacing compared to $\lambda_D$, and hazy and weak colors are observed that result from a combination of multiple scattering as well as a very broad peak that moves progressively out towards infrared (IR) wavelengths (FIG. 26C-right). The droplet structure after very high dilution is disordered, at best weakly jammed and liquid-like (wj-L), and the presence of significant multiple scattering (loss of color saturation and increasingly milky appearance) indicates that strict hyperuniformity is lost for high dilutions towards gas-like $\phi$ well beyond the xHU region.

Figure 26D:
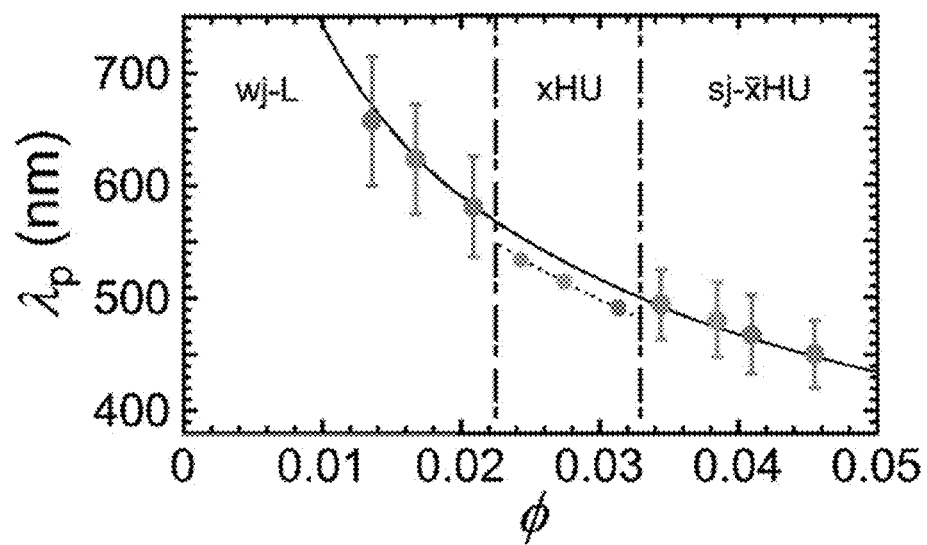
FIG. 26D: Peak wavelength $\lambda_p$ (circles, color coded to BMPs in FIG. 26B) from backscattering spectra in FIG. 26C as a function of $\phi$. Bars: end-to-end length represents full-width-at half-maximum (FWHM) of spectral peaks. Vertical long/short-dash lines: separate wj-L, xHU, and sj-$\bar{x}$HU regimes by $\phi$. Solid curve: fit of $\lambda_p(\phi)$ for disordered sj-$\bar{x}$HU and wj-L to $C_{\bar{x}}<a>/\phi^{1/3}$ ($C_{\bar{x}}=3.34\pm\pm0.01$, $R^2=0.994$, see text). Dotted curve: fit of $\lambda_p(\phi)$ for ordered xHU to $C_x<a>/\phi^{1/3}$ ($C_x=3.236\pm0.005$, $R^2=0.996$, see text).
Figure 33A:
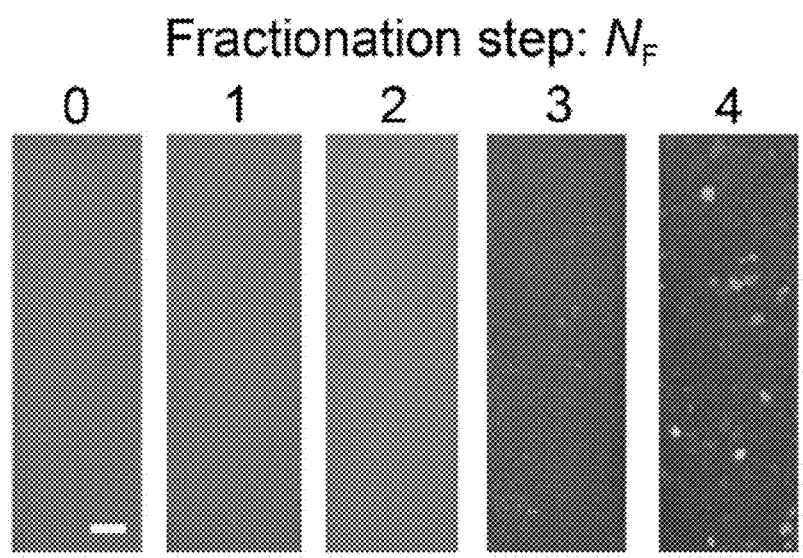
FIGS. 33A-33B. Repeated centrifugal fractionation reduces the polydispersities of nanoemulsions produced by multi-pass high flow-rate emulsification.
Figure 33B:
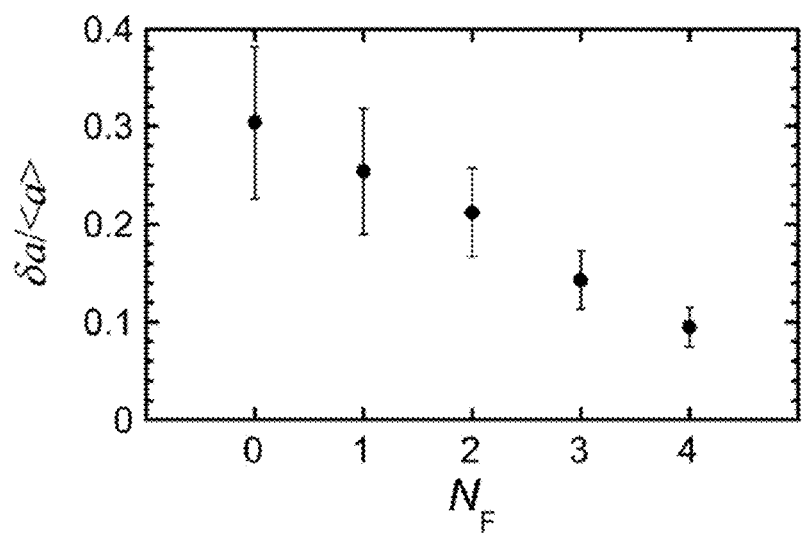

Disordered structures can be differentiated from ordered xHU by fitting the observed peak wavelengths $\lambda_p$ versus a length scale $<a>/\phi^{1/3}$, proportional to nearest-neighbor $<r>$ (FIG. 26D). The coefficients for fits $\lambda_p = C<a>/\phi^{1/3}$ to disordered and ordered structures (solid and dashed lines, respectively) are: $C\overline{x} = 3.34 \pm 0.01$ (correlation coefficient: $R^2 = 0.994$) and $C_x = 3.236 \pm 0.005$ ($R^2 = 0.996$). The clear discontinuity in $\lambda_p$ going from sj-$\overline{x}$HU to xHU regions indicates that nanodroplets can temporarily unjam and self-organize into xHU and then rejam in an ordered state that is both thermodynamically favored and also kinetically accessible over a limited range of $\phi$. At kinetically accessible $\phi$, crystallization lowers the electrostatic contribution to the system's free energy yet becomes increasingly frustrated by higher levels of polydispersity, which reduces the degree of crystallinity (see FIG. 33).

Figure 34:
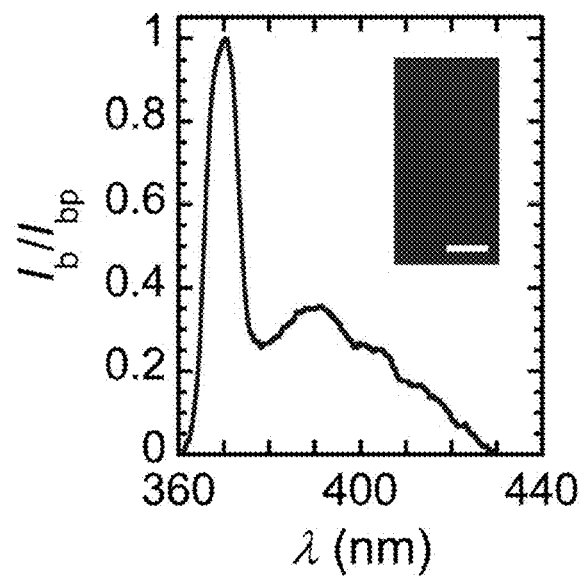
FIG. 34. Optical backscattering spectrum of a biliquid opal showing a hyperuniform crystalline peak in the ultraviolet. A fractionated nanoemulsion concentrate ($\lambda$222, $<a>=34.1$ nm, see FIG. 30) is diluted to $\phi=0.037$ using deionized water. A narrow UV peak at $\lambda_p=371$ nm having FWHM of $\Delta\lambda=10$. nm (see Methods in Example 5) is detected, indicating crystal formation with a BCC {110} d-spacing that corresponds to Bragg backscattering. A broader scattering background is also seen into the visible region accounting for a slight violet appearance (inset: backscattering macrophotograph. Scale bar: 1.0 mm).

By controlling both $<a>$ and $\phi$ of USF-NEMs formed by rejamming crystallization, the backscattering color of crystallites in the biliquid opals seen in the BMPs (FIG. 27A) as well as the primary peak wavelength $\lambda_{p1}$ in the OBS are systematically tuned over the entire visible range (FIG. 27B), and even into the ultraviolet (UV, see FIG. 34). The measured $\lambda_{p1}(<a>/\phi^{1/3})$ from OBS can be fit by a simple line (see Methods in Example 5, FIG. 27C): $\lambda_{p1} = C_{p1}<a>/\phi^{1/3}$, yielding $C_{p1} = 3.26 \pm 0.02$. Opalescence at longer visible $\lambda_{p1}$ can be achieved by using USF-NEMs having larger $<a>$ yet a similar degree of fractionation. Interestingly, for BMPs having orange and red $\lambda_{p1}$, a smaller population of violet and blue crystallites, respectively, and corresponding smaller secondary peaks $\lambda_{p2}$ in OBS are also observed. The locations of these secondary peaks are fit to a different line (FIG. 27C): $\lambda_{p2} = C_{p2}<a>/\phi^{1/3}$, yielding $C_{p1} = 2.34 \pm 0.02$. The ratio of these fitted slopes is $C_{p1}/C_{p2} = 1.393 \pm 0.015$. This measured ratio is very close to $\sqrt{2} \approx 1.41$, so it is deduced that $\lambda_{p1}$ corresponds to first-order Bragg backscattering from certain BCC crystallites aligned with Miller indices {110}, whereas $\lambda_{p2}$ corresponds to first-order Bragg backscattering from BCC {200} (i.e. the same type of BCC crystallites, yet differently oriented). Face-centered cubic (FCC) is effectively ruled out, since the first two allowed Miller indices of FCC would yield a ratio $[C_{p1}/C_{p2}]_{FCC}$ of $2/\sqrt{3} \approx 1.15$, and this would imply a secondary color at much higher $\lambda_{p2}$ than what is observed. For the very highest observed $\lambda_{p1} = 649$ nm, in addition to $\lambda_{p2} = 460$ nm, a weak peak in the UV at $\lambda_{p3} = 376$ nm (FIG. 27C) is observed. This $\lambda_{p3}$ is consistent with the next allowed BCC {211} crystallite orientation (see Methods in Example 5).

To explore the ionic conditions over which xHU biliquid opals and uniformly colored disordered nanoemulsions can be formed, USF-NEMs are diluted with saline, acidic, and basic solutions and examined the resulting photonic nanodroplet structures (FIG. 28). First, using a fractionated USF-NEM having $<a> = 39.9$ nm that readily crystallizes after diluting with deionized water, the final dilution is made to the same $\phi = 0.018$ using NaCl salt solutions (see Methods in Example 5), yielding a wide range of final I [NaCl]. For final [NaCl] < 8 μM, green-teal crystallites of xHU are observed (FIG. 28A and FIG. 28B); the largest crystallite with spatial dimensions of $L_{max} \approx 2$ mm (FIG. 28A, e.g. teal crystallite at [NaCl] = 4.4 μM) contains approximately $N_{droplet} \approx L_{max}^3/[(4\pi/3)(<a>^3/\phi)] \approx 5 \times 10^{11}$ self-assembled nanodroplets. By contrast, for added [NaCl] near but above that value, the repulsion is more highly screened (see schematic in FIG. 28A), and uniform disordered wj-L structures and increasingly muted colors at higher [NaCl] are found. For higher [NaCl], the peaks in the observed backscattering spectra become increasingly wide and ultimately disappear (FIG. 28C). Second, since pH can also significantly influence the equilibrium concentration of the hydronium $H_3O^+$ and hydroxide ions Off in the aqueous continuous phase, which in turn can affect $\lambda_D$, it is also shown that rejamming crystallization, which gives xHU in near-neutral conditions, is hindered for added pH beyond a near-neutral range (FIGS. 28D and 28E, $<a> = 59.9$ nm, $\phi = 0.035$, see Methods in Example 5). The values of the dimensionless coefficients for the scaled primary peak wavelength $\lambda_p/(<a>/\phi^{1/3})$ of the less efficient disordered structures wj-L and more efficient ordered structures xHU (FIG. 28F) match those found for a differently sized USF-NEM in FIG. 26D.

Figure 35:
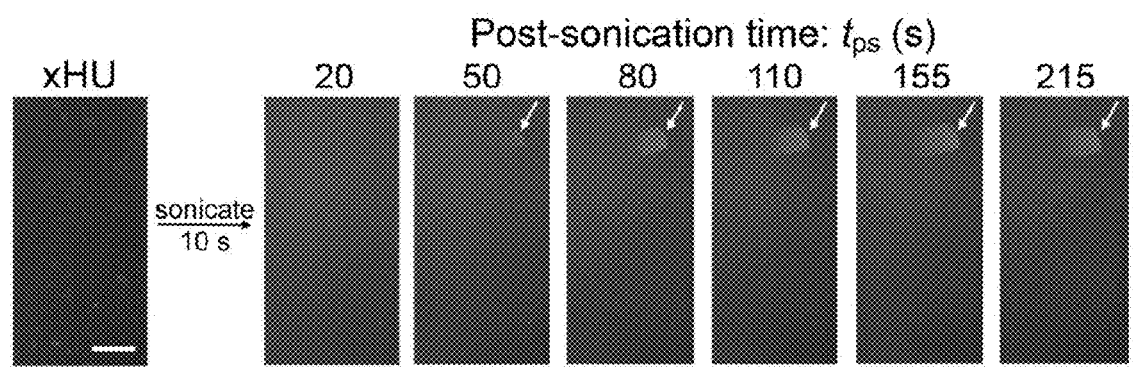
FIG. 35. Ultrasonic destruction of nanoemulsion crystallites in a biliquid opal and subsequent crystallite regrowth. Prior to sonication: A crystalline xHU nanoemulsion is prepared by diluting a deionized concentrated nanoemulsion (B2222, $<a>=37.7$ nm, $\phi_i=0.162$) to $\phi=0.017$ and allowing crystallites to grow and jam for a duration of $\approx 200$ s. Many small blue-violet crystallites are observed in this stationary initial state. Scale bar: 1.0 mm. Sonication: The polycrystalline nanoemulsion is placed in an ultrasonic bath (see Methods in Example 5, 10 s duration), causing destruction of the crystallites seen in the initial state. Time-lapse backscattering macrophotographs at different post-sonication times, $t_{ps}$, reveal rapid growth of fewer yet much larger crystallites having the same color in the nanoemulsion. Scale bar: 1.0 mm.

The growth of crystallites of USF-NEMs through rejamming crystallization is rapid (see FIG. 29). Using OBS, the growth of the integrated area under the primary xHU peak is plotted, $I_a$, normalized by its long-time value, $I_{a,\infty}$, as a function of time t (see Methods in Example 5) after diluting and briefly mixing a USF-NEM having $<a> = 57.9$ nm to form a monochromatic xHU biliquid opal at $\phi = 0.039$ (see FIGS. 29A, 29B, and 29C). The rejamming crystallization, driven by the free energy difference between the disordered droplet configurations and the ordered BCC structure, is amplified by the strong electrostatic repulsion and becomes so rapid that it does not follow first-order simple exponential kinetics. Instead, the normalized intensity growth curve is well described by a two-parameter fit capturing a superexponential rise to a plateau: $I_a(t)/I_{a,\infty}=1-\exp[-(t/\tau)^\beta]$, where the characteristic time constant is $\tau=89\pm1$ s and the stretching exponent is $\beta=1.56\pm0.04$ with $\beta>1$ indicating superexponentiality ($R^2=0.998$). From BMPs, the maximum linear spatial dimension $L_{max}$ of observed growing crystallites (see Methods in Example 5) is measured, and this also follows superexponential kinetics: $L_{max}(t)=L_{max,\infty}\{1-\exp[-(t/\tau)^\beta]\}$, where $L_{max,\infty}$ is the long-time value of the largest observed crystallite. Results of this fit yield: $\tau=172\pm2$ s, $\beta=1.94\pm0.04$, and $L_{max,\infty}=0.720\pm0.005$ mm ($R^2=0.999$). Thus, the time scale for completion of crystal growth is only several minutes, and these two different physical measures of crystallization both exhibit superexponentiality yet with different exponents. For larger $<a>=59.9$ nm, a similar experiment, diluting to $\phi=0.027$, yields bichromatic red-violet crystallites, and $I_a(t)/I_{a,\infty}$ of the primary $\lambda_{p1}$ peak exhibits similar superexponential growth kinetics with $\tau=64\pm1$ s and $\beta=1.56\pm0.05$ ($R^2=0.998$). Moreover, by similarly fitting $L_{max}(t)$ of red (BCC {110} orientation) and violet (BCC {200} orientation) crystallites in BMPs (see FIG. 4f), the following is extracted: $\tau=83.3\pm0.7$ s, $\beta=1.96\pm0.05$, and $L_{max,\infty}=0.419\pm0.002$ mm ($R^2=0.998$) for red, and $\tau=78\pm1$ s, $\beta=2.06\pm0.08$, and $L_{max,\infty}=0.381\pm0.002$ mm ($R^2=0.996$) for violet. The values of $\beta$ and of $\tau$ for this bichromatic xHU from time-resolved OBS and BMPs are nearly the same those for the monochromatic xHU. Kinetics of regrowth of crystallites have also been observed after melting pre-existing xHU crystallites using ultrasound, and the time scale of regrowth is similar to that of initial formation (see FIG. 35).

Figure 36A:
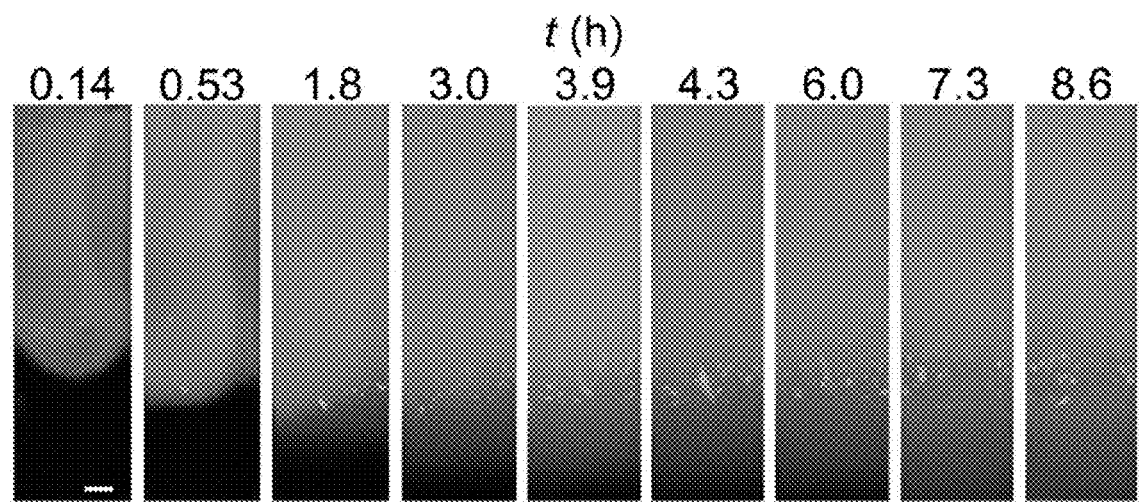
FIG. 36A-36B. Out-of-equilibrium temporal evolution of a deionized fractionated nanoemulsion concentrate that is added to deionized water.
Figure 36B:
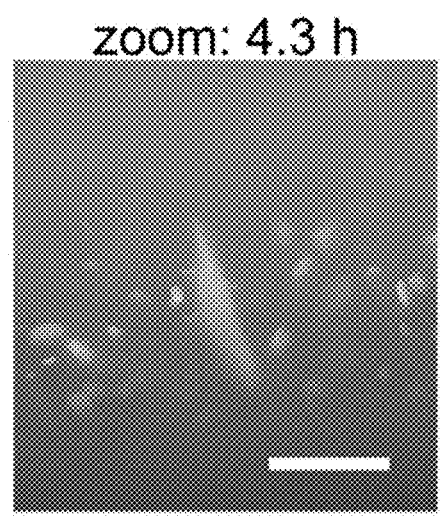
Figure 37:
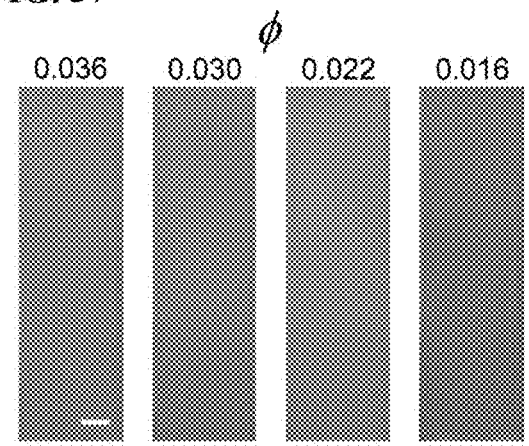
FIG. 37. Uniform structural colors of polydisperse unfractionated photonic nanoemulsions that remain disordered despite deionization. An unfractionated polydisperse nanoemulsion (D, $<a>=54.1$ nm, $\delta a/<a> >0.3$, see Methods in Example 5, FIG. 30) is surfactant exchanged with sodium octadecyl sulfate and then centrifugally deioinized to obtain a low conductivity in its aqueous continuous phase of $\sigma_e \approx 10$ µS/cm. Upon dilution with deionized water to $\phi$ that is known to crystallize more monodisperse nanoemulsions, such polydisperse nanoemulsions only exhibit structural colors reminiscent of disordered hyperuniform nanodroplet structures, since the higher degree of polydispersity effectively suppresses crystallization. Different structural colors can be obtained from the same polydisperse nanoemulsion by diluting to different $\phi$. Scale bar: 1.0 mm (same for all images).

Rejamming crystallization is a complex process that involves simultaneously lowering $\phi$, which facilitates transient droplet unjamming and reorganization, and also I, which causes an increase in $\lambda_D$ associated with electrostatic repulsion and thereby tends to increase jamming and inhibit melting. The interplay between these two effects is further compounded by the much faster ion transport compared to nanodroplet transport, making the non-equilibrium evolution even more complex. To convey this complexity, time-lapse movies are captured (see Methods in Example 5) that show the appearance and evolution of photonic droplet structures as droplets of USF-NEM concentrates are added to deionized water, as well as the opposite scenario, without homogenization or mixing. Almost immediately, small crystallites grow near the boundary of the concentrate and the deionized water; as these xHU crystallites are convected towards more dilute $\phi$, they change color towards longer wavelengths and melt into wj-L. In one striking case, the formation of a long crystallite that has a continuously varying lattice spacing along the gradient in $\phi$ and I is observed, yielding a continuously varying multi-color single crystallite (see FIG. 36). Without mixing or ultrasonication, colorful non-equilibrium states containing spatially distinct sj-x̄HU, xHU, and wj-L regions along the gradient can continue to evolve slowly over many days. For more highly fractionated monodisperse USF-NEMs, the volume fraction of crystallites is large, and crystallites grow until they reach the boundaries of other crystallites. By contrast, additional polydispersity leads to the reduction in the volume fraction of crystallites[29], yet strong photonic colors can still be present at high levels of deionization (see FIG. 37). At least to a certain degree nanodroplets which are either too small or too large to be readily incorporated into the crystalline structure are rejected into a continuous disordered matrix that exists outside of the crystallites. For higher $\phi$ and lower I, his continuous disordered matrix can have a weak solid-like elasticity characteristic of a polydisperse repulsive glass. Once formed, crystallites in biliquid opals are weak elastic solids and do not melt if the cuvette is moved while maintaining a vertical orientation without causing large deflections of the upper meniscus; yet strong agitation or ultrasonication can melt crystallites, which reform different crystallites having the same structure after the agitation ceases.

Photonic nanoemulsions provide a means of creating both tunable three-dimensional hyperuniform diffraction gratings as well as non-crystalline hyperuniform states made up entirely of liquid constituents. When BCC {110} planes are properly oriented, large USF-NEM xHU crystallites strongly Bragg-backscatter a very narrow range of wavelengths, yielding a photonic band gap[5] in a liquid-only composition, and virtually no incident light of that particular peak wavelength is transmitted. Remarkably, color mixing rules so widely taught for optically absorbing materials (e.g. blue when added to red makes purple) are violated for photonic materials, as was demonstrated using non-crystalline photonic nanoemulsions (e.g. blue when added to red makes green, because the peak wavelength is set by $<a>/\phi^{1/3}$, see FIG. 38). Such structural color mixing rules would not necessarily apply to solid core-shell systems that have intercore spacings determined by the shell dimension at packing[30], not $\phi$ as in photonic nanoemulsions, but these structural color mixing rules can be generalized to other dispersions of charged uniform nanoparticulates at high $\lambda_D$. While sj-x̄HU and xHU have optical spectral signatures that strongly indicate hyperuniformity, performing ultra-small-angle x-ray or neutron scattering (i.e. USAXS or USANS) to examine the behavior at low wavenumbers would further elucidate structural details related to the class of hyperuniformity and the disappearance of hyperuniformity in wj-L. Although protocols and material conditions were established that yield excellent opalescence in macroscopic volumes, optimizing all parameters, including $\Delta n$, which could potentially be done by varying the oil type as well as through compatible additives that are soluble or miscible in the aqueous continuous phase, to achieve the most brilliant opalescence for certain desired wavelengths remains an interesting future direction. Furthermore, going beyond simple ultrasonic excitations, it may be possible to control and manipulate the size and orientation of crystallites by imposing mechanical shear or applying external electromagnetic fields (see Additional discussion in Example 6). In addition, while there was a focus on monodisperse monomodal size distributions, it is anticipated that certain bimodal nanodroplet size distributions could yield other crystal structures than BCC, potentially expanding the variety of biliquid opal crystal structures and photonic properties that can be generated through a similar rejamming crystallization process. While the examples herein of photonic USF-NEMs have involved only anionic stabilizers, it is possible that cationic stabilizers, such as similarly long alkyl-quaternary ammonium salts, could be readily used instead, leading to cationic O/W biliquid opals.

Example 5. Methods

Oil-In-Water Nanoemulsion Production by High Flow-Rate Emulsification.

In order to obtain bulk volumes of direct oil-in-water (O/W) nanoemulsions composed of an oil that is highly immiscible with water, high flow-rate emulsification (HFRE) is used, generated by a microfluidic homogenizer (Microfluidics M110-P, 75 μm Y-type diamond/stainless steel interaction chamber, liquid pressure setting 30,000 psi≈2×10$^8$ Pa, number of passes $N_p$=8), to break up larger microscale droplets of poly-dimethylsiloxane (PDMS, Gelest Inc., average molar mass $M_W$≈1,250 g mol$^{-1}$, kinetic viscosity 10 cSt, refractive index $n_o$=1.40, mass density $\rho_o$=0.935 g cm$^{-3}$) in a premix emulsion (PowerGen 125S1 rotary mixer, droplet volume fraction ϕ≈0.15) that contains a water-soluble ionic surfactant[23]. Although modern lithographic soft microfluidics can produce very highly controlled monodisperse droplets[17, 31, 32], the throughput is typically limited and microfluidic homogenizers overcome this limitation albeit at the cost of a higher degree of droplet size polydispersity. The temperature of the emulsification is controlled by immersing the interaction chamber in a tank connected to a recirculating water bath (Thermo Scientific Neslab RTE7). Sodium alkylsulfates represent an important and useful class of water-soluble anionic surfactants. When dissolved in water having pH>$pK_a$(R—SO$_4^-$) (where the bound sulfate $pK_a$ is ≈2.5 to ≈3.0 at room temperature $T_r$≈23° C.) such that protonation reactions are insignificant, sodium alkylsulfates dissociate resulting in negatively singly charged bound sulfate head groups (R—SO$_4^-$) and simple saturated hydrocarbon tails (R) with varying carbon number, $N_C$: sodium dodecyl sulfate (SDS, $N_C$=12, Fisher, 99%), sodium tetradecyl sulfate (STS, $N_C$=14, Alpha Aesar, 95%), sodium hexadecyl sulfate (SHS, $N_C$=16, Alpha Aesar, 99%), and sodium octadecyl sulfate (SOS, $N_C$=18, Acros, 98%). The solubility of SDS in water is large enough over a wide temperature range, including $T_r$, that hot HFRE is not required to achieve nanoscale emulsions; yet, for $N_C$≥14, it is advantageous to perform hot HFRE at $T_{HFRE}$=50° C. in order to increase the dissolved concentration of alkylsufate ions in the water, making these amphiphilic ions available for adsorption onto newly created nanodroplet interfaces and also leading to significantly smaller average droplet radius <a> and enhanced stability.

Stability Assessment of Nanoemulsions Made Using Different Alkylsulfate Stabilizers after Repeated Centrifugal Deionization.

Figure 30:
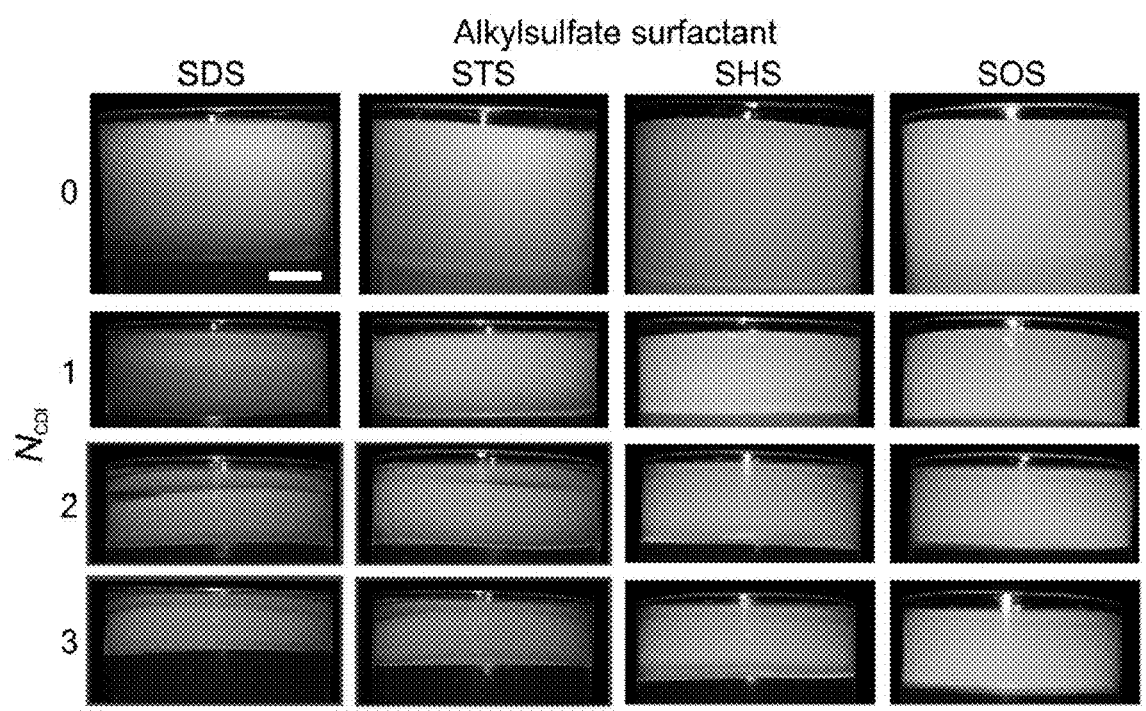
FIG. 30. Centrifugal deionization probes nanodroplet stability against coalescence for sodium alkylsulfates having different carbon-numbers. PDMS oil-in-water nanoemulsions, made using hot HFRE (see Methods in Example 5) using several different alkylsulfate surfactants (columns: sodium dodecyl sulfate-SDS; sodium tetradecyl sulfate-STS; sodium hexadecyl sulfate-SHS; and sodium octadecyl sulfate-SOS), are repeatedly diluted with deionized water to $\phi \approx 0.15$ and centrifuged at 17,400 rpm for 6 h at room temperature $T_r=23°$ C., yielding plugs of dense nanoemulsions at the tops of centrifuge tubes, as shown in backscattering macrophotographs taken immediately stopping the ultracentrifuge. The number of centrifugal deionization steps is designated by $N_{CDI}$ (rows: 0, 1, 2, 3). The effective gravity imposed by the ultracentrifuge points down the page. Scale bar: 5.0 mm (same for all images). Macroscopic oil break-out at the top of the tube of SDS and STS (designated by red outline boxes) at $N_{CDI}=2$ and 3 indicates increasing instability as deionization progresses. By contrast higher carbon-number SOS exhibits the greatest stability, and no oil breakout is seen even up to $N_{CDI}=10$. Thus, For SHS and SOS, narrow rainbow-like colored bands can be seen towards the bottoms of the plug, and the colored bands become more intense as $N_{CDI}$ increases. These rainbow colors arise from backscattering diffraction from uniformly spaced small-size nanodroplets at lower $\phi$ in local bands at the bottoms of the plugs, indicating the inhomogeneous, non-equilibrium gradient in $\phi$ present in the plug. Here, $\phi$ decreases towards the bottom of the page (i.e. towards red wavelengths and larger interdroplet separations).

All sodium alkylsulfate concentrations are set to 5 mM when making four separate hot premix PDMS O/W emulsions at ϕ≈0.15, each containing SDS, STS, SHS, and SOS, respectively, and subsequently flow-rupture droplets using hot HFRE at 50° C. to achieve nanoscale <a> (see FIG. 26A and FIG. 30). First, the resulting nanoemulsions are centrifuged at 17,400 rpm at $T_r$ for 6 h, generating solid plugs at the tops of the centrifuge tubes (shown as number of centrifugal deionization steps $N_{CDI}$=0, see FIG. 30). Then this plug is cut in half, the lower section diluted with deionized water (≈10×), and centrifuged at 17,400 rpm for 6 h (yielding plugs shown at $N_{CDI}$=1). All of this plug is retained, diluted with deionized water and centrifuged again at the same conditions (yielding $N_{CDI}$=2). Subsequent steps (e.g. $N_{CDI}$=3, . . . ) repeat the same process. At each step the plugs are examined for macroscopic oil break-out which signals large-scale nanodroplet coalescence, and photographic images of the plugs (see FIG. 30) are recorded. Nanoemulsions made using SOS and SHS remain stable even after repeated dilution with deionized water for large $N_{CDI}$, whereas those made using SDS and STS do not. For stable compositions, rainbow-like multi-colored bands appear at more dilute ϕ and lower I towards the bottoms of the plugs for larger $N_{CDI}$.

Centrifugal Fractionation of Polydisperse Nanoemulsions.

Micellar depletion fractionation[33] is impractical for nanoemulsions because extremely large surfactant concentrations are required; so instead, post-HFRE SDS-stabilized nanoemulsions are centrifugally fractionated[23, 24] to reduce their droplet size polydispersities, δa/<a>, where δa is the standard deviation of their droplet size distributions. An unfractionated PDMS O/W nanoemulsion (ϕ≈0.15, SDS≈50 mM, ≈1.5 L starting volume) is loaded into thick-wall poly-carbonate tubes (capacity 30 mL each) and centrifuge using a swinging bucket rotor (Beckman L8-55 ultracentifuge, SW28 rotor 6-tube, 18,000 rpm, 17 h) to form soft elastic plugs of dense nanoemulsion cream at the tops of the tubes. Given the mass density difference between the oil and aqueous surfactant solution of $\Delta\rho$=$\rho_o$-$\rho_w$≈-0.065 g cm$^{-3}$, this centrifugation leads to a gradient in nanodroplet radius that is effectively the same in each plug as a consequence of different steady-state creaming rates. Near the top of a plug, larger nanodroplets predominate, whereas smaller nanodroplets are predominantly toward the bottom. Each elastic plug is removed with a thin metal spatula without mixing and each plug is cut into three sections (i.e. elastic plug pieces). First, the top ¼ section of each plug is cut with the spatula and combined with other top sections; this represents the fraction labeled 1. Next, the remaining ¾ section of each plug is cut in half, and the common sections are combined. The middle section is labeled fraction 2, and the bottom is labeled fraction 3. This process can be repeated as desired by diluting each fraction with [SDS]=10 mM surfactant solution, thereby setting ϕ≈0.15, and repeating the above centrifugation and sectioning procedures, yielding additional fractionation steps. Typically, 3 or 4 fractionation steps are required to reduce δa/<a> enough in order to achieve xHU biliquid opals (see FIG. 26, FIG. 27, and FIG. 33). Averaged, the typical yield of each fraction in a given fractionation step is about 30% nanodroplet retention. Although jammed disordered nanoemulsions that exhibit weak backscattering colors can be achieved directly from the nanoemulsion resulting from HFRE without any fractionation, the color saturation becomes much stronger if fractionated for at least 2 steps. In order to label different fractionated nanoemulsions, a nomenclature was developed that attaches a unique letter to each polydisperse post-HFRE nanoemulsion, and then a set of successive fraction numbers, using the labels above, for each step (see Extended Data Table 1). For example, the label C211 means a fractionated nanoemulsion that came from a polydisperse post-HFRE nanoemulsion labeled C after a first fractionation step (2-middle fraction), a second step (1-top fraction), and a third step (1-top fraction). The terminal tin a label of a fractionated nanoemulsion indicates that plugs have only been cut in half in each fractionation step: 1 corresponds to the top half, and 2 corresponds to the bottom half.

Hot Surfactant Exchange of Fractionated Monodisperse Nanoemulsions.

In order to reduce the quantities of more expensive alkyl sulfates, particularly SOS, used in the rest of the studies as well as to achieve lower <a>, premix emulsions are made and HFRE is performed using SDS at 50 mM without requiring hot temperatures for pre-mixing and HFRE. Moreover, then the resulting nanoemulsions were centrifugally fractionated while simultaneously lowering [SDS] yet maintaining stability against coalescence. After nanodroplet size-fractionation is accomplished and [SDS] has been reduced to ≈10 mM, a fractionated nanoemulsion is mixed with an aqueous solution of a sodium alkylsulfate having higher $N_C$ (e.g. SOS) after heating both to 75° C., causing competitive adsorption/desorption that drives off SDS and populates the droplet interfaces with higher $N_C$ alkylsulfate ions. At room temperature, a fractionated O/W nanoemulsion concentrate ([SDS]≈10 mM) is diluted using deionized water (MilliQ Academic, Millipore Inc., resistivity at $T_r$: 18.2 MΩ cm) to reach $\phi \approx 0.15$ and a typical starting volume≈50 mL. Solid SOS is then massed and added to provide [SOS]≈5 mM if fully dissolved and dissociated in the aqueous continuous phase. This mixture of diluted nanoemulsion and partially dissolved solid SOS is heated to an exchange temperature $T_{exch} \approx 75°$ C. in a water bath for 1 hour. At this $T_{exch}$, the SOS completely dissolves into the aqueous phase, and all octadecyl sulfate anions (OS) then become available to adsorb competitively onto the nanodroplets' oil-water interfaces while displacing dodecyl sulfate anions ($DS^-$), which are less strongly adsorbed and have a significantly higher desorption rate than $OS^-$. The nanoemulsion is removed from the water bath, allowed to cool back to $T_r$, loaded into a poly-carbonate centrifuge tube, and is then centrifuged (Beckman L8-55 ultracentrifuge, SW28 rotor, 12,000 rpm, 8 h) to concentrate the nanodroplets into a soft elastic plug. By inserting a spatula between the outer edge of the plug and the inner wall of the poly-carbonate tube and moving the spatula toward the center of the tube, the plug is irreversibly deformed enough to leave a drainage pathway for the aqueous solution below the plug. This aqueous solution, which contains most of the SDS, is drained out of the tube, leaving the elastic plug still attached to the tube's wall. Residual SDS that remains in the continuous phase of this plug can be removed through centrifugal deionization (see below), leaving only $OS^-$ as the stabilizer that is effectively irreversibly adsorbed onto nanodroplet interfaces at $T_r$.

Centrifugal Deionization and Formation of Nanoemulsion Concentrates.

Figure 31A:
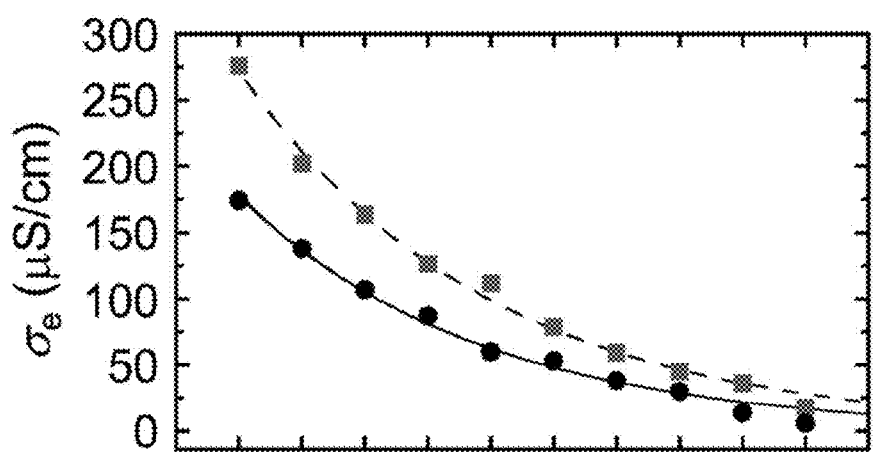
FIGS. 31A-31B. Centrifugal deionization decreases the electrical conductivity $\sigma_e$ of nanoemulsions and their continuous phase solutions.
Figure 31B:
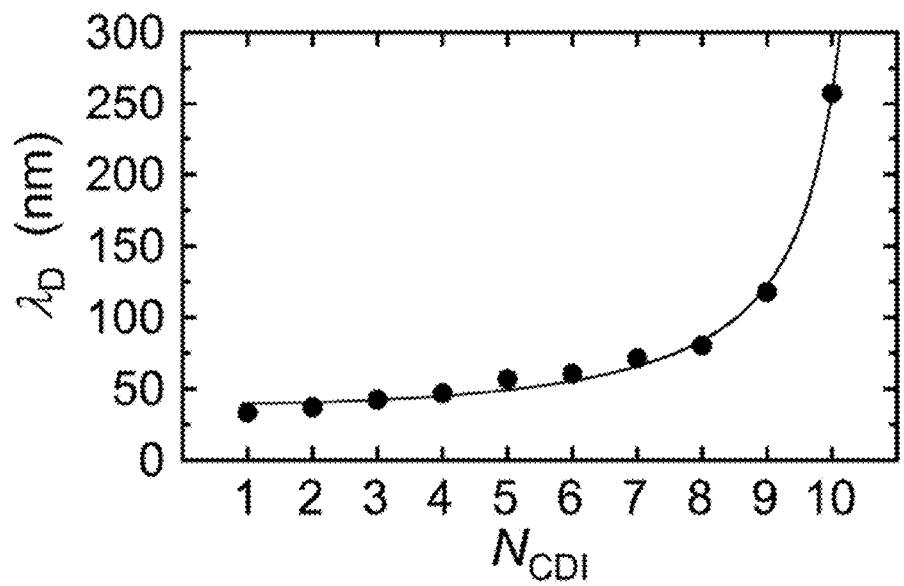

To lower the ionic strength I and thereby increase the range of electrostatic repulsion, given by the Debye screening length $\lambda_D$, elastic plugs of concentrated fractionated nanoemulsions (stabilized by SOS after surfactant exchange) to $\phi \approx 0.15$ were repeatedly diluted using deionized water, centrifugally concentrating these diluted nanoemulsions (Beckman L8-55 ultracentrifuge, SW28 rotor, 12,000 rpm, 8 h), removing the lower continuous aqueous solution below the resulting plug by draining (see prior Methods section), and retaining the elastic plug for a total of $N_{CDI}$ centrifugal deionization steps. At each $N_{CDI}$, the electrical conductivity $\sigma_e$ is measured (Apera Instruments EC400S conductivity meter, brush-resistant platinum black probe): (1) of the nanoemulsion after it has been diluted with deionized water, and (2) of the lower continuous aqueous solution after it is drained (see FIG. 31). The decrease in $\sigma_e$ for both the nanoemulsion and the continuous phase can be described by a decaying exponential function, and a corresponding rise in the Debye screening length $\lambda_D$ (see caption of FIG. 31). After the final $N_{CDI}$, this plug is called the deionized fractionated nanoemulsion concentrate (see FIG. 26B). Its typical volume is ≈6 cm³ for 3 fractionation steps. For adequately low $\delta a/\langle a \rangle$ and appropriate $\langle a \rangle$ and $\phi$, when $N_{CDI} \approx 10$, corresponding to $\sigma_{e(2)} < 10$ μS/cm, biliquid opal formation is observed after a final dilution using deionized water (this corresponds also to reported ion concentrations in FIG. 28). Leaching of ions from the poly-carbonate tubes is below the measurement limit, and the stored nanoemulsion concentrate is capped to reduce concentrations of dissolved $CO_2$ and acidification of the aqueous continuous phase. Nanoemulsion plug-concentrates after draining typically have $\phi \approx 0.4$; if stored for more than one week, these plug concentrates are sealed in thickwall polycarbonate centrifuge tubes. This limits $CO_2$ dissolution in the aqueous continuous phase of the nanoemulsion and reduces acidification. A plug concentrate is then diluted with deionized water (≈2×-3× dilution factor) to obtain the initial volume fraction $\phi_i$ (see Extended Data Table 1) before making sj-x̄HU, xHU, and wj-L nanoemulsions in a final dilution step with deionized water. This intermediate dilution decreases the elasticity of the nanoemulsion, thereby facilitating the final dilution for small volumes (typically less than 0.1 mL). Centrifugal deionization provides a very systematic, controlled way of reducing I and making a disordered nanoemulsion concentrate at high $\phi$, similar in some respects to a prior method of fixing surfactant concentration in the bulk aqueous continuous phase sub-micron and nanoscale O/W emulsions using repeated centrifugation and dilution with a surfactant solution at a constant concentration[34].

Calculating Debye Screening Length $\lambda_D$ from Aqueous Electrical Conductivity $\sigma_e$ Measurements.

At each $N_{CDI}$, the measured $\sigma_e$ of the drained continuous aqueous phase are converted to ionic strength I using a previously determined calibration curve for SDS (see FIG. 2B on page 10314 in Pagenkopp and Mason, Langmuir 34 (2018))[35]. It is assumed that $\sigma_e$ in the drained aqueous solution predominantly arises from removed SDS, not SOS. Having monovalent I associated with the continuous phase in the plug-concentrate at each $N_{CDI}$, a 20× dilution using deionized water is assumed to a final $\phi \approx 0.02$. For each $N_{CDI}$, after dilution to that same final $\phi$, $\lambda_D = 0.304/I^{1/2}$ (where I has units of M and $\lambda_D$ has units of nm) is calculated at room temperature[26] (see FIG. 31B). The resulting $\lambda_D(N_{CDI})$ can be reasonably fit using a semi-empirical equation: $\lambda_{D,0}/[1-(N_{CDI}/N_{CDI}^\dagger)^\alpha]$ for $N_{CDI} < N_{CDI}^\dagger$ (see brief description of FIG. 31B for fit parameters).

Measuring Nanodroplet Volume Fraction in a Nanoemulsion Concentrate.

The initial oil droplet volume fraction $\phi$, of a nanoemulsion is accurately determined using an evaporative gravimetric analytical method that corrects for surfactant mass[36]. The SOS and PDMS are nonvolatile at 23° C. temperature, yet the water is volatile. The mass of water is determined by measuring the mass of ≈0.2 g of nanoemulsion concentrate before and after water evaporation (Fisher Scientific vacuum oven model 280, 23° C., measured pressure under house vacuum≈17 kPa, duration 24 h) using an analytical balance (Denver Instruments, APX-200 model, 0.1 mg). This causes the nanoemulsion to coalesce into 10 cSt PDMS oil and solid SOS on a plastic weigh boat. Next, the PDMS and SOS mixture are rinsed using a volatile low molar mass solvent (dimethicone, Gelest, PDMS kinetic viscosity 0.65 cSt) through a filter (filter paper, Whatman 5). After rinsing away all 10 cSt PDMS oil and evaporating all dimethicone in a vacuum oven (≈17 kPa, 23° C., ≈12 hours), the mass of solid SOS retained on the filter is measured, and the mass of 10 cSt PDMS is deduced by subtraction. These mass values are converted into volumes by using the known mass densities of 10 cSt PDMS oil and of water, and is subsequently calculated.

Final Dilution of Nanoemulsion Using Deionized Water.

Aliquots of deionized fractionated nanoemulsions are diluted, which initially have volume fractions in the range $0.14 \leq \phi_i \leq 0.26$ depending on the particular fraction/name (see Extended Data Table 1), using deionized water to final $0.01 \leq \phi \leq 0.06$. In a polystyrene spectrophotometry cuvette (BrandTech, 1.5 mL semi-micro, outer dimensions 12.5× 12.5×45 mm, inner dimensions 4×10×20 mm), deionized water is massed (e.g. typical mass), and the concentrated deionized nanoemulsion is added; the mass is again recorded (e.g. typical mass of concentrate). The cuvette is inverted several times until no solid chunks of nanoemulsion are visible, and then the bottom half of the loaded cuvette is immersed in an ultrasonic bath (Branson model 5510, 40 kHz operational frequency, 30 s duration) and ultrasonically agitated at room temperature to ensure that the elastic nanoemulsion concentrate has been fully and homogeneously dispersed. This diffuse ultrasonic excitation by the ultrasonic bath is not strong enough to cause rupturing of nanodroplets, but it does quickly remove inhomogeneities in $\phi$.

Backscattering Macrophotography.

Figure 32A:
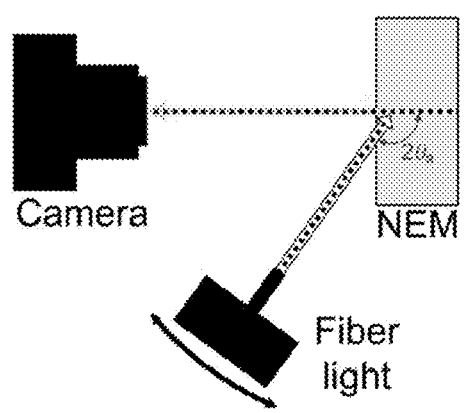
FIGS. 32A-32B. Iridescence of biliquid opals.
Figure 32B:
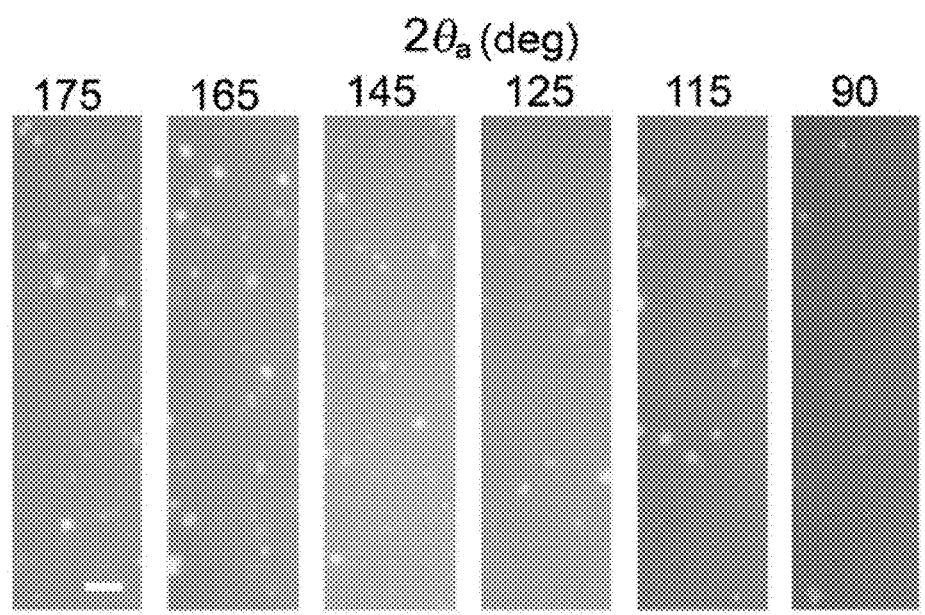

Backscattering macrophotographs (BMPs) are taken using a digital single lens reflex (DSLR) camera (Nikon D5000, 24.5 megapixel 24-bit color RGB detector, XLT extension tube 36 mm length, Nikon DX 18-55 mm zoom lens set to 55, working distance 10 cm, silent mode); the camera's built-in full-spectrum white light flash serves as a highly directional visible light source in a near-backscattering configuration. A computer equipped with DigiCam software is connected to the camera and is used to set its mode (M-manual), shutter speed ($\frac{1}{125}$ s), ISO (200), aperture (f5.6), and exposure compensation $e_c$ ($-2.3 \leq e_c \leq -4.3$) and to take digital images and time-lapse image sequences. The focus is manually controlled to be about 0.3 mm inside the front inner surface of the cuvette, and the depth of field is estimated to be ≈0.6 mm. Only when photographing biliquid opals (xHU), the exposure compensation is adjusted to limit saturation in the detector arising from the very bright localized backscattering from crystallites. The location of the flash bulb on top of the camera gives≈12 deg offset from perfect backscattering at 180 deg. Using Bragg's law, a factor estimated to be very close to unity, about $1/\sin((180 \text{ deg}-12 \text{ deg})/2)=1.006$, would be required to correct the observed wavelength in order to obtain the wavelength corresponding to perfect backscattering, so the observed RGB color is not noticeably affected. To reveal angle-dependent iridescence of the biliquid opals (see FIG. 32), instead of the built-in flash, the biliquid opals are illuminated at different incident angles using a flexible fiber lamp (Dolan-Jenner Fiber-lite MI-150) that provides a highly directional visible light source. This fiber light was also used to illuminate centrifuge tubes containing photonic nanoemulsions in FIG. 30 and FIG. 38.

Optical Backscattering Spectroscopy.

Optical backscattering spectra (OBS) are measured using a digital optical fiber spectrometer (Ocean Optics USB 2000, 0.4 nm spectral resolution, equipped with a R400-7 UV-Vis backscattering fiber optic probe), a computer connected by USB to the spectrometer, and Ocean Optics acquisition software. A full-spectrum incandescent visible light bulb source is turned on and allowed to warm up to achieve a stable steady-state bulb spectrum, which is recorded. The end of the probe is placed against an optical cuvette containing the photonic nanoemulsion of interest; the single central collection fiber is connected to the spectrometer and the outer 6 fiber bundle transmits incident light from the source. The cuvette and probe end of the fiber are completely covered with a matte black curtain to eliminate stray light from other light sources in the room. The real-time spectrum is displayed on the computer and allowed to stabilize for 10 s, and the backscattering intensity $I_b$ as a function of wavelength $\lambda$ is recorded. The backscattering spectra of a cuvette filled with water (i.e. water/cell reference) is measured as well as a cuvette filled with an opaque white concentrated microscale O/W emulsion that highly multiply scatters all visible wavelengths and appears white (i.e. white/cell reference). Spectra to remove scattering signal emanating from the source scattering off the surface of the cuvette and not the nanoemulsion is used. In order to more accurately measure OBS of biliquid opals having a primary peak in the ultraviolet (UV, see FIG. 34), this photonic nanoemulsion is illuminated using an Ocean Optics ISS UV-Vis light source which has a dedicated UV bulb and provides significantly more UV light than the incandescent visible light source. These backscattering spectra are very different than transmission spectra taken on nanoemulsion concentrates that did not show structural color at much larger/in prior studies[37]. In particular, OBS of biliquid opals show characteristics (i.e. strong peaks and narrow linewidths) that indicate at least a pseudo photonic band gap[5, 38, 39].

Time-Lapse Backscattering Macrophotography and Spectroscopy.

To perform time-lapse BMP or OBS, after the final dilution of a deionized fractionated nanoemulsion concentrate to set $\phi$, the optical cuvette containing the nanoemulsion is removed from the ultrasonic bath, and this cuvette is continually inverted as the cuvette is transferred to the BMP or OBS apparatus. This continuous inversion causes flow of the nanoemulsion inside the cuvette, thereby inhibiting crystallite growth. The nanoemulsion is placed in front of the fiber optic probe (thus, there is a delay in recording spectra after ceasing ultrasonication of ≈10 s to ≈30 s). Once the sample inversion has stopped, a stopwatch is started; this sets time t=0 s for the crystallite growth kinetics studies (see FIG. 29). Data for time-lapse BMP and OBS are recorded on the computer every ≈10 s to ≈15 s, respectively. To obtain out-of-equilibrium time-lapse BMP videos (see FIG. 36), the time between frames is also ≈10 s.

Dynamic Light Scattering: Average Size and Polydispersity of Nanoemulsions.

A deionized fractionated nanoemulsion with an aqueous solution of SDS at 10 mM is diluted so that $\phi$ is in the highly dilute single-scattering range: $10^{-4} \leq \phi \leq 10^{-5}$. This SDS solution is used to reduce the Debye screening length so that repulsive interactions are highly screened. The intensity-weighted ensemble-average hydrodynamic radius $<a>$ and polydispersity $\delta a/<a>$ of this nanoemulsion are obtained from dynamic light scattering (DLS) at room temperature (Photocor FC, laser wavelength $\lambda_{DLS}=633$ nm, scattering angle: 90°, $T_r=23°$ C.) measurements and cumulant analysis software (Photocor DynaLS).

Zeta Potential and Electrophoretic Mobility of a Fractionated Nanoemulsion.

A portion of a deionized fractionated nanoemulsion concentrate is diluted with 10 mM aqueous solution of sodium chloride to a final droplet volume fraction in the range: $10^{-3} \leq \phi \leq 10^{-4}$. This diluted nanoemulsion is loaded into a specialized electrophoretic light scattering cell, and this cell is placed in a dynamic light scattering system that is equipped for measuring zeta potential (Malvern, Zetasizer Nano ZS). An applied voltage induces electrophoretic motion of charged droplets at an average steady-state propagation speed, which is deduced using dynamic light scattering. From these measurements, the average zeta potential $\zeta$ and electrophoretic mobility lie of charged nanodroplets in this nanoemulsion are calculated (see Extended Data Table 1 for values).

Analyzing Spectra to Determine Peak Wavelength, Width, and Integrated Area.

Because the spectrometer provides very fine spectral resolution, peak wavelengths $\lambda_{p1}$, $\lambda_{p2}$ (if present), and $\lambda_{p3}$ (if present) are determined by wavelengths associated with the maxima in the measured spectra. To determine a peak's width, any underlying residual broadband contribution to the spectrum around the peak is removed by approximating this underlying trend using a first-order correction (straight line). Then, the full-width at half-maximum (FWHM) intensity of the peak is determined by interpolation, yielding FWHM=$\Delta\lambda$. For sj-x̄HU and xHU photonic nanoemulsions, it was found that the measured peaks can be reasonably fit using a Gaussian functional form, and its standard deviation $\sigma_\lambda$ can be related to the FWHM by: FWHM=$2[2 \ln(2)]^{1/2} \sigma_\lambda \approx 2.355 \sigma_\lambda$. The integrated peak area $I_a$ is determined by numerically integrating the region below the measured intensity yet above the linear approximation to any underlying residual contribution.

Bragg Backscattering Conditions: BCC Versus FCC Crystals.

To interpret the peak wavelengths of backscattered light in terms of crystal structures, two possible crystal structures, body-centered cubic (BCC) and face centered cubic (FCC), are considered that have hard-sphere packing at higher sphere volume fractions, $\phi_{BCC}$=0.680 and $\phi_{FCC}$=0.740, respectively[40], than disordered maximal random jamming[27, 28, 41] at lower $\phi_{MRJ} \approx 0.644$. Simple cubic (SC) is precluded for charge-repulsive nanoemulsions, since it has a lower packing volume fraction $\phi_{SC}$=0.524 and is therefore less efficient than disordered MRJ structures; moreover, SC is also unstable to repulsive interactions in systems experiencing Brownian excitations. Both BCC and FCC crystal structures have been observed previously in systems of charge-repulsive monodisperse solid colloidal spheres[15]. In a cubic unit cell having edge length $L_{uc}$ for BCC there are $N_{BCC}$=2 spheres per unit cell; whereas for FCC there are $N_{FCC}$=4 spheres per unit cell. The coordination number, defined as the number of nearest neighboring spheres, is 8 for BCC, whereas it is 12 for FCC. The volume fraction of spheres having radius a in the respective unit cells are: $\phi=N_{BCC}(4\pi/3)a^3/L_{uc}^3=(8\pi/3)a^3/L_{uc}^3$ for BCC; whereas, $\phi=N_{FCC}(4\pi/3)a^3/L_{uc}^3=(16\pi/3)a^3/L_{uc}^3$ for FCC. These relationships can be re-expressed to give the cube's edge length $L_{uc}$ in terms of a and $\phi$, even for repulsive spheres that are not close-packed and therefore not touching: $L_{uc}=[(8\pi/3)^{1/3}]a/\phi^{1/3}$ for BCC, whereas $L_{uc}=[(16\pi/3)^{1/3}]a/\phi^{1/3}$ for FCC. The Bragg condition for optical diffraction of order m in a medium having refractive index $n_{eff}$, which yields a selected peak wavelength in air of $\lambda_p$, is: m $\lambda_p=[2d_{hkl} \sin(\theta_{hkl})]n_{eff}$, where $d_{hkl}$ represent d-spacings between certain periodic crystal planes, and $2\theta_{hkl}$ are scattering angles defined relative to those planes, and h, k, l are non-negative Miller indices, designated by {h k l}, corresponding to these planes. The d-spacings in terms of the edge length of the unit cell are: $d_{hkl}=L_{uc}/(h^2+k^2+l^2)^{1/2}$. Only certain values of h, k, l lead to constructive interference for particular crystal structures. For BCC, the first few allowed Miller indices are: {110}, {200}, {211}, {310}, . . . ; whereas, for FCC, they are: {111}, {200}, {220}, {311}, . . . . First order Bragg scattering corresponds to m=1; higher orders m≥2 would occur in the ultraviolet outside of the visible region. For perfect backscattering, the scattering angle is $2\theta_{hkl}$=180 deg, relative to transmission at 0 deg, yielding sin(90 deg)=1. Thus, the 1st order Bragg backscattering condition for the lowest allowed set of Miller indices simplifies to: $\lambda_p=2n_{eff} d_{110}$ with $d_{110}=L_{uc}/2^{1/2}$ for BCC; whereas it is $\lambda_p=2n_{eff}d_{111}$ with $d_{111}=L_{uc}/3^{1/2}$ for FCC. For $\phi<<1$, the effective refractive index can be well-approximated by that of water, so $n_{eff} \approx n_w$=1.33 at room temperature. Substituting the appropriate relationships for $L_{uc}$ in terms of a and $\phi$ as well as the value of $n_{eff}$, $\lambda_p \approx 3.82$ a/$\phi^{1/3}$ is obtained if the Bragg backscattering is from BCC {110}; whereas, $\lambda_p \approx 3.93$ a/$\phi^{1/3}$ is obtained if the Bragg backscattering is from FCC {111}. Although BCC has a lower numerical coefficient than FCC, these coefficients are within 3% of each other, so determining these may not provide a definitive test of structure, given typical experimental uncertainties in a and $\phi$. Moreover, considering the next allowed Miller indices for BCC, a secondary peak wavelength corresponding to {200} would be seen at $\lambda_{p2}=\lambda_{p1}/2^{1/2}$, where here $\lambda_{p1}$ is the primary peak for BCC {110}. By contrast, for FCC, the secondary peak corresponding to {200} would be seen at $\lambda_{p2}=\lambda_{p1}(2/3^{1/2})$ where here $\lambda_{p1}$ is the primary peak for FCC {111}. Thus, if both $\lambda_{p1}$ and $\lambda_{p2}$ can be observed spectroscopically by backscattering white light from the same types of crystallites, then the crystal structure can be reasonably differentiated by $\lambda_{p1}/\lambda_{p2}=2^{1/2} \approx 1.41$ for BCC whereas $\lambda_{p1}/\lambda_{p2}=2/3^{1/2} \approx 1.15$ for FCC. Using both primary and secondary peaks (i.e. 'indexing' a set of observed peaks based on conditions of constructive interference for particular crystal types) therefore provides a more sensitive means of differentiating BCC from FCC than the absolute coefficients related only to the primary peaks.

Controlling Salt Concentration and pH.

Aqueous solutions of sodium chloride (NaCl, Fisher, 99%, $M_w$=58.44 g/mol) are made using deionized water. These solutions vary in concentration from 10 mM to 1.0 μM and are used to dilute a deionized fractionated nanoemulsion to $\phi \approx 0.018$ (see FIG. 28A). Hydrochloric acid (HCl, 50% v/v in H$_2$O, Ricca, $M_w$=36.46 g/mol) is diluted with deionized water to makes a series of acidic solutions, 3.39≤pH≤6.36. These acidic solutions are used to dilute a deionized fractionated nanoemulsion to $\phi \approx 0.035$ (see FIG. 28D). Solid sodium hydroxide (NaOH, Fisher, 99%, $M_w$=40.0 g/mol) is dissolved in deionized water to make a 0.1 M stock solution. Serial dilution of this NaOH(aq) stock solution with deionized water yields basic solutions, 7.21≤pH≤10.76, which are used to dilute the same nanoemulsion concentrate to $\phi \approx 0.035$. The pH of the aqueous acidic and basic solutions are measured using a pH meter (Fisher Scientific Accumet AB150 with Orion 8220BNWP probe), which has been calibrated using buffer solutions over the appropriate ranges of pH.

Example 6. Additional Discussion

The striking monochromatic and bichromatic biliquid opals that were made and described herein differ significantly from solid gemstone opals[1-3,42] both in their composition and manner of formation. Biliquid opals have not been produced previously because the necessary combination of physical characteristics, which depend on composition to maintain droplet stability and set small but non-zero |Δn|, HFRE conditions to achieve nanoscale <a>, fractionation to reduce δa/<a>, deionization to reduce I and raise $\lambda_D$, and dilution to reduce $\phi$ into a range that leads to spontaneous crystallization that is not kinetically inhibited, had not yet been found. Although monodisperse O/W nanoemulsions have been obtained by fractionation many years ago[23], none of these nanoemulsions had been combined with the ultra-stabilization provided by ionic surfactants that have hydrophobic moieties that are extensive enough that these ionic surfactants become essentially irreversibly adsorbed onto nanodroplet surfaces. Such ultrastabilization is necessary in order to reduce the ionic strength down to very low levels that facilitate crystallization by charge repulsion without causing unwanted droplet coalescence. Moreover, it can be particularly advantageous to perform HFRE or surfactant-exchange at hot temperatures, in order to facilitate solubility and adsorption of such surfactants, and then lower the temperature in order to reduce the surfactant desorption rate dramatically. The experimental approach for ultrastabilizing droplets to very low I that was introduced herein for nanoemulsions is generalizable to sub-micron and microscale emulsions. In addition, the classes of surfactant extend beyond sodium alkylsulfates to amphiphilic molecules containing other charge groups and large hydrophobic regions, such as lipids.

Because deformations and reconfigurations of lubricated slippery nanodroplets are possible during centrifugation, precluding coalescence, USF-NEMs provide a flexible system suitable for obtaining biliquid concentrates that can have high without irreversible aggregation that can occur when some types of dispersions of solid particulates are handled in a similar manner. The mobility of charged surfactant on nanodroplet interfaces provides additional degrees of freedom that could enable non-uniform charge densities on the surfaces of nanodroplets in anisotropic phases for sufficiently strong electrostatic repulsions. This mobility of the charge groups is not present in systems of solid particles that have charges covalently bonded to specific locations on the particle surfaces, and makes the structure and behavior of ionic nanoemulsions potentially different. So, it is non-obvious whether or not the phase behavior and location of phase boundaries of ionic nanoemulsions will be exactly the same for charged nanoemulsions as for charged solid nanoparticles.

Because there was a focus on the extreme limit of very low I and large $\lambda_D$, biliquid opals having BCC structures were formed and observed. However, it is possible that for larger I and smaller $\lambda_D$ that other crystal structures, such as FCC, or even BCC-FCC coexistence, could also be observed in size-fractionated photonic nanoemulsions having larger <a>. The spectroscopically determined structure of BCC for biliquid opals USF-NEMs at $\phi<0.05$ at very low I is consistent with an extrapolation of the BCC region shown in a phase diagram of colloidal crystals of charged polystyrene nanospheres ('polyballs') determined using x-ray scattering[15], although in this x-ray scattering study the BCC region for polyballs was investigated only for $\phi>0.05$ at low I. It is noted that the BCC structure has only 8 nearest neighbors, whereas the FCC structure has 12; so, the electrostatic repulsive energy would be lower for BCC than FCC if the Debye screening length is adjusted such that next-nearest-neighbor repulsive interactions are significantly more highly screened than nearest neighbor repulsive interactions. Given the millimeter sizes of crystallites of biliquid opals that can be formed, it is anticipated that it will be possible to perform x-ray scattering studies on single BCC crystals nanodroplets, as has been done for single FCC crystals of solid particicutes[43]. By simply substituting deionized $D_2O$ instead of $H_2O$, it is likewise anticipated that neutron scattering studies will be feasible with adequate contrast, thereby enabling structural investigations of crystalline and non-crystalline photonic nanoemulsions. By fluorescently labeling only the oil, super-resolution optical microscopy studies of the anisotropic elasticity of BCC crystals of charged nanodroplets may be possible, to augment what is known for FCC crystals composed of much larger solid microscale colloids[44].

The nucleation and growth process leading to the observed superexponential rise in both the integrated area under the primary backscattering peak in spectra, as well as in the maximum length of observed xHU crystallites in backscattering macrophotography, warrants further attention. By contrast to the nucleation and growth of crystallites through intermolecular attractions, such as in supersaturated solutions[45, 46], in rejamming crystallization, a non-equilibrium disordered concentrated state of USF-NEMs at a very high osmotic pressure is rapidly decompressed upon significant dilution with deionized; nanodroplet self-organization in the form of crystallization relaxes the system to a lower osmotic pressure facilitated by the greater packing efficiency of the BCC crystalline state compared to a disordered maximally random jammed state. Inadequate dilution leaves the system still in a disordered jammed state (sj-$\bar{x}$HU), and crystallization, which could in principle relax the system, is kinetically suppressed. Thus, determining the boundaries between sj-$\bar{x}$HU, kinetically allowed xHU, and wj-L as a function of $\phi$ and I for fixed <a> theoretically or by simulations, as well as the change in the kinetics of crystallization in xHU close to these boundaries, would be interesting. It is possible that existing understandings of crystal nucleation and growth in solid colloids[46, 47] could potentially be extended to photonic nanoemulsions. Beyond causing melting[48], externally applied excitations, such as large amplitude oscillatory shear[48-50], in excess of Brownian excitations, could potentially facilitate unjamming and strongly impact crystallization through shear-induced ordering near the boundary between sj-$\bar{x}$HU and xHU.

REFERENCES

1. Ward, F. *Opals*. (Gem Book Pub., Bethesda, Md., 2000).
2. Jones, J. B., Sanders, J. V. & Segnit, E. R. Structure of opal. *Nature* 204, 990-991 (1964).
3. Sanders, J. V. Colour of precious opal. *Nature* 204, 1151-1153 (1964).
4. Torquato, S. & Stillinger, F. H. Local density fluctuations, hyperuniformity, and order metrics. *Phys. Rev. E* 68, 041113 (2003).
5. Busch, K. & John, S. Photonic band gap formation in certain self-organizing systems. *Phys. Rev. E* 58, 3896-3908 (1998).
6. Bragg, W. H. & Bragg, W. L. The reflection of x-rays by crystals. *Proc. R. Soc. Lond. A* 88, 428-438 (1913).
7. Nassau, K. *Gems Made by Man*. (Chilton, Radnor, Pa., 1980).
8. van Blaaderen, A. Opals in a new light. *Science* 282, 887-888 (1998).
9. Goodwin, J. W., Hearn, J., Ho, C. C. & Ottewill, R. H. Studies on the preparation and characterization of monodisperse polystyrene latices. III. Preparation without added surface active agents. *Colloid Polymer Sci.* 252, 464-471 (1974).
10. Stöber, W., Fink, A. & Bohn, E. Controlled growth of monodisperse silica spheres in the micron size range. *J. Colloid Interface Sci.* 26, 62-29 (1968).
11. Gasser, U. Crystallization in three- and two-dimensional colloidal suspensions. *J. Phys.: Condens. Matter* 21, 203101 (2009).
12. Gast, A. P. & Monovoukas, Y. A new growth instability in colloidal crystallization. *Nature* 351, 553-555 (1991).
13. Li, B., Zhou, D. & Han, Y. Assembly and phase transitions of colloidal crystals. *Nat. Rev. Mater.* 1, 15011 (2016).
14. Pieranski, P. Colloidal crystals. *Contemp. Phys.* 24, 25-73 (1983).
15. Sirota, E. B. et al. Complete phase diagram of a charged colloidal system: a synchrotron x-ray scattering study. *Phys. Rev. Lett.* 62, 1524-1527 (1989).
16. van Blaaderen, A., Ruel, R. & Wiltzius, P. Template-directed colloidal crystallization. *Nature* 385, 321-324 (1997).

17. Zhu, P. & Wang, L. Passive and active droplet generation with microfluidics: A review. *Lab Chip* 17, 34-75 (2016).
18. Bragg, W. L. & Nye, J. F. A dynamical model of crystal structure. *Proc. R. Soc. Lond. A* 190, 474-481 (1947).
19. Goodling, A. E. et al. Colouration by total internal reflection and interference at microscale concave interfaces. *Nature* 566, 523-527 (2019).
20. Leal Calderon, F., Stora, T., Mondain Monval, O., Poulin, P. & Bibette, J. Direct measurement of colloidal forces. *Phys. Rev. Lett.* 72, 2959-2962 (1994).
21. Srinivasarao, M., Collings, D., Philips, A. & Patel, S. Array of air bubbles in a polymer film. *Science* 292, 79-83 (2001).
22. Fryd, M. M. & Mason, T. G. Advanced nanoemulsions. *Annu. Rev. Phys. Chem.* 63, 493-518 (2012).
23. Mason, T. G., Wilking, J. N., Meleson, K., Chang, C. B. & Graves, S. M. Nanoemulsions: Formation, structure, and physical properties. *J. Phys.: Condens. Matter* 18, R635-R666 (2006).
24. Perrin, J. *Atoms*. (van Nostrand, New York, 1916).
25. Hunter, R. J. *Zeta Potential in Colloid Science: Principles and Applications*. (Academic Press, London, 1981).
26. Russel, W. B., Saville, D. A. & Schowalter, W. R. *Colloidal Dispersions*. (Cambridge Univ. Press, Cambridge, 1989).
27. Liu, A. J. & Nagel, S. R. Jamming is not just cool any more. *Nature* 396, 21-22 (1998).
28. Torquato, S. & Stillinger, F. H. Jammed hard-particle packings: from Kepler to Bernal and beyond. *Rev. Mod. Phys.* 82, 2633-2672 (2010).
29. Cabane, B. et al. Hiding in plain view: colloidal self-assembly from polydisperse populations. *Phys. Rev. Lett.* 116, 208001 (2016).
30. Magkiriadou, S., Park, J.-G., Kim, Y.-S. & Manoharan, V. N. Disordered packings of core-shell particles with angle-independent structural colors. *Optical Mater. Express* 2, 1343-1352 (2012).
31. Anna, S. L., Bontoux, N. & Stone, H. A. Formation of dispersions using flow focusing in microchannels. *Appl. Phys. Lett.* 82, 364-366 (2003).
32. Thorsen, T., Roberts, R. W., Arnold, F. H. & Quake, S. R. Dynamic pattern formation in a vesicle-generating microfluidic device. *Phys. Rev. Lett.* 86, 4163-4166 (2001).
33. Bibette, J. Depletion interactions and fractionated crystallization for polydisperse emulsion purification. *J. Colloid Interface Sci.* 147, 474-478 (1991).
34. Mason, T. G., Krall, A. H., Gang, H., Bibette, J. & Weitz, D. A. Monodisperse emulsions: properties and uses. In *Encyclopedia of Emulsion Technology* Vol. 4 (ed. P. Becher) 299-336 (Marcel Dekker, New York, 1996).
35. Pagenkopp, M. J. & Mason, T. G. Surfactant partitioning in nanoemulsions. *Langmuir* 34, 10309-10320 (2018).
36. Zhu, X., Fryd, M. M., Huang, J.-R. & Mason, T. G. Optically probing nanoemulsion compositions. *Phys. Chem. Chem. Phys.* 14, 2455-2461 (2012).
37. Graves, S. M. & Mason, T. G. Transmission of visible and ultraviolet light through charge-stabilized nanoemulsions. *J. Phys. Chem. C* 112, 12669-12676 (2008).
38. John, S. Strong localization of photons in certain disordered dielectric superlattices. *Phys. Rev. Lett.* 58, 2486-2489 (1987).
39. Yablonovitch, E. Inhibited spontaneous emission in solid-state physics and electronics. *Phys. Rev. Lett.* 58, 2059-2062 (1987).
40. Kittel, C. *Introduction to Solid State Physics*. 8th edn. (Wiley, New York, 2005).
41. Bernal, J. D. & Mason, J. Packing of spheres: Co-ordination of randomly packed spheres. *Nature* 188, 910-911 (1960).
42. Sanders, J. V. Diffraction of light by opals. *Acta Cryst. A* 24, 427-434 (1968).
43. Vos, W. L., Megens, M., van Kats, C. M. & Bosecke, P. X-ray diffraction of photonic colloidal single crystals. *Langmuir* 13, 6004-6008 (1997).
44. Reinke, D. et al. Noncentral forces in crystals of charged colloids. *Phys. Rev. Lett.* 98, 038301 (2007).
45. Karthika, S., Radhakrishnan, T. K. & Kalaichelvi, P. A review of classical and nonclassical nucleation theories. *Cryst. Growth Des.* 16, 6663-6681 (2016).
46. Sear, R. P. Nucleation: Theory and applications to protein solutions and colloidal suspensions. *J. Phys.: Condens. Matter* 19, 033101 (2007).
47. Herlach, D. M., Palberg, T., Klassen, I., Klein, S. & Kobold, R. Overview: experimental studies of crystal nucleation: metals and colloids. *J. Chem. Phys.* 145, 211703 (2016).
48. Imhof, A., van Blaaderen, A. & Dhont, J. K. G. Shear melting of colloidal crystals of charged spheres studied with rheology and polarizing microscopy. *Langmuir* 10, 3477-3484 (1994).
49. Ackerson, B. J. & Pusey, P. N. Shear-induced order in suspensions of hard spheres. *Phys. Rev. Lett.* 61, 1033-1036 (1988).
50. Kim, H. S. & Mason, T. G. Advances and challenges in the rheology of concentrated emulsions and nanoemulsions. *Adv. Colloid Interface Sci.* 247, 397-412 (2017).

EMBODIMENTS

Embodiment 1. A method of forming a biliquid material, the method comprising:
  forming an emulsion comprising a polar liquid phase and non-polar liquid droplets dispersed in the polar liquid phase; and
  reducing an ionic strength of the polar liquid phase to form the biliquid material as a hyperuniform structure or a crystalline structure;
  wherein:
  the nonpolar liquid droplets are immiscible with the polar liquid phase; and
  the emulsion is stabilized by an ionic surfactant adsorbed at an interface between the polar liquid phase and the non-polar liquid droplets.

Embodiment 2. The method of embodiment 1, wherein the ionic surfactant comprises an ionic head group and a non-polar tail bonded to the ionic head group, and a C-number of the non-polar tail is 16 or greater, 17 or greater, or 18 or greater.

Embodiment 3. The method of embodiment 2, wherein forming the emulsion comprises heating above room temperature.

Embodiment 4. The method of embodiment 2, wherein forming the emulsion comprises forming an initial emulsion that is stabilized by an initial ionic surfactant having an initial C-number, and placing the initial emulsion in contact with the ionic surfactant having a C-number that is greater than the initial C-number.

Embodiment 5. The method of embodiment 4, wherein placing the initial emulsion in contact with the ionic surfactant comprises heating above room temperature.

Embodiment 6. The method of any of embodiments 1-5, wherein forming the emulsion comprises subjecting the emulsion to size fractionation.

Embodiment 7. The method of embodiment 6, wherein a polydispersity of a radial size distribution of the non-polar liquid droplets in the emulsion that forms the crystalline structure is ≤0.1.

Embodiment 8. The method of embodiment 6, wherein a polydispersity of a radial size distribution of the non-polar liquid droplets in the emulsion that forms the hyperuniform structure is ≤0.4.

Embodiment 9. The method of any of embodiments 1-8, wherein a magnitude of a zeta potential of the non-polar liquid droplets stabilized in the emulsion by the ionic surfactant is about 30 mV or greater.

Embodiment 10. The method of any of embodiments 1-9, wherein the non-polar liquid droplets have a refractive index difference Δn with respect to the polar liquid phase, with Δn of about 0.01 to about 0.3.

Embodiment 11. The method of any of embodiments 1-10, wherein a pH of the emulsion that forms the crystalline structure is about 5.4 to about 8.6.

Embodiment 12. The method of any of embodiments 1-10, wherein a pH of the emulsion that forms the hyperuniform structure is about 4.0 to about 5.3.

Embodiment 13. The method of any of embodiments 1-10, wherein a pH of the emulsion that forms the hyperuniform structure is about 8.6 to about 11.

Embodiment 14. The method of any of embodiments 1-13, wherein reducing the ionic strength of the polar liquid phase is performed by dilution with neutral deionized water.

Embodiment 15. The method of any of embodiments 1-13, wherein reducing the ionic strength of the polar liquid phase is performed by placing the emulsion in contact with a nanoporous membrane or gel that has a pore size sufficient to allow passage of ions in the polar liquid phase but small enough to block passage of the non-polar liquid droplets Embodiment 16. The method of embodiment 15, wherein reducing the ionic strength of the polar liquid phase is further performed using an ion exchange resin that removes the ions that pass through the nanoporous membrane or gel.

Embodiment 17. The method of embodiment 16, wherein the ion exchange resin is a mixed-bed ion exchange resin.

Embodiment 18. The method of any of embodiments 1-17, wherein the ionic strength of the polar liquid phase is reduced to ≤0.1 mM.

Embodiment 19. The method of any of embodiments 1-18, wherein the non-polar liquid droplets have an average radius of about 10 nm to about 200 nm, about 10 nm to about 150 nm, about 10 nm to about 100 nm, or about 30 nm and about 100 nm.

Embodiment 20. The method of any of embodiments 1-19, wherein the hyperuniform structure or the crystalline structure arises because of enhanced charge repulsion between the non-polar liquid droplets as a consequence of reducing the ionic strength.

Embodiment 21. The method of any of embodiments 1-20, wherein the Debye screening length in the polar liquid phase is greater than about 10 nm.

Embodiment 22. The method of any of embodiments 1-21, wherein a droplet volume fraction ϕ in the emulsion is less than about 0.1.

Embodiment 23. The method of any of embodiments 1-22, wherein a backscattered light from the biliquid material, when illuminated by directional white light, is in a visible range of wavelengths, yielding a color that arises from diffraction satisfying a Bragg criterion.

Embodiment 24. The method of embodiment 23, wherein a wavelength associated with a dominant peak in a spectrum of the backscattered light is proportional to an average droplet radius divided by a droplet volume fraction raised to the one-third power.

Embodiment 25. A biliquid material formed by the method of any of embodiments 1-24.

Embodiment 26. A biliquid material comprising an emulsion comprising a continuous liquid phase, a dispersed liquid phase, and a surface-stabilizing material, wherein:
  the dispersed liquid phase is immiscible with the continuous liquid phase;
  the dispersed liquid phase is in the form of a plurality of droplets in the continuous liquid phase;
  the surface-stabilizing material is soluble in at least one of the continuous liquid phase and the dispersed liquid phase and preferentially adsorbs at the surfaces of the plurality of droplets, wherein the surface-stabilizing material imparts a repulsive interaction between the plurality of droplets that inhibits coalescence of the plurality of droplets; and
  the biliquid material has a structurally-colored droplet structure, wherein the structurally-colored droplet structure yields one or more structural colors when illuminated with broad-spectrum light.

Embodiment 27. The biliquid material of embodiment 26, wherein the structurally-colored droplet structure is hyperuniform, crystalline with long-range order, polycrystalline with long-range order within a given crystallite, liquid crystalline with quasi-long-range order, non-crystalline with medium-range order, non-crystalline with short-range order, or a combination of two or more thereof.

Embodiment 28. The biliquid material of embodiment 26 or embodiment 27, wherein the continuous liquid phase is polar and the dispersed liquid phase is non-polar.

Embodiment 29. The biliquid material of any one of embodiments 26-28, wherein the surface-stabilizing material is a surfactant, a lipid, a co-polymer, or a combination of two or more thereof.

Embodiment 30. The biliquid material of embodiment 29, wherein the surfactant is selected from alkyl sulfates, alkylsulfonates, alkylcarboxylates, alkylphosphates, silicone-sulfates, silicone-sulfonates, silicone-carboxylates, and silicone-phosphates.

Embodiment 31. The biliquid material of embodiment 29 or embodiment 30, wherein the lipid is selected from ionic fatty acyls, ionic glycerolipids, ionic glycerophospholipids, ionic sphingolipids, ionic saccharolipids, ionic polyketides, ionic sterol lipids, and ionic prenol lipids.

Embodiment 32. The biliquid material of any one of embodiments 29-31, wherein the co-polymer is a block co-polymer.

Embodiment 33. The biliquid material of embodiment 32, wherein the block co-polymer is selected from poly-amino acid block co-polymers and poly-nucleic acid block co-polymers, wherein the poly-amino acid block co-polymers and poly-nucleic acid block co-polymers have at least one block that is alkyl or silicone in nature.

Embodiment 34. The biliquid material of any one of embodiments 26-28, wherein the surface-stabilizing material is an ionic surface-stabilizing material.

Embodiment 35. The biliquid material of embodiment 34, wherein the ionic surface-stabilizing material has an alkyl portion with a carbon number greater than or equal to 16.

Embodiment 36. The biliquid material of any one of embodiments 26-35 having a radial size polydispersity of the plurality of droplets of less than about 0.2.

Embodiment 37. The biliquid material of any one of embodiments 26-36 having a radial size polydispersity of the plurality of droplets of less than about 0.1.

Embodiment 38. The biliquid material of any one of embodiments 26-37 having an average droplet radius of the plurality of droplets of less than about 500 nm.

Embodiment 39. The biliquid material of any one of embodiments 26-38, wherein the repulsive interaction is a screened charge repulsion, and a spatial range of the screened charge repulsion is greater than about 0.1 times the average droplet radius.

Embodiment 40. The biliquid material of embodiment 39 having a zeta potential associated with the screened charge repulsion of a magnitude greater than or equal to about 10 mV.

Embodiment 41. The biliquid material of embodiment 39 or embodiment 40 having a Debye screening length associated with the screened charge repulsion of greater than about 5 nm in the continuous liquid phase.

Embodiment 42. The biliquid material of embodiment 41, wherein the Debye screening length is increased through one or both of deionization of the continuous liquid phase of the emulsion and dilution of the emulsion with deionized continuous liquid phase.

Embodiment 43. The biliquid material of any one of embodiments 26-42 having a refractive index difference between the continuous liquid phase and the dispersed liquid phase with a magnitude of greater than about 0.005.

Embodiment 44. The biliquid material of embodiment 43, wherein the refractive index difference between the continuous liquid phase and the dispersed liquid phase has a magnitude that is between about 0.01 to about 0.3.

Embodiment 45. The biliquid material of any one of embodiments 26-44 having an effective refractive index of the emulsion $n_{eff}$ of from about 1.2 to about 2.0.

Embodiment 46. The biliquid material of any one of embodiments 26-45 having a droplet volume fraction of the emulsion of from about 0.001 to about 0.5.

Embodiment 47. The biliquid material of any one of embodiments 26-46 having a pH of the continuous liquid phase of the emulsion of about 4.0 to about 11.

Embodiment 48. The biliquid material of embodiment 47 having a pH of the continuous liquid phase of the emulsion of about 4.0 to about 5.3.

Embodiment 49. The biliquid material of embodiment 47 having a pH of the continuous liquid phase of the emulsion of about 5.4 to about 8.6.

Embodiment 50. The biliquid material of embodiment 47 having a pH of the continuous liquid phase of the emulsion of about 8.6 to about 11.

Embodiment 51. The biliquid material of any one of embodiments 26-50, wherein the continuous liquid phase has an ionic strength of less than or equal to about 0.1 mM.

Embodiment 52. The biliquid material of embodiment 26, wherein the structurally-colored droplet structure yields two or more structural colors, each of which comes from optical scattering of different spatial regions of the same emulsion.

Embodiment 53. The biliquid material of embodiment 26 wherein the wavelength $\lambda$ associated with a peak in a backscattering spectrum of the emulsion associated with the structural color is set according to a Bragg scattering condition that follows the relationship of $\lambda$ being proportional to $<a>/\phi^{1/3}$.

Embodiment 54. A method of forming a biliquid material, the method comprising
  forming an emulsion comprising a plurality of droplets of a dispersed liquid phase in a continuous liquid phase;
  reducing an ionic strength of the continuous liquid phase with a surface-stabilizing material that imparts a repulsive interaction between the plurality of droplets that inhibits coalescence of the plurality of droplets; and
  adjusting a combination of a spatial range of the repulsive interaction, a strength of the repulsive interaction, an average droplet radius of the emulsion, a radial size polydispersity of the emulsion, a refractive index difference between the continuous liquid phase and the dispersed liquid phase, and a droplet volume fraction of the emulsion are adjusted to provide the biliquid material with a structurally-colored droplet structure that yields one or more structural colors when illuminated with broad-spectrum light;
  wherein:
  the dispersed liquid phase is immiscible with the continuous liquid phase;
  the surface-stabilizing material is a surfactant, a lipid, a co-polymer, or a combination of two or more thereof;
  the surface-stabilizing material is soluble in at least one of the continuous liquid phase and the dispersed liquid phase and preferentially adsorbs at the surfaces of the plurality of droplets; and
  the structurally-colored droplet structure is hyperuniform, crystalline with long-range order, poly-crystalline with long-range order, non-crystalline with medium-range order, non-crystalline with short-range order, or a combination of two or more thereof.

Embodiment 55. The method of embodiment 54, wherein the continuous liquid phase is polar and the dispersed liquid phase is non-polar.

Embodiment 56. The method of embodiment 54 or embodiment 55, wherein the surface-stabilizing material is a surfactant, a lipid, a co-polymer, or a combination of two or more thereof.

Embodiment 57. The method of embodiment 56, wherein the surfactant is selected from alkyl sulfates, alkylsulfonates, alkylcarboxylates, alkylphosphates, silicone-sulfates, silicone-sulfonates, silicone-carboxylates, and silicone-phosphates.

Embodiment 58. The method of embodiment 56 or embodiment 57 wherein the lipid is selected from ionic fatty acyls, ionic glycerolipids, ionic glycerophospholipids, ionic sphingolipids, ionic saccharolipids, ionic polyketides, ionic sterol lipids, and ionic prenol lipids.

Embodiment 59. The method of any one of embodiments 56-58, wherein the co-polymer is a block co-polymer.

Embodiment 60. The method of embodiment 59, wherein the block co-polymer is selected from poly-amino acid block co-polymers and poly-nucleic acid block co-polymers, wherein the poly-amino acid block co-polymers and poly-nucleic acid block co-polymers have at least one block that is alkyl or silicone in nature.

Embodiment 61. The method of embodiment 54 or embodiment 55, wherein the surface-stabilizing material is an ionic surface-stabilizing material.

Embodiment 62. The method of embodiment 61, wherein the ionic surface-stabilizing material has an alkyl portion with a carbon number greater than or equal to 16.

Embodiment 63. The method of embodiment 61 or embodiment 62, wherein the ionic surface-stabilizing material is adsorbed at a first temperature above room temperature prior to lowering to a second temperature such that adsorption of the ionic surface-stabilizing material at the droplet surfaces is irreversible.

Embodiment 64. The method of any one of embodiments 54-63, wherein the radial size polydispersity is less than about 0.2.

Embodiment 65. The method of any one of embodiments 54-63, wherein the radial size polydispersity is less than 0.1.

Embodiment 66. The method of any one of embodiments 54-65, wherein the average droplet radius is less than about 500 nm.

Embodiment 67. The method of any one of embodiments 54-66, wherein the repulsive interaction is a screened charge repulsion and the spatial range of the screened charge repulsion is greater than about 0.1 times the average droplet radius.

Embodiment 68. The method of embodiment 67, wherein a zeta potential associated with the screened charge repulsion has a magnitude greater than or equal to about 10 mV.

Embodiment 69. The method of embodiment 67 or embodiment 68, wherein a Debye screening length associated with the screened charge repulsion is greater than about 5 nm.

Embodiment 70. The method of embodiment 69, wherein the Debye screening length is increased through one or both of deionization of the continuous liquid phase and dilution with deionized continuous liquid phase.

Embodiment 71. The method of any one of embodiments 54-70, wherein a magnitude of the refractive index difference between the continuous liquid phase and the dispersed liquid phase is greater than about 0.005.

Embodiment 72. The method of any one of embodiments 54-71, wherein an effective refractive index of the emulsion $n_{eff}$ is from about 1.2 to about 2.0.

Embodiment 73. The method of any one of embodiments 54-72, wherein the droplet volume fraction is in a range of from about 0.001 to about 0.5.

Embodiment 74. The method of any one of embodiments 54-73, wherein the radial size polydispersity is reduced through a droplet size fractionation procedure subsequent to formation of the emulsion.

Embodiment 75. The method of any one of embodiment 54-74, wherein the continuous liquid phase has an ionic strength of less than or equal to about 0.1 mM.

Embodiment 76. The method of embodiment 54, wherein the wavelength λ associated with a peak in a backscattering spectrum of the emulsion associated with the structural color is set according to a Bragg scattering condition that follows the relationship of λ being proportional to $<a>/\phi^{1/3}$.

Embodiment 77. The method of embodiment 54, wherein the biliquid material with the structurally-colored droplet structure yields two or more structural colors, each of which comes from optical scattering of different spatial regions of the same emulsion.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A biliquid material comprising an emulsion comprising a continuous liquid phase, a dispersed liquid phase, and a surface-stabilizing material;
wherein:
the dispersed liquid phase is immiscible with the continuous liquid phase;
the dispersed liquid phase is in the form of a plurality of droplets in the continuous liquid phase;
the surface-stabilizing material is soluble in at least one of the continuous liquid phase and the dispersed liquid phase and the surface-stabilizing material adsorbs at the surfaces of the plurality of droplets, wherein the surface-stabilizing material imparts a repulsive interaction between the plurality of droplets that inhibits coalescence of the plurality of droplets; and
the biliquid material has a ordered structurally-colored droplets structure, wherein the ordered structurally-colored droplets structure yields one or more structural colors when illuminated with broad-spectrum light; and
the one or more structural colors arise from diffraction of the broad-spectrum light by the plurality of droplets.

2. The biliquid material of claim 1, wherein the ordered structurally-colored droplets structure is hyperuniform, crystalline with long-range order, poly-crystalline with long-range order within a given crystallite, liquid crystalline with quasi-long-range order, non-crystalline with medium-range order, non-crystalline with short-range order, or a combination of two or more thereof.

3. The biliquid material of claim 1, wherein the continuous liquid phase is polar and the dispersed liquid phase is non-polar.

4. The biliquid material of claim 1, wherein the surface-stabilizing material is a surfactant, a lipid, a co-polymer, or a combination of two or more thereof.

5. The biliquid material of claim 1, wherein the surface-stabilizing material is an ionic surface-stabilizing material.

6. The biliquid material of claim 5, wherein the ionic surface-stabilizing material has an alkyl portion with a carbon number greater than or equal to 16.

7. The biliquid material of claim 1 having a radial size polydispersity of the plurality of droplets of less than about 0.2.

8. The biliquid material of claim 1 having an average droplet radius of the plurality of droplets of less than about 500 nm.

9. The biliquid material of claim 1, wherein the repulsive interaction is a screened charge repulsion, and a spatial range of the screened charge repulsion is greater than about 0.1 times the average droplet radius.

10. The biliquid material of claim 9 having a zeta potential associated with the screened charge repulsion of a magnitude greater than or equal to about 10 mV.

11. The biliquid material of claim 9 having a Debye screening length associated with the screened charge repulsion of greater than about 5 nm in the continuous liquid phase.

12. The biliquid material of claim 1 having a refractive index difference between the continuous liquid phase and the dispersed liquid phase with a magnitude of greater than about 0.005.

13. The biliquid material of claim 1 having an effective refractive index of the emulsion $n_{eff}$ of from about 1.2 to about 2.0.

14. The biliquid material of claim 1 having a droplet volume fraction of the emulsion of from about 0.001 to about 0.5.

15. The biliquid material of claim 1 having a pH of the continuous liquid phase of the emulsion of about 4.0 to about 11.

16. The biliquid material of claim 1, wherein the continuous liquid phase has an ionic strength of less than or equal to about 0.1 mM.

17. The biliquid material of claim 1, wherein the ordered structurally-colored droplets structure yields two or more structural colors, each of which comes from optical scattering of different spatial regions of the same emulsion.

18. The biliquid material of claim 1, wherein a wavelength $\lambda$ associated with a peak in a backscattering spectrum of the emulsion associated with the structural color is set according to a Bragg scattering condition that follows the relationship of $\lambda$ being proportional to $<a>/\phi^{1/3}$.

19. A method of forming a biliquid material, the method comprising
forming an emulsion comprising a plurality of droplets of a dispersed liquid phase in a continuous liquid phase;
reducing an ionic strength of the continuous liquid phase with a surface-stabilizing material that imparts a repulsive interaction between the plurality of droplets that inhibits coalescence of the plurality of droplets; and
adjusting a combination of a spatial range of the repulsive interaction, a strength of the repulsive interaction, an average droplet radius of the emulsion, a radial size polydispersity of the emulsion, a refractive index difference between the continuous liquid phase and the dispersed liquid phase, and a droplet volume fraction of the emulsion to provide the biliquid material with an ordered structurally-colored droplets structure that yields one or more structural colors when illuminated with broad-spectrum light;
wherein:
the dispersed liquid phase is immiscible with the continuous liquid phase;
the surface-stabilizing material is a surfactant, a lipid, a co-polymer, or a combination of two or more thereof;
the surface-stabilizing material is soluble in at least one of the continuous liquid phase and the dispersed liquid phase and the surface-stabilizing material adsorbs at the surfaces of the plurality of droplets; and
the ordered structurally-colored droplets structure is hyperuniform, crystalline with long-range order, poly-crystalline with long-range order, non-crystalline with medium-range order, non-crystalline with short-range order, or a combination of two or more thereof; and
the one or more structural colors arise from diffraction of the broad-spectrum light by the plurality of droplets.

20. The method of claim 19, wherein the continuous liquid phase is polar and the dispersed liquid phase is non-polar.

* * * * *